United States Patent
Chaudhri et al.

(10) Patent No.: US 9,086,785 B2
(45) Date of Patent: Jul. 21, 2015

(54) VISUALIZATION OBJECT RECEPTACLE

(75) Inventors: Imran A. Chaudhri, San Francisco, CA (US); John O. Louch, San Luis Obispo, CA (US); Christopher Hynes, Santa Cruz, CA (US); Timothy Wayne Bumgarner, Sharpsburg, MD (US); Eric Steven Peyton, Lisle, IL (US)

(73) Assignee: Apple Inc., Cupertino, CA (US)

( * ) Notice: Subject to any disclaimer, the term of this patent is extended or adjusted under 35 U.S.C. 154(b) by 606 days.

(21) Appl. No.: 11/760,692

(22) Filed: Jun. 8, 2007

(65) Prior Publication Data

US 2008/0307364 A1  Dec. 11, 2008

(51) Int. Cl.
*G06F 3/0483* (2013.01)
*G06F 3/0482* (2013.01)
*G06F 3/0481* (2013.01)
*G06F 17/30* (2006.01)

(52) U.S. Cl.
CPC ................... *G06F 3/0483* (2013.01)

(58) Field of Classification Search
CPC .............. G06F 3/04817; G06F 3/0482; G06F 3/04815; G06F 17/30126; G06F 17/30994; G06F 3/04842; G06F 17/30115
USPC ....................................................... 715/836
See application file for complete search history.

(56) References Cited

U.S. PATENT DOCUMENTS

| | | |
|---|---|---|
| 5,317,687 A * | 5/1994 | Torres ............................ 715/823 |
| 5,339,390 A | 8/1994 | Robertson et al. |
| 5,452,414 A | 9/1995 | Rosendahl et al. |
| 5,461,710 A | 10/1995 | Bloomfield et al. |
| 5,515,486 A | 5/1996 | Amro et al. |
| 5,555,354 A | 9/1996 | Strasnick |
| 5,565,657 A | 10/1996 | Merz |
| 5,657,049 A | 8/1997 | Ludolph et al. |
| 5,673,377 A | 9/1997 | Berkaloff |
| 5,678,015 A | 10/1997 | Goh |
| 5,736,985 A | 4/1998 | Lection |
| 5,745,109 A * | 4/1998 | Nakano et al. ................ 715/838 |
| 5,745,715 A | 4/1998 | Pickover et al. |
| 5,754,809 A | 5/1998 | Gandre |
| 5,767,854 A | 6/1998 | Anwar |
| 5,767,855 A | 6/1998 | Bardon et al. |
| 5,801,699 A | 9/1998 | Hocker et al. |
| 5,802,466 A | 9/1998 | Gallant |
| 5,825,361 A | 10/1998 | Rubin et al. |
| 5,835,094 A * | 11/1998 | Ermel et al. .................. 715/848 |
| 5,847,707 A | 12/1998 | Hayashida |
| 5,880,733 A | 3/1999 | Horvitz et al. |
| 6,002,403 A | 12/1999 | Sugiyama et al. |
| 6,005,579 A | 12/1999 | Sugiyama |
| 6,016,145 A | 1/2000 | Horvitz et al. |
| 6,025,827 A | 2/2000 | Bullock et al. |
| 6,025,839 A | 2/2000 | Schell et al. |
| 6,043,817 A | 3/2000 | Bolnick et al. |

(Continued)

OTHER PUBLICATIONS

Hideya Kawahara and Paul Byrne Project Looking Glass Cool LG3D Apps and How to Write Them Powerpoint 2005 JavaOne Conference Session 7992, 32 slides.*

(Continued)

*Primary Examiner* — Andrea Long
(74) *Attorney, Agent, or Firm* — Fish & Richardson P.C.

(57) ABSTRACT

An icon receptacle is disposed along a depth aspect, and one or more icons are disposed within the icon receptacle, one of which is a stack item.

62 Claims, 31 Drawing Sheets

(56) References Cited

U.S. PATENT DOCUMENTS

| | | | |
|---|---|---|---|
| 6,043,818 A | 3/2000 | Nakano | |
| 6,054,989 A | 4/2000 | Robertson et al. | |
| 6,088,032 A | 7/2000 | Mackinlay | |
| 6,122,647 A | 9/2000 | Horowitz | |
| 6,160,553 A | 12/2000 | Robertson et al. | |
| 6,166,738 A | 12/2000 | Robertson et al. | |
| 6,188,405 B1 | 2/2001 | Czerwinski et al. | |
| 6,229,542 B1 | 5/2001 | Miller | |
| 6,243,093 B1 | 6/2001 | Czerwinski et al. | |
| 6,243,724 B1 * | 6/2001 | Mander et al. | 715/273 |
| 6,262,732 B1 * | 7/2001 | Coleman et al. | 715/835 |
| 6,271,842 B1 | 8/2001 | Bardon et al. | |
| 6,275,829 B1 | 8/2001 | Angiulo | |
| 6,281,898 B1 | 8/2001 | Nikolovska et al. | |
| 6,313,855 B1 | 11/2001 | Shuping et al. | |
| 6,363,404 B1 | 3/2002 | Dalal et al. | |
| 6,388,181 B2 | 5/2002 | Moe | |
| 6,414,677 B1 | 7/2002 | Robertson et al. | |
| 6,426,761 B1 | 7/2002 | Kanevsky et al. | |
| 6,469,722 B1 | 10/2002 | Kinoe | |
| 6,480,210 B1 | 11/2002 | Martino et al. | |
| 6,542,168 B2 | 4/2003 | Negishi et al. | |
| 6,570,597 B1 | 5/2003 | Seki et al. | |
| 6,577,304 B1 | 6/2003 | Yablonski et al. | |
| 6,577,330 B1 | 6/2003 | Tsuda et al. | |
| 6,583,798 B1 | 6/2003 | Hoek | |
| 6,590,593 B1 | 7/2003 | Robertson et al. | |
| 6,597,358 B2 | 7/2003 | Miller | |
| 6,727,924 B1 | 4/2004 | Anderson | |
| 6,734,884 B1 | 5/2004 | Berry et al. | |
| 6,765,567 B1 | 7/2004 | Roberson et al. | |
| 6,886,138 B2 | 4/2005 | Laffey et al. | |
| 6,922,815 B2 | 7/2005 | Rosen | |
| 6,938,218 B1 | 8/2005 | Rosen | |
| 6,983,424 B1 | 1/2006 | Dutta | |
| 7,028,050 B1 | 4/2006 | Rose | |
| 7,043,701 B2 | 5/2006 | Gordon | |
| 7,093,199 B2 | 8/2006 | Cragun | |
| 7,107,549 B2 | 9/2006 | Deaton et al. | |
| 7,119,819 B1 | 10/2006 | Robertson et al. | |
| 7,134,095 B1 | 11/2006 | Smith et al. | |
| 7,137,075 B2 | 11/2006 | Hoshino et al. | |
| 7,146,576 B2 | 12/2006 | Chang et al. | |
| 7,148,892 B2 | 12/2006 | Robertson et al. | |
| 7,168,051 B2 | 1/2007 | Robinson et al. | |
| 7,178,111 B2 | 2/2007 | Glein et al. | |
| 7,216,305 B1 | 5/2007 | Jaeger | |
| 7,222,309 B2 | 5/2007 | Chupin et al. | |
| 7,249,327 B2 | 7/2007 | Nelson et al. | |
| 7,263,667 B1 | 8/2007 | Hoellerer et al. | |
| 7,266,768 B2 | 9/2007 | Ferlitsch et al. | |
| 7,292,243 B1 | 11/2007 | Burke | |
| 7,299,418 B2 * | 11/2007 | Dieberger | 715/732 |
| 7,299,419 B2 | 11/2007 | Evans | |
| 7,441,201 B1 | 10/2008 | Printezis | |
| 7,478,326 B2 | 1/2009 | Holecek et al. | |
| 7,480,873 B2 | 1/2009 | Kawahara | |
| 7,490,314 B2 | 2/2009 | Yuknewicz | |
| 7,512,902 B2 | 3/2009 | Robertson et al. | |
| 7,523,391 B1 | 4/2009 | Eizenhoefer | |
| 7,536,650 B1 * | 5/2009 | Robertson et al. | 715/767 |
| 7,543,245 B2 | 6/2009 | Irimajiri | |
| 7,546,538 B2 | 6/2009 | Shuping | |
| 7,562,312 B2 | 7/2009 | Rochford et al. | |
| 7,587,681 B2 | 9/2009 | Kake et al. | |
| 7,603,652 B2 | 10/2009 | Makowski | |
| 7,665,033 B2 | 2/2010 | Byrne et al. | |
| 7,673,241 B2 | 3/2010 | Sun | |
| 7,698,658 B2 | 4/2010 | Ohwa | |
| 7,730,425 B2 | 6/2010 | de los Reyes et al. | |
| 7,792,748 B1 | 9/2010 | Ebersole | |
| 7,991,720 B2 | 8/2011 | Mander | |
| 7,996,782 B2 | 8/2011 | Hayles | |
| 8,001,472 B2 | 8/2011 | Gilley | |
| 8,095,882 B2 | 1/2012 | Kashi | |
| 8,136,088 B2 | 3/2012 | Makowski | |
| 8,185,220 B2 | 5/2012 | Lloyd | |
| 8,250,486 B2 | 8/2012 | Lentz | |
| 8,381,122 B2 | 2/2013 | Louch | |
| 8,473,859 B2 | 6/2013 | Chaudhri | |
| 2001/0028369 A1 * | 10/2001 | Gallo et al. | 345/848 |
| 2002/0010718 A1 | 1/2002 | Miller | |
| 2002/0033848 A1 | 3/2002 | Sciammarella et al. | |
| 2002/0080180 A1 | 6/2002 | Mander et al. | |
| 2002/0091739 A1 * | 7/2002 | Ferlitsch et al. | 707/526 |
| 2002/0113820 A1 | 8/2002 | Robinson et al. | |
| 2002/0135538 A1 | 9/2002 | Rosen | |
| 2002/0140746 A1 | 10/2002 | Gargi | |
| 2002/0167546 A1 | 11/2002 | Kimbell et al. | |
| 2003/0007017 A1 | 1/2003 | Laffey et al. | |
| 2003/0052927 A1 | 3/2003 | Barksdale | |
| 2003/0088452 A1 | 5/2003 | Kelly | |
| 2003/0090510 A1 | 5/2003 | Shuping | |
| 2003/0128242 A1 | 7/2003 | Gordon | |
| 2003/0142143 A1 | 7/2003 | Brown et al. | |
| 2003/0146927 A1 | 8/2003 | Crow et al. | |
| 2003/0160815 A1 | 8/2003 | Muschetto | |
| 2003/0169303 A1 | 9/2003 | Islam et al. | |
| 2003/0179234 A1 | 9/2003 | Nelson et al. | |
| 2003/0179237 A1 | 9/2003 | Nelson et al. | |
| 2003/0179240 A1 | 9/2003 | Gest | |
| 2003/0189602 A1 * | 10/2003 | Dalton et al. | 345/830 |
| 2003/0222902 A1 | 12/2003 | Chupin et al. | |
| 2004/0030741 A1 | 2/2004 | Wolton et al. | |
| 2004/0066411 A1 | 4/2004 | Fung et al. | |
| 2004/0066414 A1 | 4/2004 | Czerwinski et al. | |
| 2004/0090472 A1 | 5/2004 | Risch et al. | |
| 2004/0109025 A1 | 6/2004 | Hullot et al. | |
| 2004/0109031 A1 | 6/2004 | Deaton et al. | |
| 2004/0135820 A1 | 7/2004 | Deaton et al. | |
| 2004/0155909 A1 | 8/2004 | Wagner | |
| 2004/0179519 A1 | 9/2004 | Basso et al. | |
| 2004/0212640 A1 | 10/2004 | Mann et al. | |
| 2005/0010876 A1 * | 1/2005 | Robertson et al. | 715/782 |
| 2005/0022139 A1 | 1/2005 | Gettman et al. | |
| 2005/0066292 A1 | 3/2005 | Harrington | |
| 2005/0091596 A1 * | 4/2005 | Anthony et al. | 715/712 |
| 2005/0183009 A1 | 8/2005 | Hannebauer et al. | |
| 2005/0204306 A1 | 9/2005 | Kawahara et al. | |
| 2005/0240880 A1 * | 10/2005 | Banks et al. | 715/836 |
| 2005/0243373 A1 | 11/2005 | Silverbrook | |
| 2005/0283742 A1 | 12/2005 | Gusmorino et al. | |
| 2006/0010379 A1 | 1/2006 | Kashi | |
| 2006/0015818 A1 | 1/2006 | Chaudhri et al. | |
| 2006/0107229 A1 | 5/2006 | Matthews et al. | |
| 2006/0136840 A1 | 6/2006 | Keely | |
| 2006/0161861 A1 * | 7/2006 | Holecek et al. | 715/782 |
| 2006/0161868 A1 * | 7/2006 | Van Dok et al. | 715/835 |
| 2006/0174211 A1 | 8/2006 | Hoellerer et al. | |
| 2006/0212833 A1 | 9/2006 | Gallagher et al. | |
| 2006/0224986 A1 | 10/2006 | Lindsay et al. | |
| 2007/0011617 A1 | 1/2007 | Akagawa et al. | |
| 2007/0055947 A1 | 3/2007 | Ostojic et al. | |
| 2007/0124699 A1 | 5/2007 | Michaels | |
| 2007/0164989 A1 | 7/2007 | Rochford et al. | |
| 2007/0192727 A1 | 8/2007 | Finley et al. | |
| 2007/0214431 A1 | 9/2007 | Amadio et al. | |
| 2007/0214436 A1 | 9/2007 | Myers | |
| 2007/0226652 A1 | 9/2007 | Kikuchi et al. | |
| 2007/0261003 A1 | 11/2007 | Reissmueller | |
| 2008/0040678 A1 | 2/2008 | Crump | |
| 2008/0059893 A1 * | 3/2008 | Byrne et al. | 715/757 |
| 2008/0072252 A1 | 3/2008 | Morris et al. | |
| 2008/0126956 A1 | 5/2008 | Kodosky | |
| 2008/0134086 A1 | 6/2008 | Liao et al. | |
| 2008/0220747 A1 | 9/2008 | Ashkenazi | |
| 2008/0222295 A1 | 9/2008 | Robinson et al. | |
| 2008/0263463 A1 | 10/2008 | Neumann | |
| 2008/0270946 A1 | 10/2008 | Risch et al. | |
| 2008/0307303 A1 | 12/2008 | Louch | |
| 2008/0307330 A1 | 12/2008 | Louch | |
| 2008/0307335 A1 | 12/2008 | Chaudhri | |
| 2008/0307360 A1 | 12/2008 | Chaudhri | |

(56) References Cited

U.S. PATENT DOCUMENTS

2009/0031246 A1  1/2009 Cowtan
2009/0228827 A1* 9/2009 Robertson et al. ............ 715/782
2009/0307623 A1* 12/2009 Agarawala et al. ........... 715/765

OTHER PUBLICATIONS

Dana Nourie and Hideya Kawahara Project Looking Glass: Its Architecture and a Sneak Preview of the API Nov. 2004.*
Greg Shultz Windows Aero—Vista's premium user interface Nov. 30, 2006 5 pages.*
Three-Dimensional Desktop—Google Search [on-line], [retrieved Nov. 9, 2006]. Retrieved from the Internet URL: http://www.google.com/search?sourceid=navclient&ie=U...LJ:2006-42,GGLJ:en&q=%22three=dimensional=desktop%22.
3DNA Desktop [online], [retrieved Nov. 9, 2006]. Retrieved from the Internet URL: http://www.3dna.net/products/desktop.htm.
Metisse—Screenshots [on-line], [retrieved Nov. 9, 2006]. Retrieved from the Internet URL: http://insitu.lri.fr/~chapuis/metisse/screenshots.
Spatial Research [on-line], [retrieved Nov. 9, 2006]. Retrieved from the Internet URL: http://www.spatialresearch.com/spaces.
The TaskGallery [on-line], [retrieved Nov. 9, 2006]. Retrieved from the Internet URL: http://research.microsoft.com/ui/TaskGaller.
Rotate Widow, Java Technology Powers Vodafone Mobile Games Worldwide. Copyright 1994-2006 Sun Microsystems, Inc. [on-line], [retrieved Nov. 9, 2006]. Retrieved from the Internet URL: http://www.sun.com/jsp_utils/ScreenShotPopup.jsp?title=R...ss/&im=md_1.jpg&alt=Generic%20Screen%20Shot%20Alt%20Text.
Switch Desktops, Copyright 1994-2006 Sun Microsystems, Inc. [on-line], [retrieved Nov. 9, 2006], Retrieved from the internet URL: http://www.sun.com/jsp_utils/ScreenShotPopup.jsp?title=Sw.../&im=pan-r_3.jpg&alt-Generic%20Screen%20Shot%20Alt%20Text11/9/2006.
Stanford Panorama, Copyright 1994-2006 Sun Microsystems, Inc. [on-line], [retrieved Nov. 9, 2006], Retrieved from the internet URL: http://www.sun.com/jsp_utils/ScreenShotPopup.jsp?title=St.../&im=pan_2.jpg&alt=Generic%20Screen%20Shot%20Alt%20Text11/9/2006.
Java Solaris Communities Partners My Sun Sun [on-line], [retrieved Nov. 9, 2006], Retrieved from the internet URL: http://www.sun.com/software/looking_glass/details.xml.
3D Desktop Project by Sun MicroSystems: A Revolutionary Evolution of Today's Desktop [on-line]. [retrieved Nov. 9, 2006], Retrieved from the internet URL: http://www.lg3d.dev.java.net.
Agarawala A. and Balakrishnan R. (2006). "Keepin' It Real: Pushing the Desktop Metaphor with Physics, Piles and the Pen". [on-line], [retrieved May 14, 2008]. Retrieved from the internet URL: http://bumptop.com/BumpTop. Montréal, Québec, Canada.
BumpTop 3D Desktop Prototype—www.bumptop.com. (2008). [on-line], [retrieved May 14, 2008]. Retrieved from the internet URL: http://www.youtube.com/watch?v=M0ODskdEPnQ.
Authorized Officer Marja Brouwers, Notification of Transmittal of the International Search Report and the Written Opinion, PCT/US2008/065324, mailed Oct. 14, 2008, 11 pages.
Authorized Officer Beate Giffo-Schmitt, Notification Concerning Transmittal of International Preliminary Report on Patentability, PCT/US2008/065324, mailed Dec. 23, 2009, 6 pages.

* cited by examiner

VISUALIZATION OBJECT RECEPTACLE

BACKGROUND

A graphical user interface allows a large number of graphical objects or items to be displayed on a display screen at the same time. Leading personal computer operating systems, such as the Apple Mac OS®, provide user interfaces in which a number of graphical representations of system objects can be displayed according to the needs of the user. Example system objects include system functions, alerts, windows, peripherals, files, and applications. Taskbars, menus, virtual buttons, a mouse, a keyboard, and other user interface elements provide mechanisms for accessing and/or activating the system objects corresponding to the displayed representations.

The graphical objects and access to the corresponding system objects and related functions, however, should be presented in a manner that facilitates an intuitive user experience. The use of metaphors that represent concrete, familiar ideas facilitate such an intuitive user experience. For example, the metaphor of file folders can be used for storing documents; the metaphor of a file cabinet can be used for storing information on a hard disk; and the metaphor of the desktop can be used for an operating system interface.

As the capabilities of processing devices progress, however, so do the demands on the graphical user interface to convey information to the users in an intuitive manner.

SUMMARY

Disclosed herein are methods, apparatus and systems including a visualization object receptacle. In one implementation, a computer readable medium stores instructions that are executable by a processing device, and upon such execution cause the processing device to generate a graphical user interface on a display device. The graphical user interface defines a depth aspect and a visualization object receptacle disposed along the depth aspect. A visualization object comprises a collective representative of graphical user interface elements that can be displayed in the visualization object receptacle.

In another implementation, a visualization object receptacle disposed along a depth aspect is generated, and one or more visualization objects are generated within the visualization object receptacle. At least one of the visualization objects is a stack item.

In another implementation, a three-dimensional desktop defining a depth aspect includes a visualization object receptacle disposed along the depth aspect. One or more visualization objects are disposed within the visualization object receptacle, and at least one of the visualization objects comprises a stack item.

DETAILED DESCRIPTION

Figure 1:
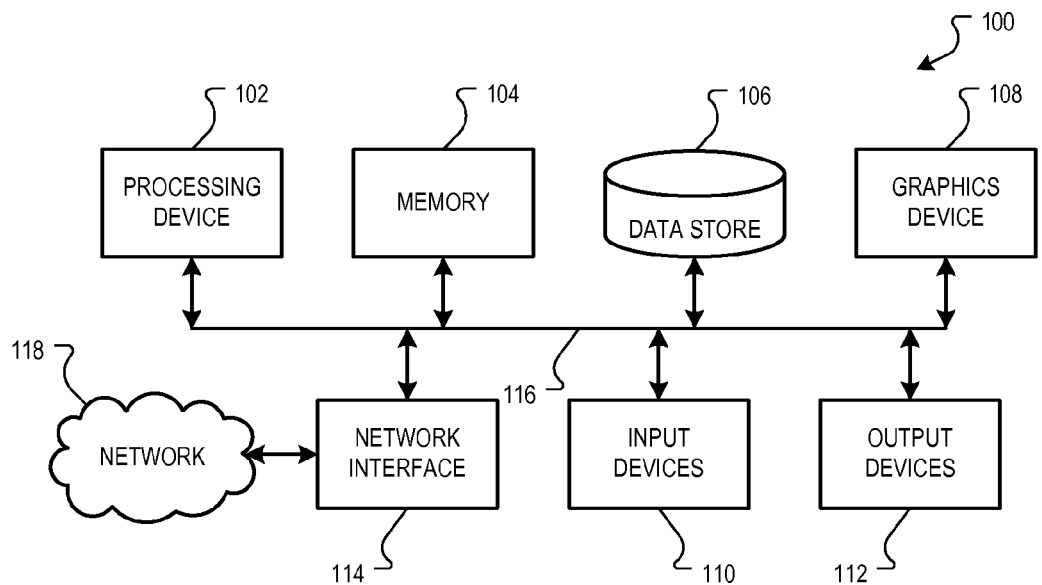
FIG. 1 is a block diagram of an example system that can be utilized to implement the systems and methods described herein.

FIG. 1 is a block diagram of an example system 100 that can be utilized to implement the systems and methods described herein. The system 100 can, for example, be implemented in a computer device, such as any one of the personal computer devices available from Apple Inc., or other electronic devices. Other example implementations can also include video processing devices, multimedia processing devices, portable computing devices, portable communication devices, set top boxes, and other electronic devices.

The example system 100 includes a processing device 102, a first data store 104, a second data store 106, a graphics device 108, input devices 110, output devices 112, and a network device 114. A bus system 116, such as a data bus and a motherboard, can be used to establish and control data communication between the components 102, 104, 106, 108, 110, 112 and 114. Other example system architectures, however, can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

The graphics device 108 can, for example, include a video card, a graphics accelerator card, or a display adapter, and is configured to generate and output images to a display device. In one implementation, the graphics device 108 can be realized in a dedicated hardware card connected to the bus system 116. In another implementation, the graphics device 108 can be realized in a graphics controller integrated into a chipset of the bus system 116. Other implementations can also be used.

Example input devices 110 can include a keyboard, a mouse, a stylus, a video camera, a multi-touch surface, etc., and example output devices 112 can include a display device, an audio device, etc.

The network interface 114 can, for example, include a wired or wireless network device operable to communicate data to and from a network 118. The network 118 can include one or more local area networks (LANs) or a wide area network (WAN), such as the Internet.

In an implementation, the system 100 includes instructions defining an operating system stored in the first data store 104 and/or the second data store 106. Example operating systems can include the MAC OS® X series operating system, the WINDOWS® based operating system, or other operating systems. Upon execution of the operating system instructions, access to various system objects is enabled. Example system objects include data files, applications, functions, windows, etc. To facilitate an intuitive user experience, the system 100 includes a graphical user interface that provides the user access to the various system objects and conveys information about the system 100 to the user in an intuitive manner.

Figure 2:
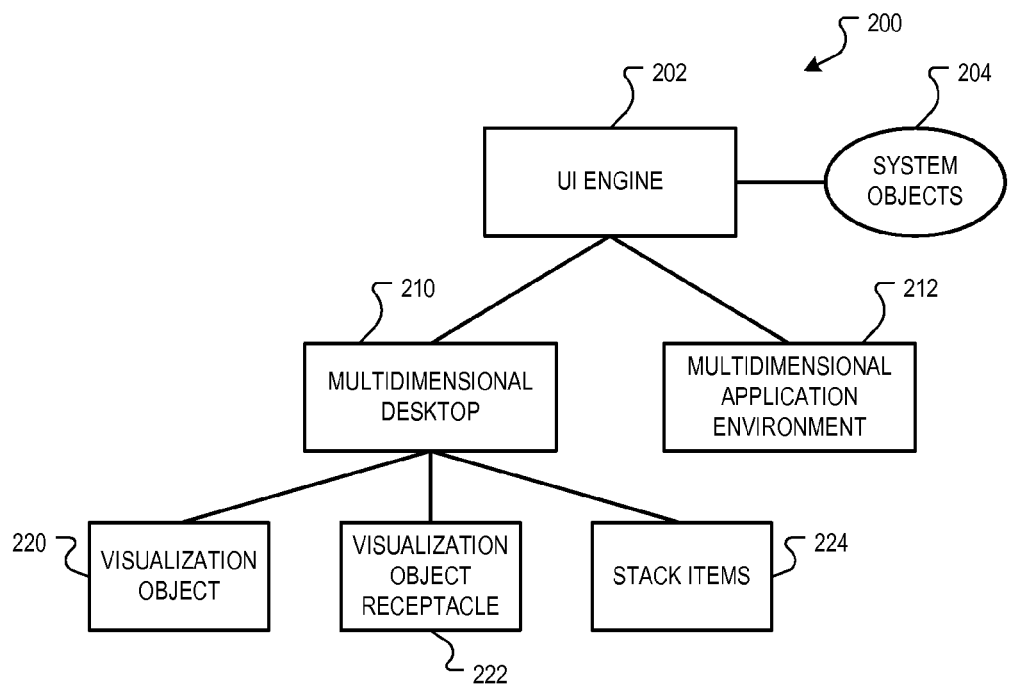
FIG. 2 is a block diagram of an example user interface architecture.

FIG. 2 is a block diagram of an example user interface architecture 200. The user interface architecture 200 includes a user interface (UI) engine 202 that provides the user access to the various system objects 204 and conveys information about the system 100 to the user.

Upon execution, the UI engine 202 can cause the graphics device 108 to generate a graphical user interface on an output device 112, such as a display device. In one implementation, the graphical user interface can include a multidimensional desktop 210 and a multidimensional application environment 212. In an implementation, the multidimensional desktop 210 and the multidimensional application environment 212 include x-, y- and z-axis aspects, e.g., a height, width and depth aspect. The x-, y- and z-axis aspects may define a three-dimensional environment, e.g., a "3D" or "2.5D" environment that includes a z-axis, e.g., depth, aspect.

In an implementation, the multidimensional desktop 210 can include use interface elements, such as visualization objects 220, a visualization object receptacle 222, and stack items 224. In some implementations, the visualization objects 220, the visualization object receptacle 222 and the stack items 224 can be presented in a pseudo-three dimensional (i.e., "2.5D") or a three-dimensional environment as graphical objects having a depth aspect.

A visualization object 220 can, for example, be a visual representation of a system object. In some implementations, the visualization objects 220 are icons. Other visualization objects can also be used, e.g., alert notification windows, menu command bars, windows, or other visual representations of system objects.

In an implementation, the multidimensional application environment 212 can include an application environment distributed along a depth aspect. For example, a content frame, e.g., an application window, can be presented on a first surface, and control elements, e.g., toolbar commands, can be presented on a second surface.

Figure 3:
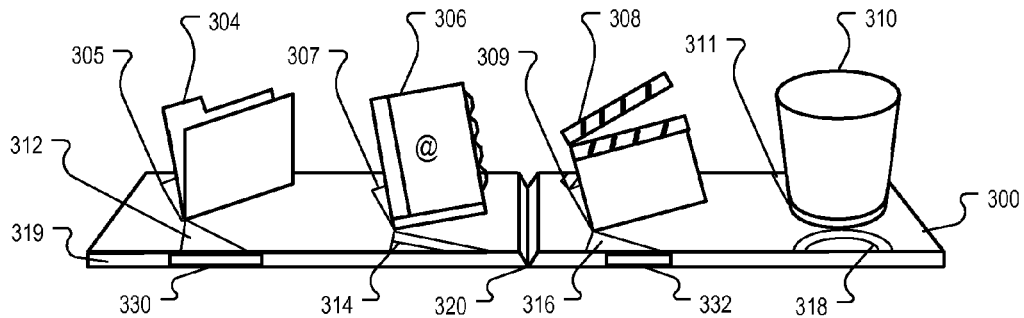
FIG. 3 is an image of an example visualization object receptacle.

FIG. 3 is an image of an example visualization object receptacle 300. In one implementation, the visualization object receptacle 300 can include x-, y- and z-axis aspects, e.g., a height, width and depth. In another implementation, the visualization object receptacle 300 can have only a y- and z-axis aspect, e.g., a width and depth. In another implementation, the visualization object receptacle 300 can have only an x- and y-axis aspect, e.g., a height and a width. An example implementation of a visualization object receptacle 300 is the "Dock" user interface in the MAC OS® X Leopard operating system. Other implementations can also be used.

In some implementations, or more visualization objects, e.g., icons 304, 306, 308 and 310 can be disposed within the visualization object receptacle 300, e.g., an icon receptacle 300. In one implementation, a lighting and shading effect is applied to emphasize the depth aspect of the visualization object receptacle 300, as illustrated by the corresponding shadows 305, 307, 309 and 311 and reflections 312, 314, 316 and 318 beneath each of the icons 304, 306, 308 and 310.

In some implementations, the visualization object receptacle 300 can include front surface 319 to generate a height aspect. In some implementations, a notch 320 can be included in the visualization object receptacle 300. The notch 320 can, for example, be utilized to arrange visualization objects related to particular programs or functions, e.g., files and folders can be disposed on a first side of the notch 320 and applications can be disposed on a second side of the notch 320; or a user may define arrangements according to the notch 320, etc.

In some implementations, the visualization object receptacle 300 can include status indicators, e.g., 330 and 332, disposed on the front surface 319. The status indicators 330 and 332 can, for example, appear as illuminations to indicate a status of a system object or function associated with a corresponding visualization object. In some implementations, the status indicators can be color coded based on an identified status. For example, the status indicator 330 may be illuminate in a yellow color to indicate that the folder 304 is receiving a file download, and the status indicator 332 may be illuminate in a green color to indicate that a program associated with the visualization object 308 is running.

In some implementations, the visualization object receptacle 300 may only define a depth aspect, e.g., the visualization object receptacle 300 may not include a front surface 319. In some implementations, the top surface of the visualization object receptacle 300 can be modeled as a liquid for addition and removal of visualization objects. For example, when a visualization object is added to the visualization object receptacle 300, the adjacent visualization objects may move apart to define an open space, and the added visualization object may emerge from the surface into the open space. Surface perturbations, e.g., ripples, can be generated to enhance the visual effect of the addition of the visualization object. Visualization objects can be removed by a substantially reversed visual effect.

In another implementation, when a visualization object is added to the visualization object receptacle 300, the adjacent visualization objects may move apart to define an open space, and the added visualization object may fall onto the surface into the open space. Surface perturbations, e.g., ripples and splashes, can be generated to enhance the visual effect of the addition of the visualization object. Visualization objects can be removed by a substantially reversed visual effect. Additional features of visualization object receptacles and visualization objects disposed therein are described in more detail below.

Figure 4:
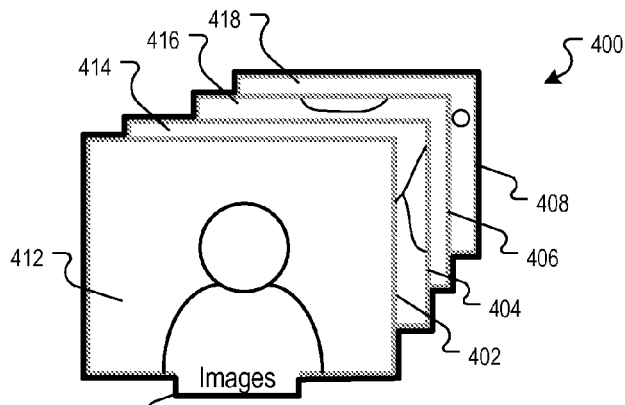
FIG. 4 is an image of an example stack item.

FIG. 4 is an image of an example stack item 400. In one implementation, the stack item 400 is a system object that includes a plurality of stack elements, e.g., stack elements 402, 404, 406 and 408, such as icons corresponding to system objects, or other visualizations of system objects. The stack item 400 is associated with the stack elements 402, 404, 406 and 408 so that selection of the stack item can provide access to any of the stack elements 402, 404, 406 and 408. In one implementation, a stack element can, for example, be realized by a corresponding visualization object of a system object. In another implementation, a stack element can, for example, be realized by a corresponding thumbnail icon of a system object. In another implementation, a stack element can, for example, be realized by a different corresponding icon of a system object. In another implementation, a stack element can, for example, be realized by a common stack element icon. Other stack element realizations with icons and/or other visualization objects can also be used.

In one implementation, a stack item identifier 410 can be displayed on the top stack element, e.g., stack element 402. In one implementation, the stack item identifier 410 can, for example, comprise a title describing a stack type, e.g., "images" or "documents." In another implementation, the stack item identifier 410 can, for example, comprise a visual indicator indicating an aspect of the stack, e.g., a dollar sign $ can be displayed for a stack item including system objects related to a financial analysis tool; or a representation of a coin can be displayed as a surface beneath the stack item, etc. The stack item identifier 410 can, for example, be automatically generated, or can be generated by the user. Other stack item identifiers can also be used.

In one implementation, the stack elements 402, 404, 406 and 408 are aggregated in an overlapping arrangement as shown in FIG. 4. Other stack arrangements can also be used. In one implementation, each stack element 402, 404, 406 and 408 displays a corresponding unique indicium 412, 414, 416 and 418, e.g., a thumbnail preview of an image associated with the stack element or the first page of a document associated with the stack element. Other unique indicium or unique indicia can also be used. For example, stack elements corresponding to images can be of the same aspect of the image, e.g., a 4×5 aspect, and 9×12 aspect, etc. Likewise, stack items corresponding to documents can be of the same aspect of a paper selection, e.g., an 8.5×11 aspect, an A4 aspect, etc. Other unique indicium or indicia can also be used, e.g., a document size and/or a document date can be displayed in each stack element, etc.

In some implementations, the stack elements 402, 404, 406 and 408 can be normalized to or in a similar display aspect. For example, stack elements corresponding to images of different aspects, e.g., a 4×5 aspect, and 9×12 aspect, etc., can be of the same display aspect by the addition of borders surrounding a thumbnail of the thumbnail image. Such normalization can facilitate a consistent presentation of system objects having inconsistent characteristics, e.g., different formatting sizes.

The stack item 400 can include visualization objects related to different types of system objects. For example, a stack item can include stack elements related to peripheral devices, e.g., hard drives, universal serial bus devices, etc.; or can include stack elements related to application windows; or can include stack elements related to system functions, e.g., menus, a shutdown function, a sleep function, a backup function, etc.; or can includes stack elements related to recent system alerts; or other system objects.

In some implementations, a stack item 400 can include visualization objects related to different system views. For example, the stack element 402 can correspond to a work environment; the stack element 404 can correspond to a gaming environment; the stack element 406 can correspond to a music environment; and the stack element 408 can correspond to a movie environment. Selection of any of the corresponding elements 402-408 can cause the user interface to transition to the corresponding environment.

In some implementations, a stack item 400 can include visualization objects related to multiple monitors. For example, if a monitor in a dual monitor user environment is disabled, the corresponding visualization objects displayed on the disabled monitor can collapse into a monitor stack on the remaining monitor.

Additional features of the stack items and corresponding stack elements are described in more detail below.

Figure 5:
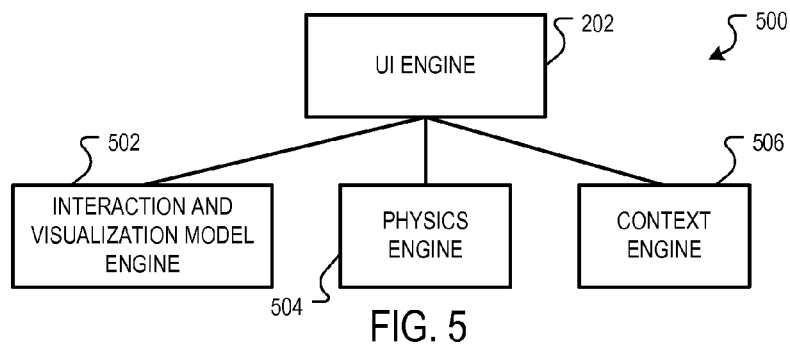
FIG. 5 is a block diagram of an example user interface engine architecture.

FIG. 5 is a block diagram of an example user interface engine architecture 500. The UI engine 202 can, for example, include an interaction and visualization model engine 502, a physics engine 504, and a context engine 506. Other engines can also be included.

In one implementation, the interaction and visualization model engine 502 can identify an association characteristic of associated visualization objects, e.g., icons. The associated graphical elements can be collectively displayed, e.g., in an object stack, or can be distributed in a desktop/folder hierarchy in which only one icon is displayed. Based on the identified characteristic, the interaction and visualization model engine 502 can automatically select an interaction model and/or visualization mode that defines how the user may interact with and view the associated graphical elements. For example, if an identified association characteristic is the quantity of associated icons, an interaction model and/or visualization model for browsing the documents related to the icons can be selected based on the quantity. For example, if the quantity of associated icons is less than a first threshold, e.g., four, a mouse-over of any one of the four associated icons can present the associated icons in juxtaposition. Likewise, if the quantity of associated icons is greater than the first threshold and less than a second threshold, e.g., 16, a mouse-over of any one of the associated icons can present the associated icons in an overlapping display in which the icons cycle from back to front. Additionally, if the quantity of associated icons is greater than the second threshold, then a mouse-over of any one of the associated icons can present a scrollable list of associated documents.

Other interaction models and visualization model selection schemes can also be implemented. For example, the interaction and visualization model engine 502 can cause related visualization objects to move across a user interface when a particular visualization object type is selected, e.g., selection of a word processing program icon may cause word processing document icons to move toward the word processing program icons. In another implementation, selection of a visualization object can cause unrelated visualization objects to be de-emphasize (e.g., reduce in size), and/or related visualization objects to be emphasized (e.g., increase in size). In another implementation, selection of a visualization object can cause related visualization objects to become illuminated.

In one implementation, the physics engine 504 can apply a physics aspect, such as Newtonian physics models based on mass, velocity, etc., to the visual representations of system objects, such as icons. In an implementation, the icons can be modeled as rigid bodies or non-rigid bodies. For example, placing an icon on a surface next to adjacent icons can cause the adjacent icons to shift positions in response to a simulated disturbance from the icon placement. In one implementation, icon magnetism can be selectively enabled or disabled by the user. In one implementation, icons return to their initial positions upon a disabling of the magnetism aspect. In another implementation, a magnet icon can have a magnetism aspect selected by the user, e.g., a magnetism with respect to a word processing application, or a magnetism with respect to two or more applications, or a magnetism with respect to the last time a document was accessed, e.g., within the last two days, etc.

Other physics models can also be applied. For example, an application icon can include a magnetism aspect, and placing the magnetic application icon on the desktop can cause icons related to the application icon, e.g., icons representing application document files, to be attracted to the magnetic icon and move towards the magnetic icon. Likewise, icons for unrelated system objects, e.g., other application icons and other document icons, can be modeled as having an opposite magnetic polarity from the selected magnetic icon, and thus will be repulsed and shift away from the selected magnetic icon.

The context engine 506 can, for example, provide contextual control of a stack item based on a context. For example, stack items, such as the stack item 400, can be defined according to a protection context. Accordingly, system objects corresponding to stack elements within the stack item cannot be deleted until dissociated from the stack item. In some implementations, a stack item 400 can have a locked context, and access to the stack item 400 can be password protected. Other contextual control can also be provided, such as contextual control based on a temporal context, e.g., a new object stack of recently added system objects; a download context, such as a download stack for recently downloaded files; or an execution context, or other context types.

Figure 6:
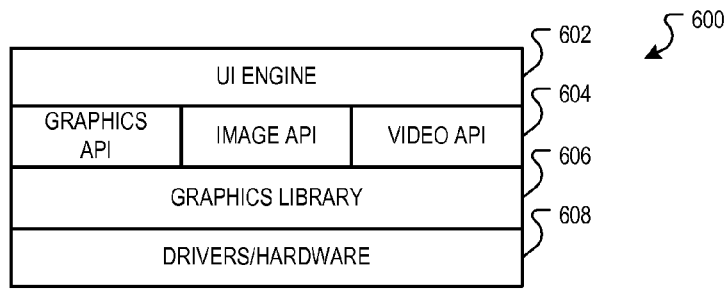
FIG. 6 is a block diagram of an example system layer structure that can be utilized to implement the systems and methods described herein.

FIG. 6 is block diagram of example system layers 600 that can be utilized to implement the systems and methods described herein. Other system layer implementations, however, can also be used.

In an implementation, a user interface engine, such as the UI engine 202, or another UI engine capable of generating a three-dimensional user interface environment, operates at an application level 602 and implements graphical functions and features available through an application program interface (API) layer 604. Example graphical functions and features include graphical processing, supported by a graphics API, image processing, support by an imaging API, and video processing, supported by a video API.

The API layer 604, in turn, interfaces with a graphics library layer 606. The graphics library layer 604 can, for example, be implemented as a software interface to graphics hardware, such as an implementation of the OpenGL specification. A driver/hardware layer 608 includes drivers and associated graphics hardware, such as a graphics card and associated drivers.

Figure 7:
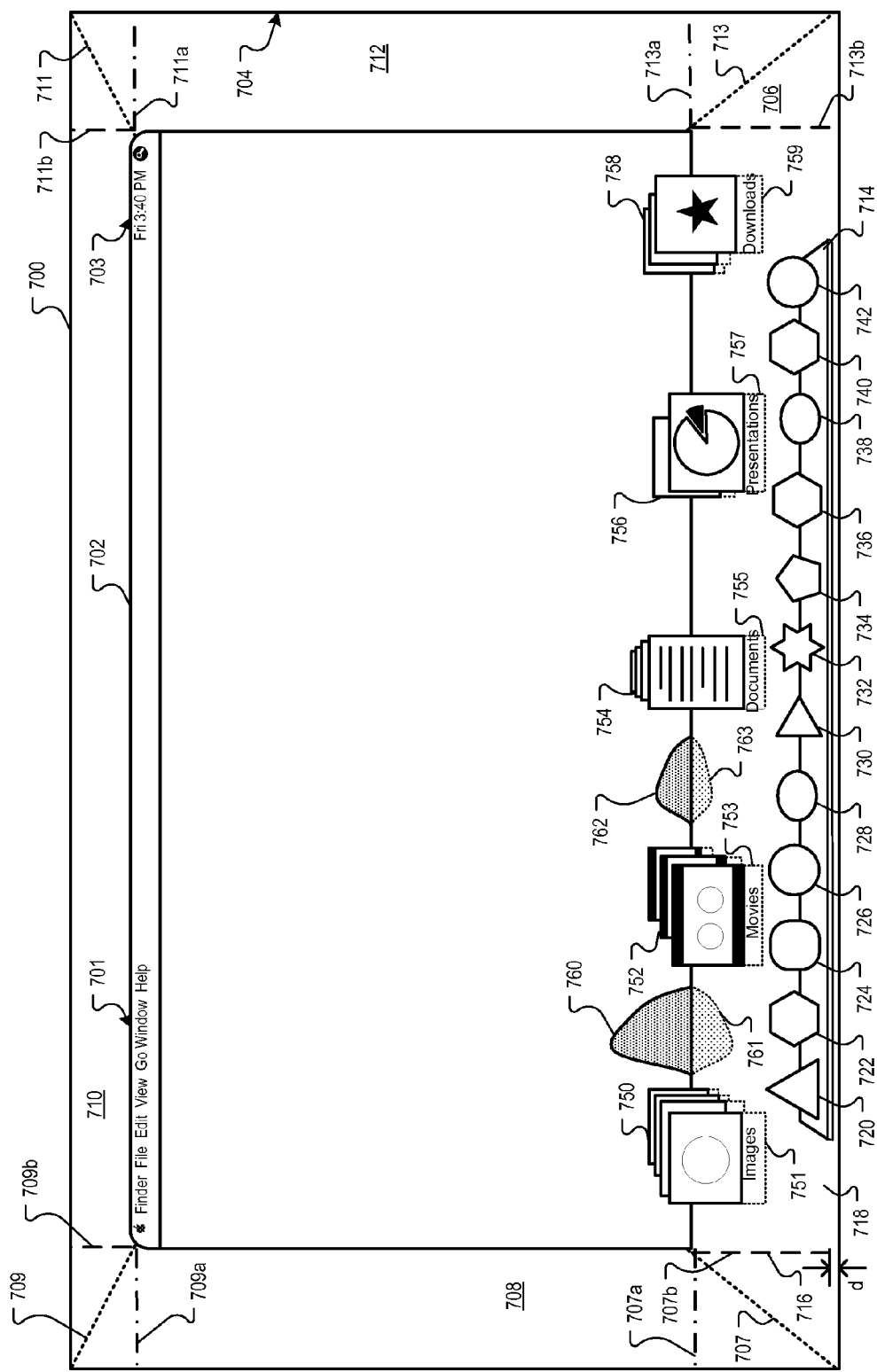
FIG. 7 is a block diagram of an example multidimensional desktop environment.

FIG. 7 is a block diagram 700 of an example multidimensional desktop environment. In the example implementation, the multidimensional desktop environment 700 includes a back surface 702 axially disposed, e.g., along the z-axis, from a viewing surface 704. In one implementation, the back surface 702 can, for example, be a two-dimensional desktop environment, including one or more menus 701 and 703. In one implementation, the viewing surface 704 can be defined by the entire image on a display device, e.g., a "front pane." One or more side surfaces, such as side surfaces 706, 708, 710 and 712, are extended from the back surface 702 to the viewing surface 704. A visualization object receptacle, e.g., an icon 714 is generated on one or more of the side surfaces, such as side surface 706. Although only one visualization object receptacle is shown, addition icon receptacles can also be displayed, e.g., along the side surface 708.

In one implementation, a reflection region 716 can be generated on the side surface 706, e.g., the "floor." In an implementation, a reflection of the back surface 702 and of graphical items placed on the reflection region 716 can be generated, e.g., shapes 760 and 762 generate reflections 761 and 763 in the reflection region 716.

In an implementation, the visualization object receptacle 714 is positioned at a forward terminus 718 of the reflection region 716. In one implementation, the forward terminus 718 can be offset by an axial distance d from the viewing surface 704. In another implementation, the forward terminus 718 can terminate at the plane defined by the viewing surface 704.

In an implementation, the side surfaces 706, 708, 710 and 712 can intersect at intersections 707, 709, 711 and 713, respectively. Although four side surfaces are shown in FIG. 7, fewer or greater numbers of side surfaces can be defined; for example, in an implementation, only side surfaces 706, 708 and 712 are defined, and there is an absence of a "top" side surface 710.

In an implementation, the intersections 707, 709, 711 and 713 of the side surfaces 706, 708, 710 and 712 can occur at different locations. For example, the multidimensional desktop environment can include intersections 707a, 709a, 711a and 713a that are horizontally disposed; or intersections 707b, 709b, 711b and 713b that are vertically disposed, or combinations of vertical, angled, and horizontal intersections.

In an implementation, the side surfaces 706, 708, 710 and 712 are colored to emphasize the back surface 702 and reflection region 716. For example, the side surfaces 706, 708, 710 and 712 can be black in color, or respective patterns or colors can be rendered on each side surface. Other differentiation schemes including color schemes and image schemes can also be applied.

The visualization object receptacle 714 can include a plurality of visualization objects, e.g., icons 720, 722, 724, 726, 728, 730, 732, 734, 736, 738, 740 and 742. The icons 720, 722, 724, 726, 728, 730, 732, 734, 736, 738, 740 and 742 can, for example, corresponding to one or more system objects, such as applications, documents, and functions. The visualization object receptacle 714 and icons 720, 722, 724, 726, 728, 730, 732, 734, 736, 738, 740 and 742 can include features as described with respect to the visualization object receptacle 300 of FIG. 3, and as described in more detail below.

In an implementation, stack items 750, 752, 754, 756 and 758 are interposed between the visualization object receptacle 714 and the back surface 702. The stack items 750, 752, 754, 756 and 758 can include features as described with respect to FIG. 4 above, and as described in more detail below. In the implementation of FIG. 7, the stack items 750, 752, 754, 756 and 758 define type associations, e.g., images, movies, documents, presentations, and downloads, respectively.

Other associations can also be used. The stack items 750, 752, 754, 756 and 758 can generate reflections 751, 753, 755, 757, and 759 in the reflection region 716.

Selection of a particular stack element in a stack item can, for example, launch an associated application if the stack element represents an application document; or perform a system function if the stack element represents a system function; or can instantiate some other system process.

In an implementation, a stack item can be placed on the visualization object receptacle 714. In another implementation, behavior of a stack item when in the visualization object receptacle 714 is similar to the behavior of the stack item when placed on the reflection region 716.

In an implementation, representations of system objects, e.g., icons, stack items, etc., can be disposed on the side surfaces 708, 710 and 712. For example, a window displayed on the back surface 702 can be selected and dragged to one of the side surfaces 708, 710, or 712. Likewise, a stack item, such as stack item 750, can be dragged and disposed on one of the side surfaces 708, 710, or 712.

In one implementation, a stack item is created when a representation of a system object, e.g., an icon, is placed on the surface of the reflection region 716. For example, an icon related to a document can be displayed on the surface 712; upon a selection, dragging and placement of the icon on the reflection region 716, a stack item is created with at least the icon as a stack element. In an implementation, a stack item can also be created by a keyboard input; for example, a user can create a stack item for open windows by a Ctrl-W input, or create a stack item for peripherals by a Ctrl-P input, etc. Other processes to create stack items can also be used.

In one implementation, existing stack items are displaced to provide space for a newly created stack item. In one implementation, the reflection region 716 can be defined by a surface aspect, such as an equable texture, and the stack items 750, 752, 754, 756 and 758 are displaced according to a physics model, e.g., a rigid-body Newtonian physics model. In another implementation, the reflection region 716 can be defined by a grid aspect, and the stack items 750, 752, 754, 756 and 758 are displaced according to a grid snap.

Other textures and surface behaviors can also be used. In one implementation, a motion model is dependent on a selected surface aspect. For example, an equable texture, such as an image of a hardwood floor or a polished metallic surface, can be associated with a rigid-body Newtonian physics model; conversely, a visible grid aspect, or a raised texture, such as an image of a carpet, pebbles, etc., can be associated with a grid snap. In another implementation, the motion mode and textures can be selected independently.

In one implementation, a maximum number of stack items can be displayed in the reflection region 716. Upon the insertion or creation of a new stack item, one or more existing stack items are removed from the reflection region 716. In one implementation, a consolidated stack item can be created. The consolidated stack item can, for example, be a collection of stack items with each stack item being represented by a corresponding stack element. Selection of a corresponding stack element in a consolidated stack item will cause the corresponding stack item to be positioned on the reflection region, and will likewise cause another stack item to be positioned in the consolidated stack item.

In another implementation, one or more existing stack items can be removed from the reflection region 716 by transitioning to an edge of the reflection region 716 and fading from view, e.g., the stack item 750 may shift towards the intersection 707 and fade by an atomizing effect, by a falling effect, or by some other effect. In another implementation, one or more existing stack items are removed from the reflection region 716 by transitioning to an edge of the reflection region 716 and moving onto one of the side surfaces, e.g., the stack item 750 may shift towards the intersection 707 and move up the side surface 708.

Figure 8:
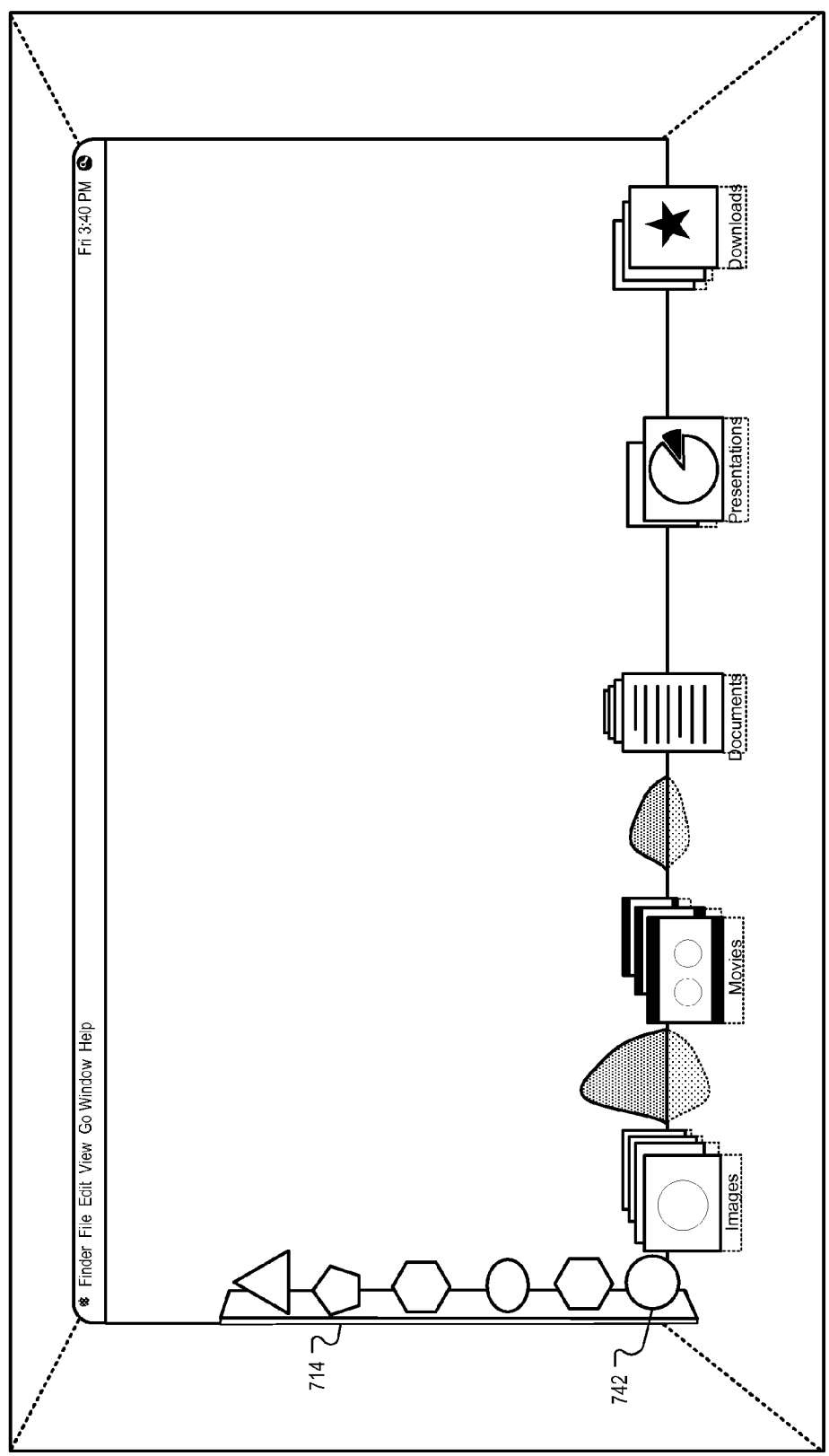
FIG. 8 is another block diagram of the example multidimensional desktop environment.

FIG. 8 is another block diagram 800 of the example multidimensional desktop environment. In the block diagram of FIG. 8, the visualization object receptacle 714 has been adjustably disposed along a depth axis, e.g., a z-axis, such that the visualization object receptacle 714 is disposed on the back surface 702. In one implementation, the visualization object receptacle 714 can, for example, be preeminently displayed. The visualization object receptacle 714 can, for example, be preeminently displayed by rendering the visualization object receptacle 714 in front of other graphical objects. For example, the icon 742 in the visualization object receptacle 716 is displayed in front of the stack item 750. Other methods can be used to preeminently display the visualization object receptacle 714, such as rendering graphical objects displayed in front of the visualization object receptacle as translucent objects.

Figure 9:
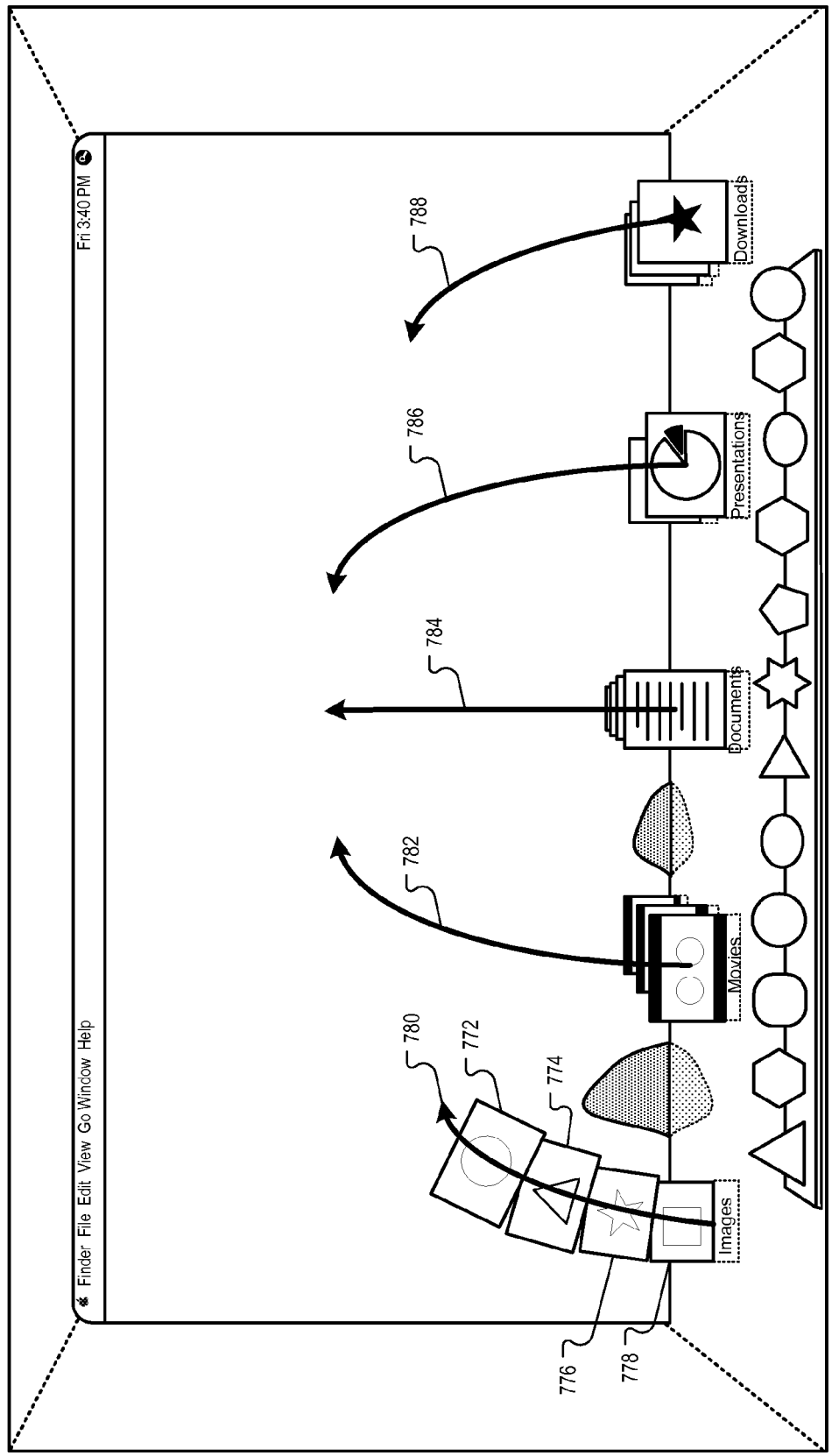
FIG. 9 is another block diagram of the example multidimensional desktop environment.

FIG. 9 is another block diagram 900 of the example multidimensional desktop environment. The system implementing the multidimensional desktop environment graphical user interface, such as the system 100 of FIG. 1, has received a selection command for the stack item 750. A selection command for a stack item can be generated by, for example, a mouse-over, a mouse click, a keyboard input, or by some other input.

In the implementation shown in FIG. 9, a visualization model that causes the stack elements 772, 774, 776 and 778 to be arranged in an overlapping fan is applied to the stack item 750. Thus, in response to a user input, e.g., a selection or a mouse over, the first stack item 750 enters a second modal state from a first modal state and the forward most stack element 772 fans upward, followed by the stack items 774 and 776. While the stack item 750 is selected, a user can, for example, select and open a document related to one of the stack elements 772, 774, 776 and 778 by positioning a cursor on one of the stack elements 772, 774, 776 and 778 and selecting the element (e.g., clicking on the element with a mouse cursor). Deselection of the stack item 750, e.g., ceasing the mouse over, causes the stack elements 772, 774, 776 and 778 to collapse back into the stack item 750, and the stack item returns to the first modal state. Other selection processes can also be used.

In one implementation, the stack elements 772, 774, 776 and 778 fan according to a fixed fanning path 780. In another implementation, the stack elements 772, 774, 776 and 778 can fan according to a path defined by a mouse input received from a user. In another implementation, a fanning can define a path toward a central region, and thus the stack elements of each stack may fan according to respective fanning paths 780, 782, 784, 786, and 788.

In one implementation, one of several interaction and/or visualization models can be automatically selected for application to a stack item, such as the stack item 750. The selection can, for example, be based on a characteristic of the stack item 750, e.g., the number of stack elements 772, 774, 776 and 778, the type of the stack elements 772, 774, 776 and 778, or some other characteristic. For example, if an identified association characteristic is the quantity of associated icons, a visualization and/or interaction model for browsing and interacting with the documents related to the icons can be selected based on the quantity. If the quantity of associated icons is greater than a first threshold, e.g., three, a mouse-over of any one of the stack elements 772, 774, 776 and 778 can present the stack elements 772, 774, 776 and 778 in the fanning arrangement as shown in FIG. 9.

Other interaction and/or visualization model selection criterion or criteria can also be used. For example, stack elements related to documents in the stack item 754 can be displayed in an overlapping leafing mode in which the document titles appear, as the user is more likely to discern the relevance of a document from the title than a thumbnail image of a first page of a document.

Figure 10:
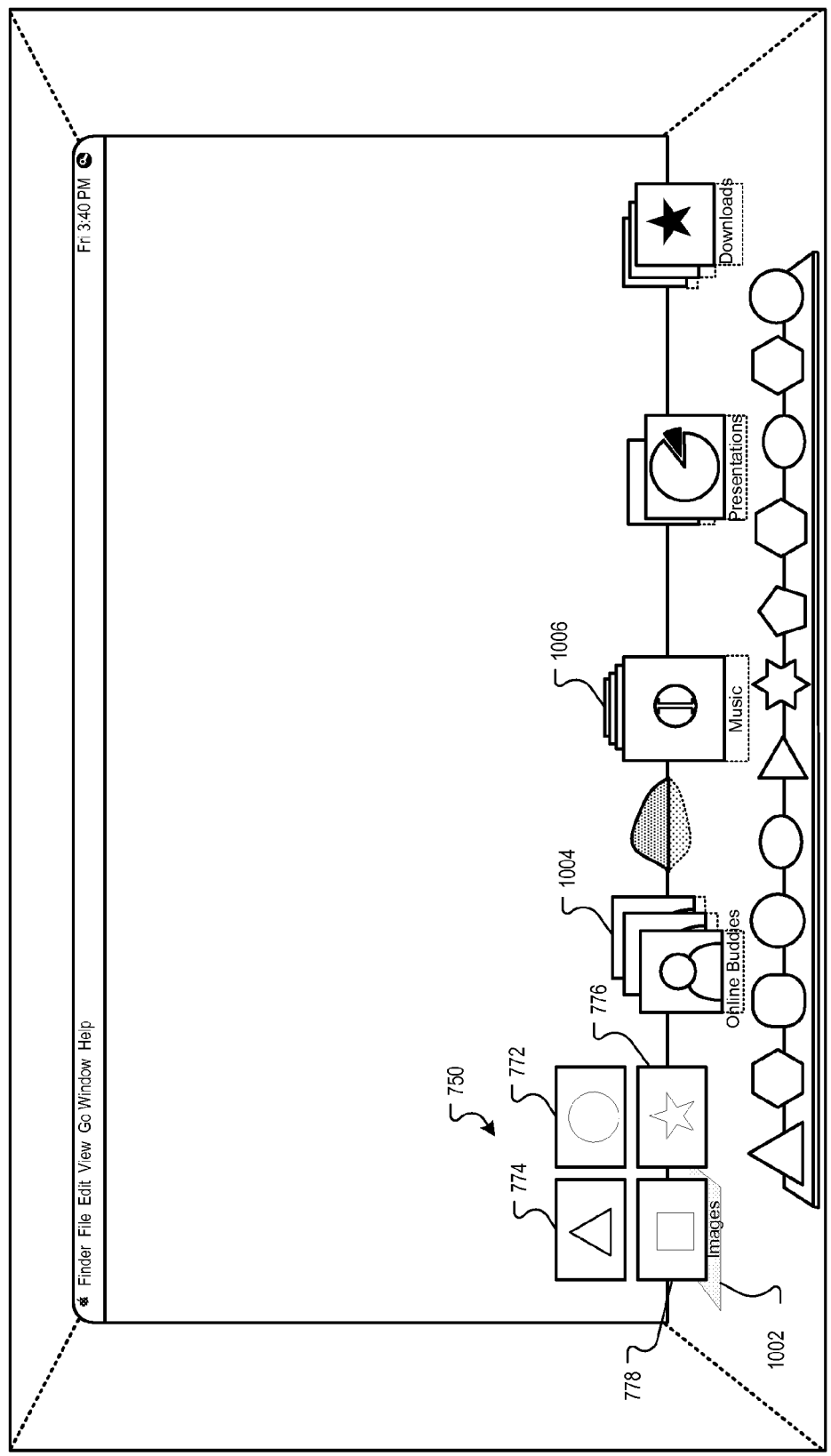
FIG. 10 is another block diagram of the example multidimensional desktop environment.

FIG. 10 is another block diagram 1000 of the example multidimensional desktop environment. The system implementing the multidimensional desktop environment graphical user interface, such as the system 100 of FIG. 1, has received a selection command for the stack item 750, and a visualization model that causes the stack elements 772, 774, 776 and 778 to be arranged as single instances, e.g., single icons, in a matrix display is automatically selected and applied to the stack item 750. In the implementation of FIG. 10, the selection criterion can, for example, be based on a quantity. For example, if the quantity of associated icons is less than a first threshold, e.g., five, a selection of the stack item 750 can present the stack elements 772, 774, 776 and 778 in substantial juxtaposition as shown in FIG. 10.

In one implementation, a selection indicator can be generated to indicate a selected stack item. For example, an underlighting effect 1002 can be generated to indicate selection of the stack item 750. Other selection indicators can also be used, such as backlighting effects, enlargement effects, outlining effects, or other effects.

Additional stack items 1004 and 1006, corresponding to the categories of online buddies and music, are also displayed in the block diagram 1000. In one implementation, stack items, such as stack items 1004 and 1006, can be contextually controlled. For example, in one implementation, the stack item 1004 can automatically appear when the system implementing the graphical user interface of FIG. 10, such as the system 100 of FIG. 1, receives a notification that an event associated with another user that is designated as an "online buddy" has occurred, e.g., the "online buddy" has logged onto a network.

In another implementation, a stack item, such as the stack item 1006, can automatically appear when an application corresponding to the stack item is selected or executed. For example, selecting the icon 732, which illustratively corresponds to a music application, will instantiate the stack item 1006 in accordance with a selection and/or execution context.

Other contextual controls can also be used, such as modal states, temporal contexts, etc.

Figure 11:
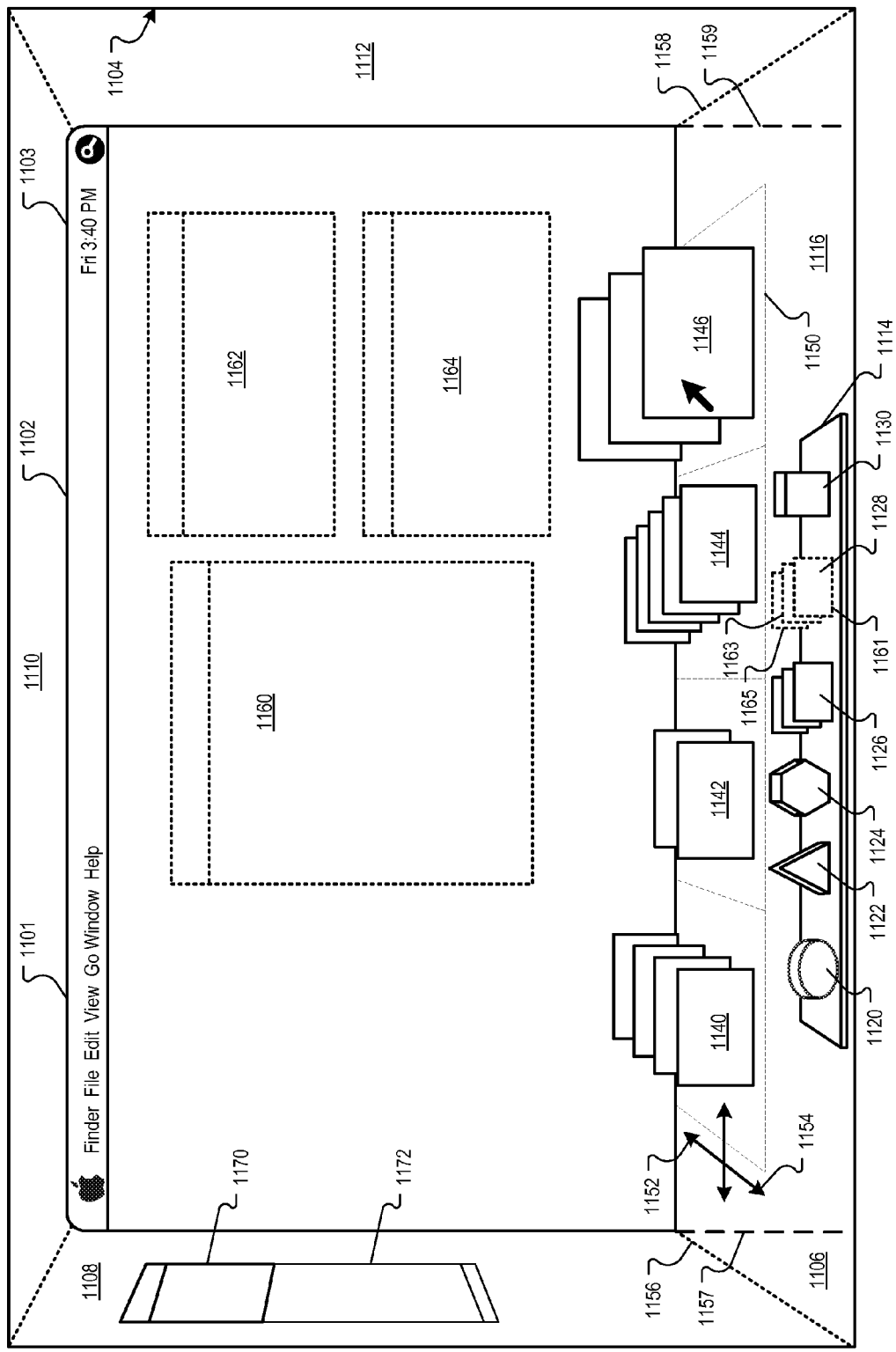
FIG. 11 is a block diagram of another example multidimensional desktop environment.

FIG. 11 is a block diagram of another example multidimensional desktop environment. The multidimensional desktop environment of FIG. 11 includes a back surface 1102 axially disposed, e.g., along the z-axis, from a viewing surface 1104. In one implementation, the back surface 1102 can, for example, be a two-dimensional desktop environment, including one or more menus 1101 and 1103. In one implementation, the viewing surface can be defined by the entire image on a display device, e.g., a "front pane." One or more side surfaces, such as side surfaces 1106, 1108, 1110 and 1112, are extended from the back surface to the viewing surface. A visualization object receptacle 1114 is generated on one or more of the side surfaces, such as side surface 1106.

In one implementation, a reflection region 1116 can be generated on the side surface 1106, e.g., the "floor." The reflection region 1116 can, for example, generate a reflection of the back surface 1102 and desktop items placed on the reflection region 1116.

In an implementation, the side surfaces 1106, 1108, 1110 and 1112 are colored to emphasize the back surface 1102 and the reflection region 1116. For example, the side surfaces 1106, 1108, 1110 and 1112 can be black in color, or respective patterns, colors, or images can be rendered on each side surface. Other differentiation schemes including color schemes and image schemes can also be applied.

The visualization object receptacle 1114 can include a plurality of visualization objects, e.g., icons 1120, 1122, 1124, 1126, 1128 and 1130. The icons 1120, 1122, 1124, 1126, 1128 and 1130 can, for example, include visualization objects corresponding to one or more system objects, such as applications, documents, and functions. For example, icons 1120, 1122 and 1124 can correspond to applications; icons 1126 and 1128 can correspond to stack items; and icon 1130 can correspond to a deletion function. Other system objects can also be represented, such as file items, peripheral items, etc.

In an implementation, stack items 1140, 1142, 1144 and 1146 are interposed between the visualization object receptacle 1114 and the back surface 1102. A selection indicator can, for example, be generated to indicate a selected stack item. For example, an enlargement effect can be used to indicate a selection of the stack item 1146. Other selection indicators can also be used.

In an implementation, the reflection region 1116 can be defined by a grid aspect 1150, and the stack items 1140, 1142, 1144 and 1146 are displaced according to a grid snap. In one implementation, the grid aspect 1150 can be visible, e.g., a grid outline, or an association with a texture image. In another implementation, the grid aspect can be invisible.

In another implementation, stack items can be scrolled from side-to-side and/or from front-to-back (or back-to-front) on the surface 1106. For example, upon a selection of the surface 1106, e.g., by clicking on the surface 1106, the surface 1106 can be scrolled in the directions indicated by the arrows 1152 and 1154. The floor surface can include a scroll ingress and a scroll egress in which a scroll direction transitions from the scroll ingress to the scroll egress. For example, intersections 1156 and 1158 may define a scroll ingress and a scroll egress for a left-to-right scroll direction, or the left edge 1157 and the right edge 1159 of the reflection region 1116 may define a scroll ingress and a scroll egress for a left-to-right scroll direction. In one implementation, stack items are emplaced on the floor surface 1106 at the scroll ingress 1156 (or 1157), and displaced from the floor surface 1106 at the scroll egress 1158 (or 1159). In one implementation, one or more existing stack items are displaced from the surface 1106 by fading from view, e.g., fading by an atomizing effect, by a falling effect, or by some other effect.

In another implementation, one or more existing stack items are displaced from the surface 1106 moving onto one of the side surfaces, e.g., surface 1112. In another implementation, one or more existing stack items are removed from the surface 1106 by moving into a stack element that includes displaced stacks, e.g., "anchor" stacks near the intersections 1156 and 1158.

In one implementation, windows, such as windows 1160, 1162 and 1164, can be displayed on the back surface 1102. The windows 1160, 1162 and 1164 can, for example, be selected and placed on one or more of the surfaces 1106, 1108, 1110 and 1112. In one implementation, placing a window on one of the surfaces, such as the reflection region 1116 of the surface 1106, generates a stack item having the selected window as a stack element. Selecting the stack item can, for example, cause the window to reappear in the original position on the back surface 1102.

In one implementation, placing a window on one of the surfaces, such as the surface 1108, generates a representation of the window, e.g., a window thumbnail 1170 on surface 1108. The corresponding window can, for example, be restored by dragging the window thumbnail onto the back surface 1102, or by selecting and double-clicking on the window thumbnail 1170, or by some other command invocation.

In one implementation, a lighting aspect can generate a shadow and/or reflection for representations of system objects placed on a side surface. For example, a lighting aspect can generate a reflection or shadow 1172 of the window thumbnail 1170. In one implementation, a shadow and/or reflection cast on the reflection region 1116 from the back surface 1102 can be limited to a selected representation of a system object. For example, if the window 1160 is currently selected, the shadow or reflection on the reflection region 1116 can be limited to the window 1160, and the remaining windows 1162 and 1164 will not generate a reflection.

In another implementation, the lighting aspect can generate an illumination effect from the window thumbnail 1170 onto one or more surfaces. For example, the illumination effect can comprise a simulated sunbeam emanating from the window 1170. In one implementation, the illumination effect can change according to local environmental states, e.g., the sunbeam can track across the surfaces according to a local time; the intensity of the sunbeam can be modulated according to the local time and local weather conditions that are received over the network 118, e.g., high intensity for sunny days, low intensity for overcast days and during the early evening, and/or being eliminated after a local sunset time and generated after a local sunrise time.

In another implementation, the lighting aspect described above can be associated with a weather widget that can be displayed on one or more of the surfaces. Selection of the weather widget can, for example, provide a detailed weather summary of a selected region.

In another implementation, a stack item, such as the stack item 1128, can be operatively associated with window instances, such as windows 1160, 1162 and 1164. In one implementation, the windows 1160, 1162 and 1164 are minimized as stack elements 1161, 1163 and 1165, respectively, in the stack item 1128 in response to a first command, and the windows 1160, 1162 and 1164 are displayed on the back surface 1102 from the minimized state in response to a second command.

In an implementation, the first and second commands are toggle commands. For example, selection of the entire stack item 1128, e.g., by receiving a click command substantially concurrently with a mouse-over on the stack item 1128, can cause all windows associated with the stack element, e.g., windows 1160, 1162 and 1164, to appear on the back surface 1102. Upon cessation of the click command, the windows 1160, 1162 and 1164 revert to the minimized state.

In another example implementation, selection of a stack element, such as selection of the stack element 1163 by receiving a click command after a cursor has hovered over the stack element 1163 in excess of a time period, can cause the stack element 1163 to be removed from the stack item 1128. In response, the window 1162 can reappear on the back surface 1102.

In an implementation, the lighting aspect can be configured to generate a shadow effect for each representation of a system object. For example, a selected window can cast shadows on subsequent windows to emphasize a depth aspect and an overall user interface relationship; a stack item can cast a shadow on adjacent representations of systems objects;

selecting an dragging an icon can cause a shadow of the icon to be generated on the side and back surfaces as the icon is moved, etc.

Figure 12:
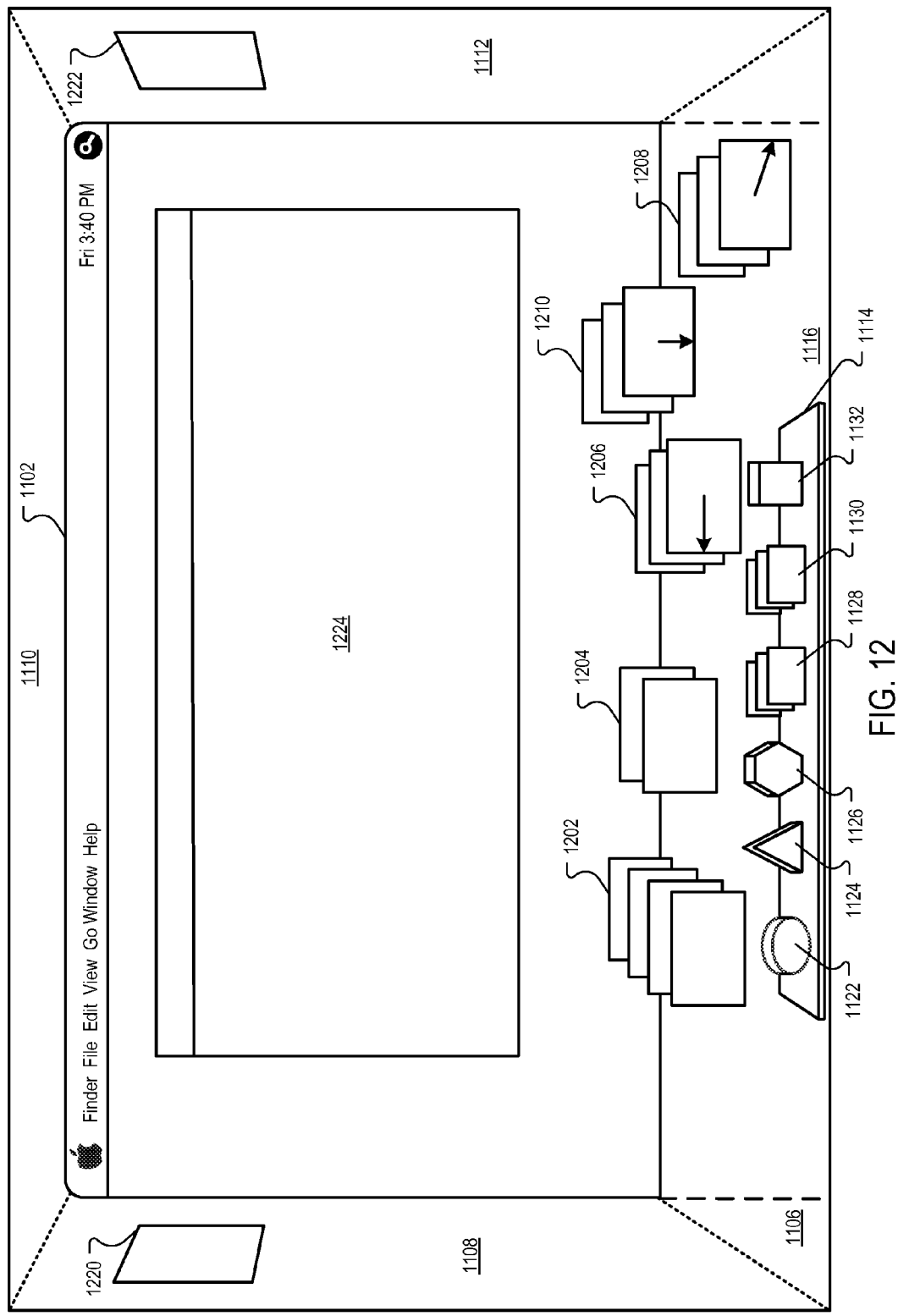
FIG. 12 is a block diagram of another example multidimensional desktop environment.

FIG. 12 is a block diagram of another example multidimensional desktop environment. In the implementation of FIG. 12, the reflection region 1116 is defined by surface aspect having an equable texture on which stack items are displaced in response to a new stack item. For example, the stack items 1202, 1204, 1206 and 1208 can move in response to the addition of a new stack item 1210. As the new stack item 1210 drops onto the surface 1106, the stack items 1206 and 1208 move in response to the displacement induced by the new stack item 1210.

In one implementation, a maximum number of stack items can be displayed on the surface 1106. If the addition of a new stack item causes the number of displayed stack items to be exceeded, then a stack item nearest a surface intersection can be displaced from the surface. For example, if the maximum number of stack items to be displayed is four, then the stack item 1208 can continue to move to the edge of the surface 1106, where the stack item 1208 is displaced, e.g., fades from view, atomizes, etc.

In one implementation, the surfaces 1108 and 1112 can, for example, display specific types of desktop items. For example, the surface 1108 can display a file desktop item 1220, e.g., a document icon, and the surface 1112 can display a program desktop item, e.g., an application icon 1222. In one implementation, the file desktop item 1220 corresponds to an open file in an application window 1224, and the application icon 1222 corresponds to the executing application.

In another implementation, a plurality of file desktop items and application desktop items can be displayed on the respective surfaces 1108 and 1112. For example, the surface 1112 can display two icons corresponding to two executing applications. Selection of one of the application icons can, for example, cause corresponding application windows to be displayed on the back surface 1102 and corresponding document icons to be displayed on the surface 1108.

Figure 13:
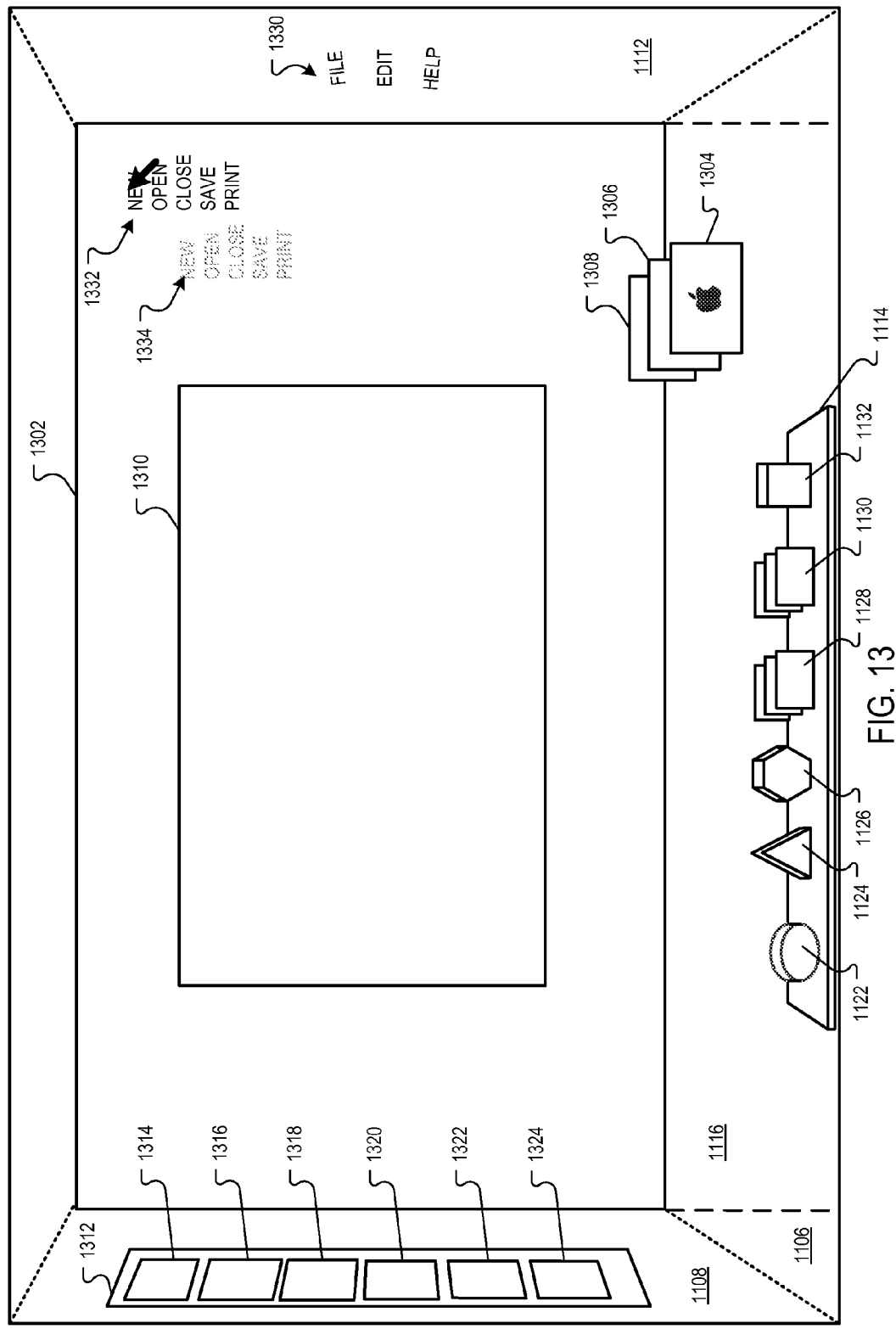
FIG. 13 is a block diagram of another example multidimensional desktop environment.

FIG. 13 is a block diagram of another example multidimensional desktop environment. In this example implementation, the back surface 1302 does not include menu items, e.g., menus 1101 and 1103. A stack item 1304 is utilized to access menus corresponding to menus 1101 and 1103 by selecting stack elements 1306 and 1308, respectively. In one implementation, selection of the stack item 1304 and a positioning of the stack item onto the back surface 1302 can cause corresponding menu items 1101 and 1103 to reappear at the top of the back surface 1302.

The multidimensional desktop environment of FIG. 13 can, for example, also facilitate a multidimensional application environment. For example, an application content presentation surface 1310, e.g., an application instance displaying editable data, can be displayed on the back surface 1302, and one or more application control elements can be displayed on one or more side surfaces. For example, a tool bar 1312 can be displayed on the surface 1108 to provide access to toolbar function buttons 1314, 1316, 1318, 1320, 1322 and 1324.

Likewise, menu items 1330 can be displayed on the surface 1112. In one implementation, selection of a menu item generates a textual menu that is axially disposed so that the textual menu appears to be suspended between the back surface 1302 and the viewing surface. For example, selecting the "File" menu from the menu items 1330 can generate the floating textual menu 1332, which can, for example, include a shadow effect 1334 on the back surface 1302.

Figure 14:
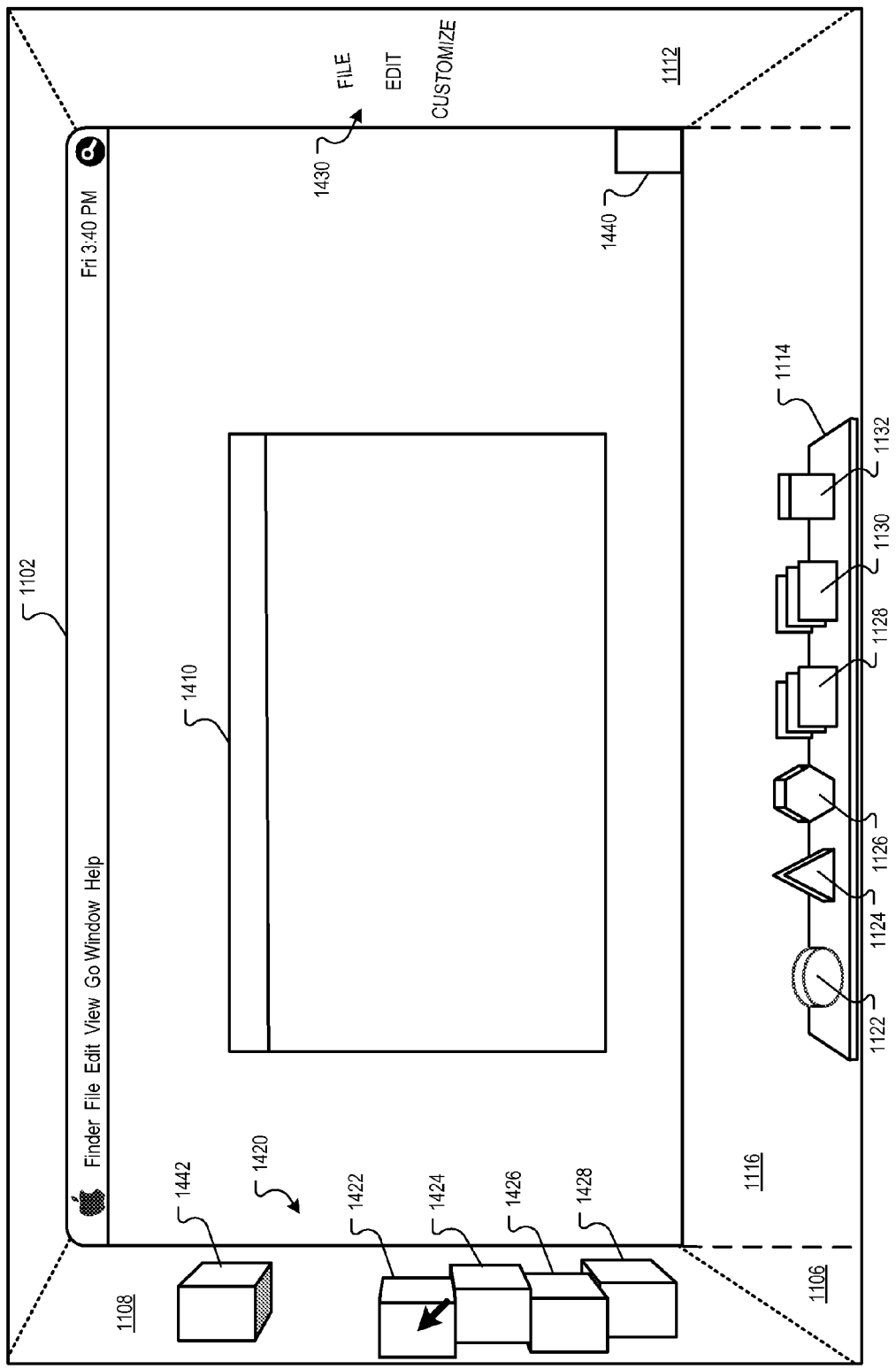
FIG. 14 is a block diagram of another example multidimensional desktop environment.

FIG. 14 is a block diagram of another example multidimensional desktop environment. The multidimensional desktop environment of FIG. 14 also facilitates a multidimensional application environment. For example, an application content frame 1410, e.g., a window displaying editable data, can be displayed on the back surface 1102, and one or more application control elements can be displayed on one or more side surfaces. For example, a three-dimensional function icon arrangement 1420 can be displayed on the surface 1108, and menu items 1430 can be displayed on the surface 1112.

The three-dimensional function icon arrangement 1420 can, for example, include three-dimensional function icons 1422, 1424, 1426 and 1428. In one implementation, each three-dimensional function icon 1422, 1424, 1426 and 1428 includes an function command on each surface, and each three-dimensional function icon 1422, 1424, 1426 and 1428 can be rotated, positioned, and manipulated through the use of an input device, such as a mouse.

In an implementation, three-dimensional function icons can be added to the surface 1108 by use of a menu, such as, for example, the "Customize" menu on the surface 1112. In an implementation, a physics model can be applied to model rotation, movement and displacement of the three-dimensional function icons 1422, 1424, 1426 and 1428. For example, removing the three-dimensional function icon 1428 can cause the remaining three-dimensional function icons 1422, 1424 and 1426 to "fall" in a downward direction on the surface 1108.

In an implementation, a three-dimensional login visualization object 1442 can be utilized to facilitate user logins and/or user environments. For example, three sides of the login visualization object 1442 may correspond to login/logout commands for users; and the remaining three sides of the cube can correspond to user environments and/or other user-definable functions for a current user session.

In an implementation, a portal 1440 can be included on a surface, such as the back surface 1102. The portal 1440 can be selected to transition to another multi-dimensional environment. In one implementation, the portal 1440 can facilitate transitioning between different application environments, e.g., between two applications that are currently executing. In another implementation, the portal can facilitate transitioning between different multi-dimensions desktop environments, e.g., from a first environment configured for a work environment to a second environment configured for a leisure environment. In another implementation, the portal 1440 can facilitate transitioning between a two-dimensional desktop environment and a three dimensional desktop environment. Other transitions can also be facilitated by the portal 1440.

Figure 15:
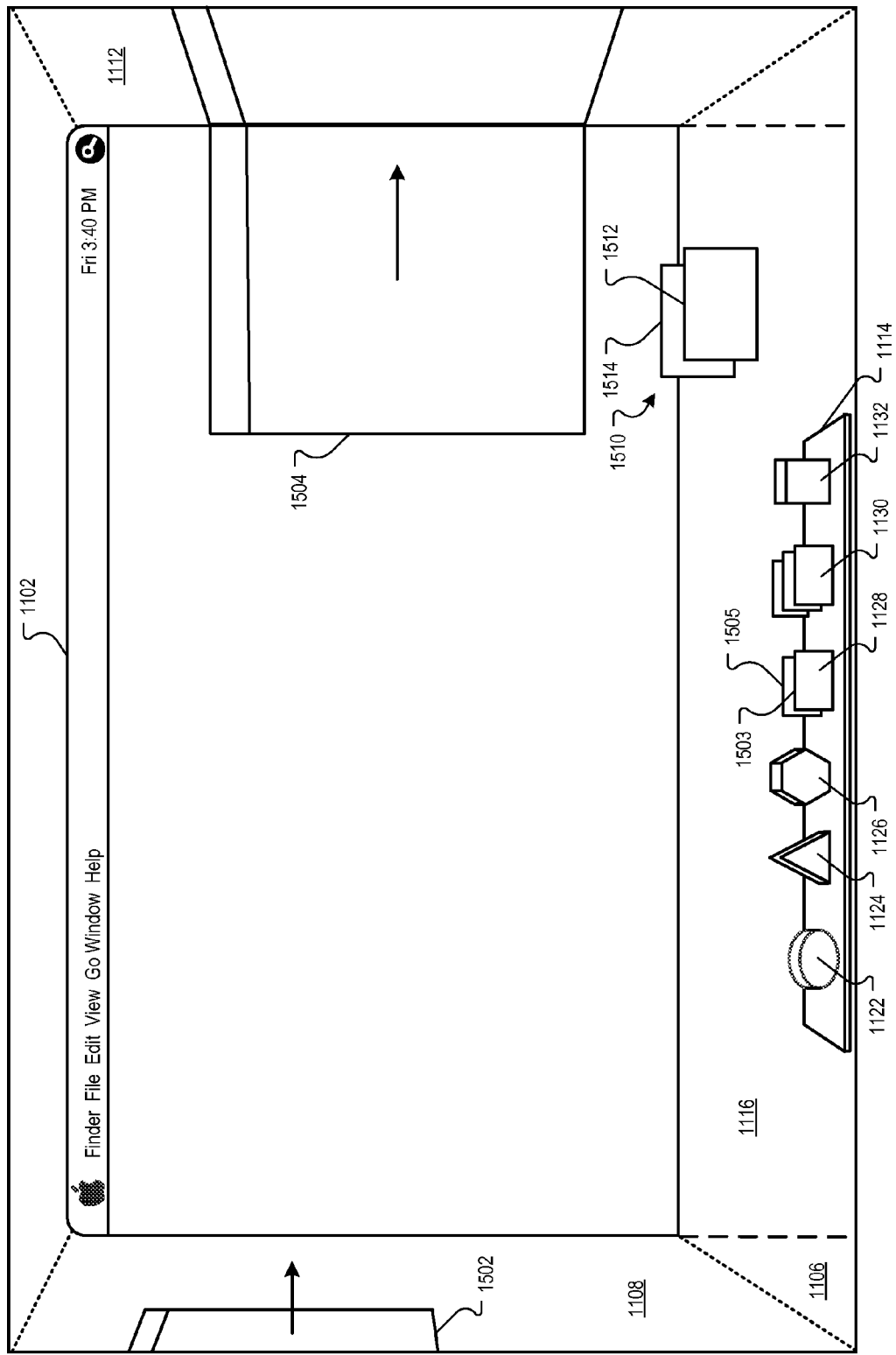
FIG. 15 is a block diagram of another example multidimensional desktop environment.

FIG. 15 is a block diagram of another example multidimensional desktop environment. In the implementation FIG. 15, windows can be dragged or displaced across one or more surfaces. For example, the stack item 1128 can include stack elements 1503 and 1505 that correspond to windows 1502 and 1504, respectively. In one implementation, selection of a stack element, such as stack element 1503, causes the corresponding window 1502 to transition into view from the surface 1108 and onto the back surface 1102. Likewise, the window 1504, corresponding to the unselected stack element 1505, transitions out of view by sliding across the back surface 1102 and the surface 1112. Other processes to displace, hide, or otherwise deemphasize system objects, such as windows, can also be used.

In an implementation, a stack item 1510 can include stack elements 1512 and 1514 that correspond to portals. For example, selection of the stack element 1512 can transition the graphical user interface to a two-dimensional desktop, and selection of the stack element 1514 can transition to another application environment.

Additional features can also be realized by other implementations. For example, in one implementation, each surface in the multidimensional desktop environment can implement different behavior and/or functional characteristics. In one implementation, each surface can implement different presentation characteristics. For example, on the bottom surface 1106, icons and other system object representations can be displayed according to a large scale; on the side surface 1108, icons and other system object representations can be displayed according to a small scale; on the back surface 1102, icons and other system object representations can be displayed in a list format; etc. Selecting and dragging an icon or other system object representation from one surface to another will likewise cause the icon and other system object representation to be displayed according to the presentation characteristic of the surface upon which the icon and other system object representation is finally disposed.

In another implementation, a surface can implement a deletion characteristic. For example, the last access time for icons and other system object representations can be monitored. If the last access time for an icon or other system object representation exceeds a first threshold, the icon or other system object representation can be automatically transitioned to the surface implementing the deletion characteristic, e.g., surface 1112. Additionally, if the last access time for the icon or other system object representation located on the surface 1112 exceeds a second threshold, the icon or other system object representation can be automatically deleted from view.

In one implementation, a configuration tool can be used to facilitate configuration of the surface characteristic of each surface by the user. For example, a configuration menu can present one or more presentation characteristics for associated with one or more surfaces. The one or more presentation characteristics can, for example, be associated by check boxes associated with each surface. Other configuration tools can also be used.

Figure 16A:
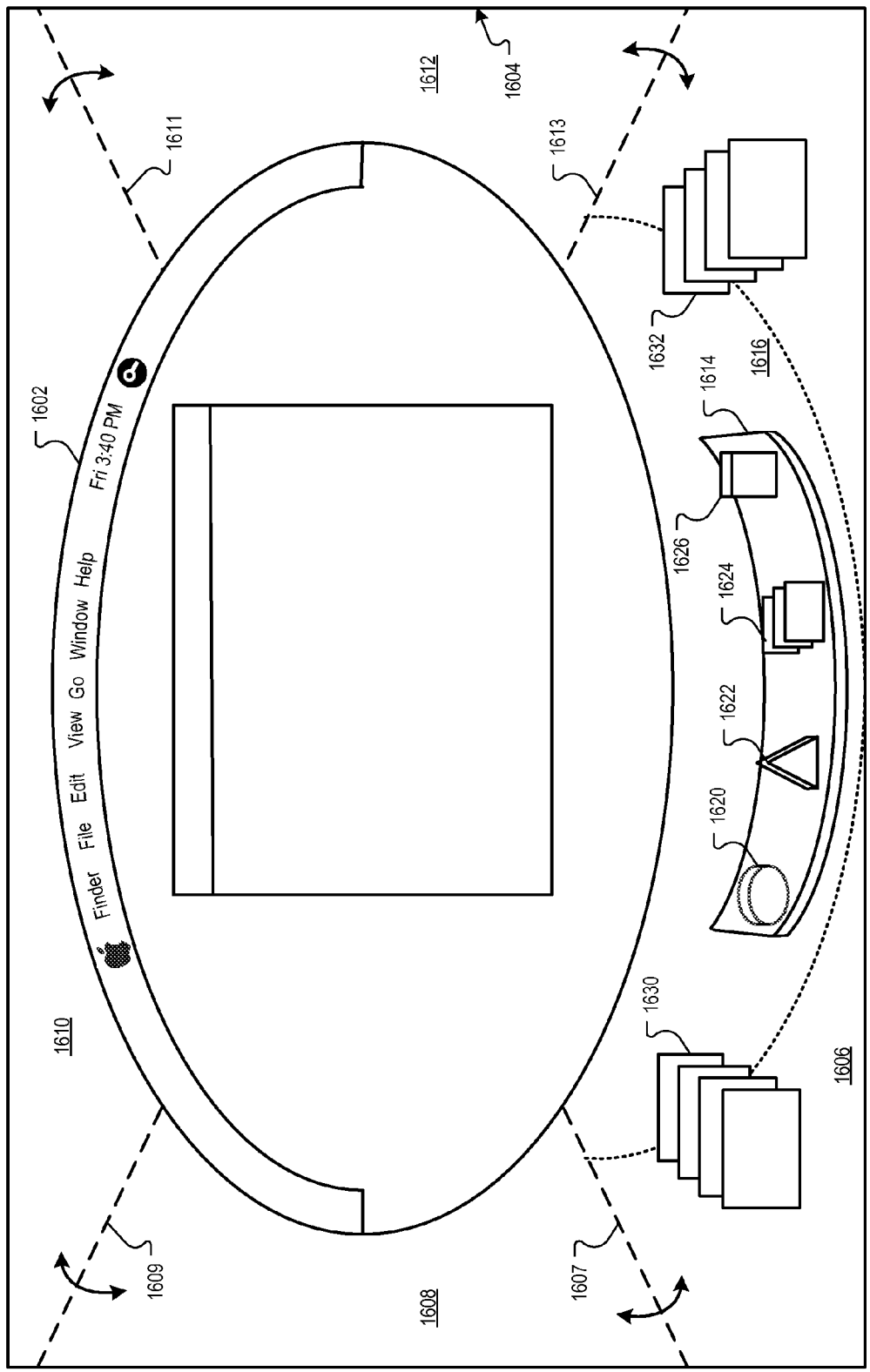
FIGS. 16A-D are block diagrams of other example multidimensional desktop environments.

FIG. 16A is a block diagram of another example multidimensional desktop environment. The multidimensional desktop environment of FIG. 16A can, for example, implement the features described with respect to FIGS. 2-5 and 7-15. In the example implementation, the multidimensional desktop environment 1600 includes an arcuate back surface 1602 that is axially disposed, e.g., along the z-axis, from a viewing surface 1604. In one implementation, a reflection region 1116 can be generated on the side surface 1606, e.g., the "floor." In an implementation, the side surfaces 1606, 1608, 1610 and 1612 can be defined by arcuate regions having curvature intersections 1607, 1609, 1611 and 1613, respectively.

A curved visualization object receptacle 1614 can include visualization object 1620, 1622, 11624 and 1626 and can be positioned on a reflection region 1616. Stack items 1630 and 1632 can, for example, be positioned near the curvature intersections 1607 and 1609, respectively. Other arrangements can also be used.

Other multidimensional desktop environment geometries can also be used. For example, in one implementation, the multidimensional desktop environment can conform to a tetrahedron-shaped environment in which a front surface of the tetrahedron defines a viewing surface, and the remaining three surfaces define a left surface, a bottom surface, and a side surface. In another implementation, the multidimensional desktop environment can conform to a triangular environment, in which one axis of the triangle defines the viewing surface and the remaining two sides of the triangle define a left surface and a right surface. Other geometries can also be used.

In one implementation, a configuration tool can be used to facilitate configuration of the multidimensional desktop environment by the user. For example, a configuration menu can present one or more multidimensional desktop environment geometries for selection by the user, such as a rectangular geometry, an arcuate geometry, a triangular geometry, etc. Selection of a geometry can cause the multidimensional desktop environment to be rendered according to the selected geometry.

Figure 16B:
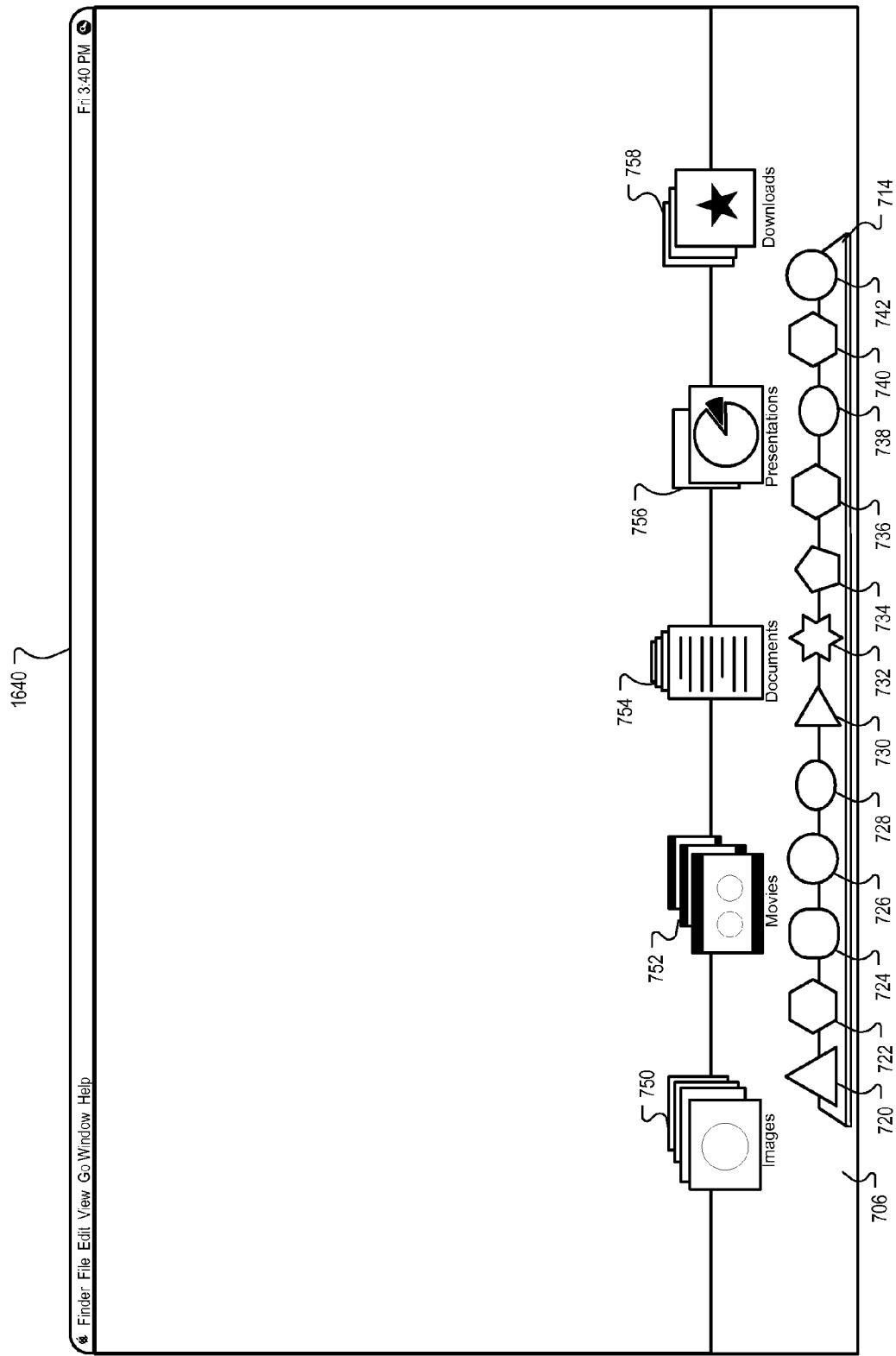

FIG. 16B is a block diagram of another example multidimensional desktop environment. The environment of FIG. 16B is similar to the environments of FIGS. 2-5 and 7-15 above, except that the back surface 1640 and the floor surface 706 define the desktop environment. The features described above with respect to the floor surface 706 in FIGS. 2-5 can be implemented in the desktop environment of FIG. 16B.

Figure 16C:
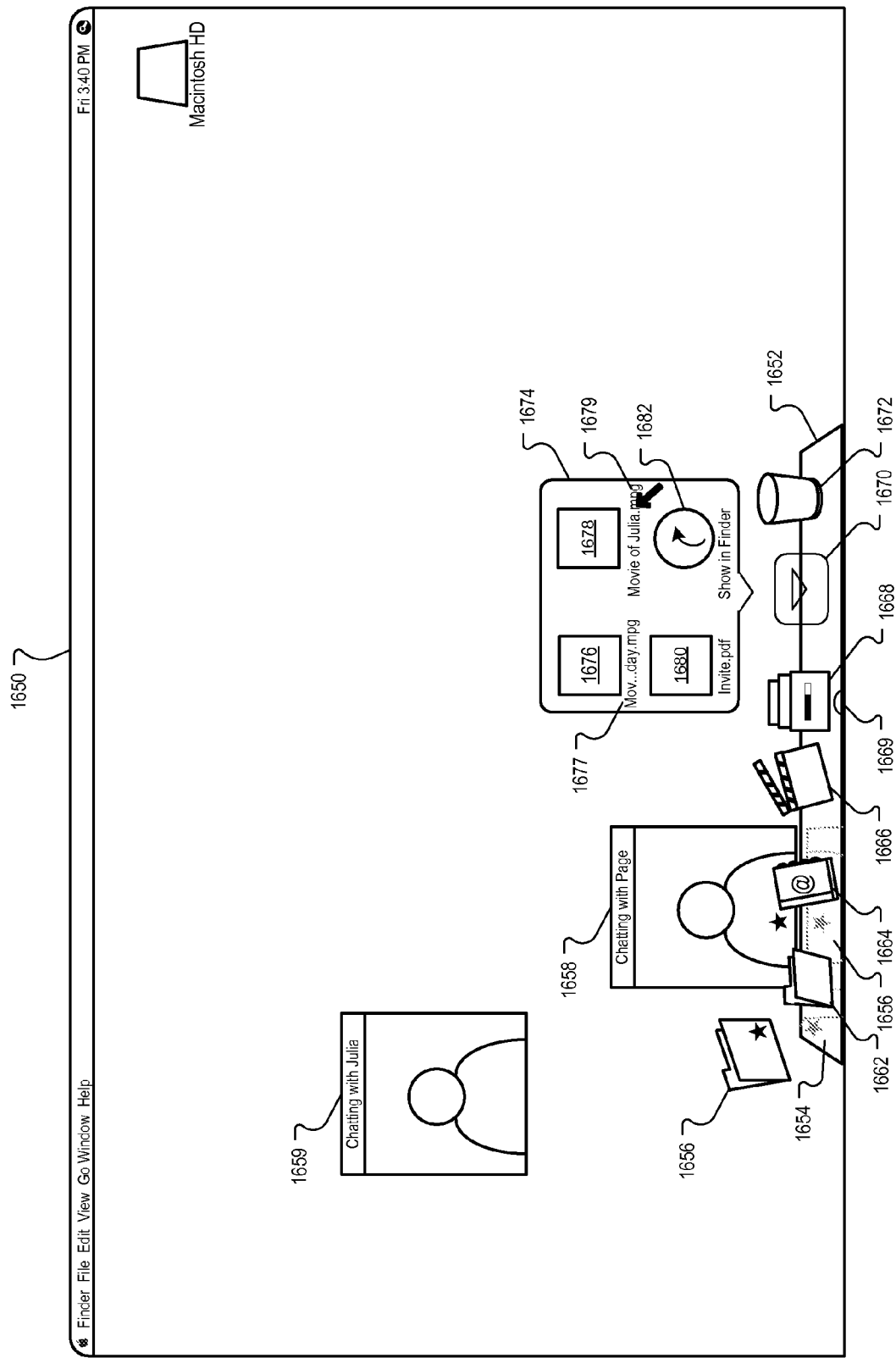

FIG. 16C is a block diagram of another example multidimensional desktop environment. The environment of FIG. 16C is similar to the environment of FIG. 16B above, except that the back surface 1650 defines the desktop environment. A visualization object receptacle 1652 defining a depth aspect can also be displayed near the bottom of the back surface 1650. In some implementations, a depth aspect is further emphasized by generating reflections on the surface of the visualization object receptacle 1652. For example, the visualization objects on the back surface 1650, e.g., the folder icon 1656 and the application window 1658, can generate reflections 1654 and 1656 on the surface of the visualization object receptacle 1652.

In some implementations, the visualization object receptacle 1652 can have a flat height aspect, e.g., the surface of the visualization object receptacle 1652 can appear as a solid flat plane, or a translucent or transparent plane. In other implementations, a height aspect can be generated.

Visualization objects, such as icons 1662, 1664, 1666, 1668, 1670 and 1672 can be disposed on top of the visualization object receptacle 1652. In some implementations, a status indicator 1669 can illuminate to indicate a status. For example, the stack item 1668 may correspond to recent downloads, e.g., system updates, documents, etc., and the illumination may be lit to indicate that a download is currently in progress. The status indicator 1669 can, for example, illuminate according to a color code to indicate different status states.

In some implementations, selecting a stack item causes the stack item to expand to display stack elements according to a visualization model, e.g., stack elements 1676, 1678 and 1680 are displayed according to a matrix arrangement. In some implementations, a collapse widget 1670 can be generated when the contents of a stack item, e.g., stack elements 1676, 1678 and 1680, are shown according to a visualization model, and a corresponding visualization frame 1674 that surrounds the stack elements 1676, 1678 and 1680 can be displayed.

In some implementations, selection of a "Show in Finder" command object 1682 can display a Finder window for a folder containing the stack items 1676, 1678 and 1680 if the stack items 1676, 1678 and 1680 are stored in a common folder. In another implementation, selection of a "Show in Finder" command object 1682 can display a Finder window containing the stack items 1676, 1678 and 1680 even if the stack items 1676, 1678 and 1680 are not stored in a common folder.

In some implementations, a stack item collection process can identify visualization objects on a desktop and collapse the objects into a stack item. For example, the application windows 1658 and 1659 can be identified and collapsed into a stack item. In some implementations, the collapsing of visualization objects includes an animation effect, e.g., a "genie" effect; a "tornado" effect, etc.

In some implementations, textual strings associated with the visualization objects, e.g., filenames associated with icons, can be centrally truncated. A centrally truncated string displays the beginning of the textual string and the end of the textual string. In some implementations, a file extension can be shown by the central truncation. In other implementations, the file extension can be omitted. Positing a cursor on the textual string, or on the visualization object associated with the textual string, can cause the entire textual string to be displayed. For example, as shown in FIG. 16C, the textual string 1677, i.e., "Movie of Page's birthday.mpg" is truncated to "Mov . . . day.mpg." Conversely, the textual string 1679, i.e., "Movie of Julia.mpg," which is positioned beneath a cursor, is fully displayed.

Figure 16D:
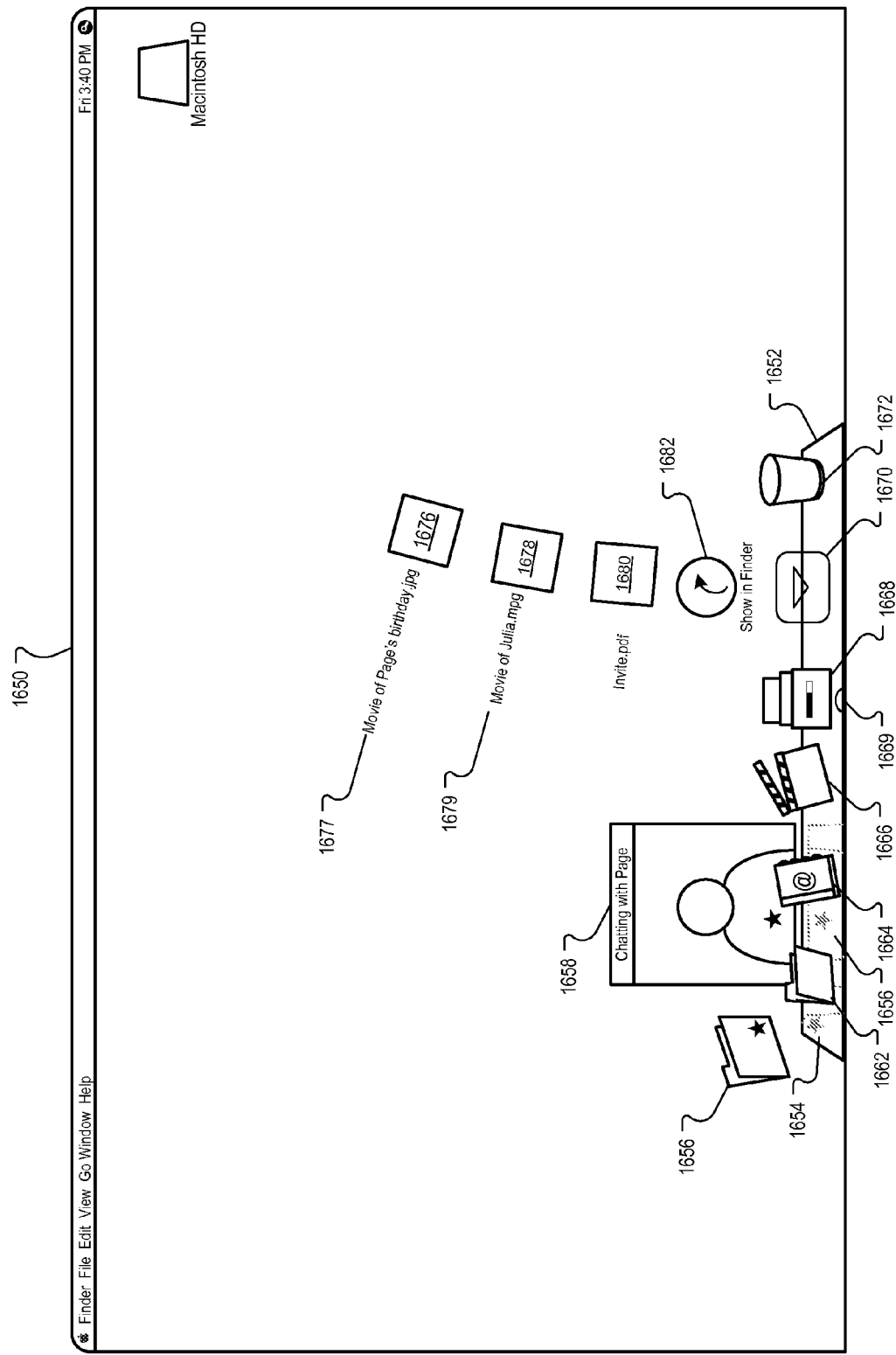

FIG. 16D is a block diagram of another example multidimensional desktop environment. The environment of FIG. 16C is similar to the environment of FIG. 16B above, except that a fanning visualization model is displayed for the stack items 1676, 1678 and 1680. In the implementation shown, document titles related to the stack items 1676, 1678 and 1680 are displayed proximate to the stack items. In some implementations, textual strings associated with visualization objects, e.g., filenames of icons, are fully displayed in the fanning visualization model.

Figure 17:
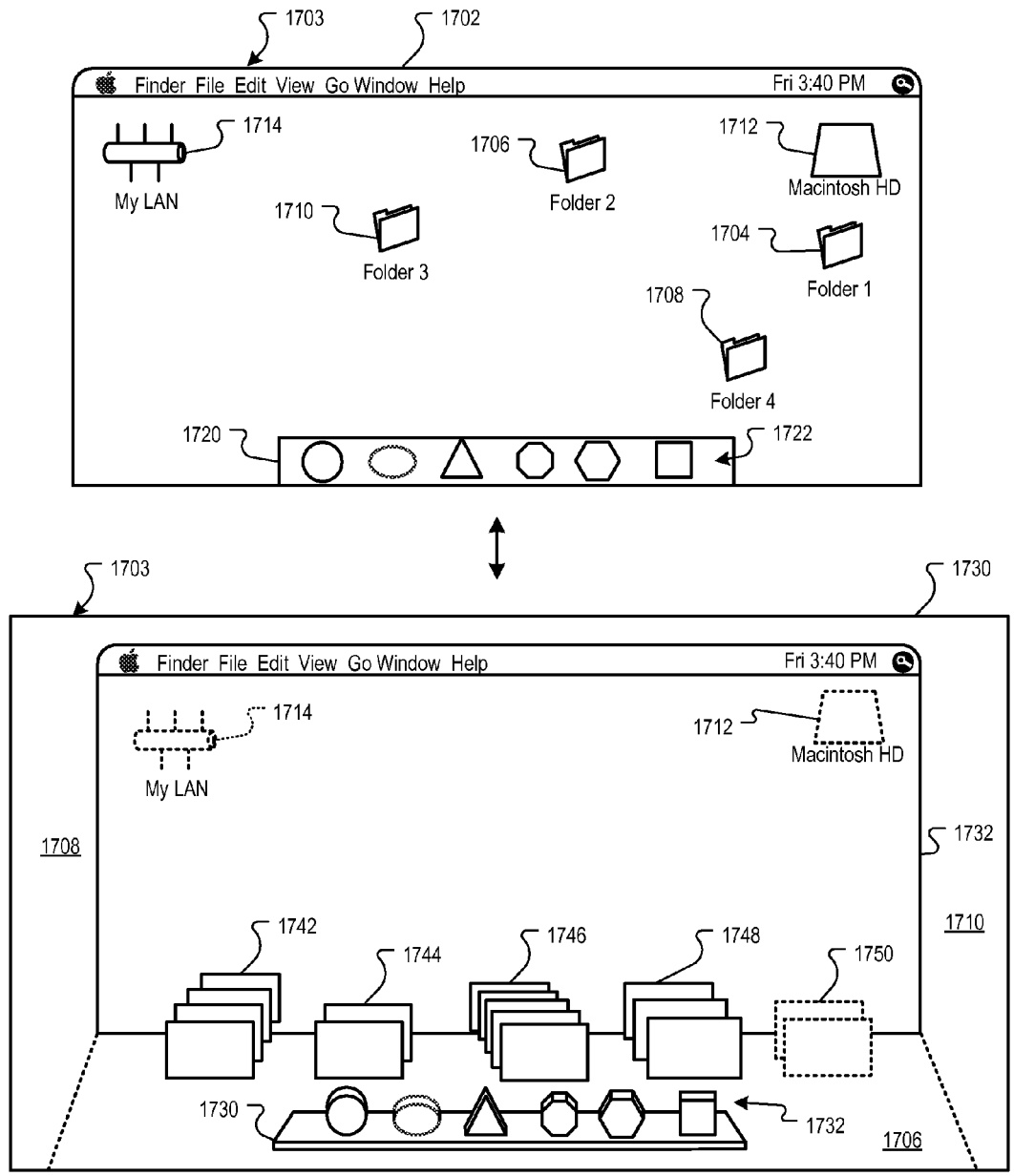
FIG. 17 is a block diagram of an example desktop transition.

FIG. 17 is a block diagram of an example desktop transition. In one implementation, a computer system, such as the system 100 of FIG. 1, can be configured to transition between a two-dimensional desktop 1702 and a three-dimensional desktop 1730. For example, the two dimensional desktop 1702 defines a viewing surface 1703 and includes folders 1704, 1706, 1708 and 1710, an icon 1712 corresponding to a hard drive, and icon 1714 corresponding to a network, and an icon display region 1720 that displays a plurality of icons 1722.

In response to a transition command, the system can, for example, depth transition the two-dimensional desktop 1702 from the viewing surface 1703 to define a back surface 1732, and one or more side surfaces, such as side surfaces 1706, 1708 and 1710, can extend from the back surface 1732 to the viewing surface 1703. A visualization object receptacle 1730 can be generated on the surface 1706, and one or more icons 1732 corresponding to desktop items can be disposed in the visualization object receptacle. In the example implementation of FIG. 17, the icons 1732 correspond to the icons 1722.

In one implementation, stack items, such as stack items 1742, 1744, 1746 and 1748, can be generated from two dimensional desktop items, such as desktop folders 1704, 1706, 1708 and 1710. The two dimensional desktop items can, for example, be eliminated from the back surface 1732. In one implementation, two-dimensional desktop items that are not represented by a corresponding icon after the transition to the three-dimensional desktop 1730 can, for example, remain on the back surface 1732. For example, the icons 1712 and 1714 can remain on the back surface 1732. In another implementation, the two-dimensional desktop items that are not represented by a corresponding icon after the transition to the three-dimensional desktop 1730 can, for example, be eliminated from the back surface 1732. In another implementation, the two-dimensional desktop items that are not represented by a corresponding icon after the transition to the three-dimensional desktop 1730 can, for example, be eliminated from the back surface 1732 and represented by corresponding stack elements in a "catch all" stack item, such as stack item 1750.

The transition from the two-dimensional desktop 1702 to a three-dimensional desktop 1730 can be substantially reversed to transition from the three-dimensional desktop 1730 to the two-dimensional desktop 1702.

Figure 18A:
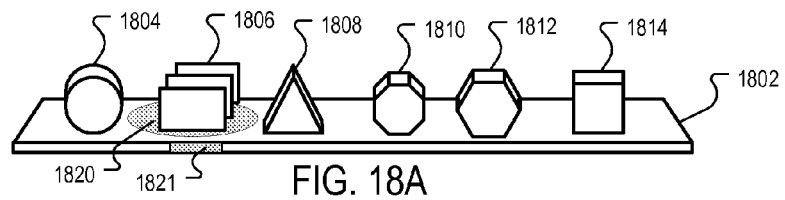
FIGS. 18A-18D are block diagrams of example visualization object receptacle indicators.

FIG. 18A is a block diagram of an example visualization object receptacle indicator. An example visualization object receptacle 1802 includes visualization objects, e.g., icons 1804, 1806, 1808, 1810, 1812 and 1814. In an implementation, a selection indicator 1820 can be used to indicate a selected icon. In one implementation, the selection indicator 1820 is generated by an under-lighting effect that illuminates the surface of the visualization object receptacle 1802 below a selected icon, such as the icon 1806. Other selection indicators can also be used, such as selection status indicator 1821, or backlighting effects, outlining effects, or other indicators.

Figure 18B:
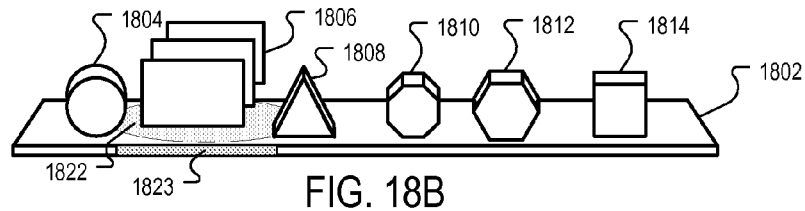

FIG. 18B is a block diagram of another example visualization object receptacle indicator. In an implementation, a selection indicator 1822 can be used to indicate a selected icon. In one implementation, the selection indicator 1822 is generated by an enlargement of a selected icon, such as icon 1806, relative to adjacent icons, and an under-lighting effect that illuminates the surface of the visualization object receptacle 1802 below a selected icon 1806 and adjacent icons 1804 and 1808. In an implementation that includes a selection status indicator 1821, the selection status indicator 1821 can expand into a large selection status indicator 1823.

Figure 18C:
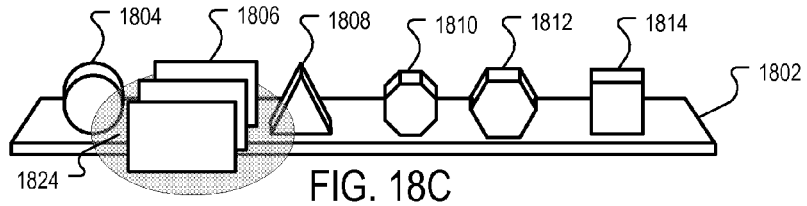

FIG. 18C is a block diagram of another example visualization object receptacle indicator. In an implementation, a selection indicator 1824 can be used to indicate a selected icon. In one implementation, the selection indicator 1824 is generated by an enlargement of a selected icon, such as icon 1806, relative to adjacent icons, and a backlighting effect that illuminates the surface of the visualization object receptacle 1802 below a selected icon 1806 and illuminates adjacent icons 1804 and 1808.

Figure 18D:
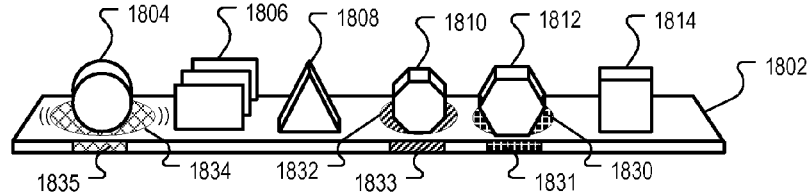

FIG. 18D is a block diagram of another example visualization object receptacle indicator. The visualization object receptacle 1802 can, for example, include one or more status indicators to indicate the status of a system object associated with one or more icons. For example, a status indicator 1830 indicating an unselected and executing application can be generated by an under-lighting effect of a first color; a status indicator 1832 indicating a selected and executing application can be generated by an under-lighting effect of a first color; and a status indicator 1834 indicating a launching application can be generated by an under-lighting effect of a third color.

Other status indicator schemes can also be used. For example, in one implementation, a status indicator 1834 indicating a launching application can be generated by a pulsing under-lighting effect. In another implementation, status indicators can indicate a status by an intensity; for example, an icon corresponding to an open document, e.g., a document icon, a stack item, or an application icon, can be backlit with a relatively high intensity, and an icon corresponding to an open and unselected document can be backlit with a relatively low intensity. For example, in implementations utilizing status indicators 1831, 1833 and 1835, the status indicators can be illuminated according to a similar color scheme.

Figure 19A:
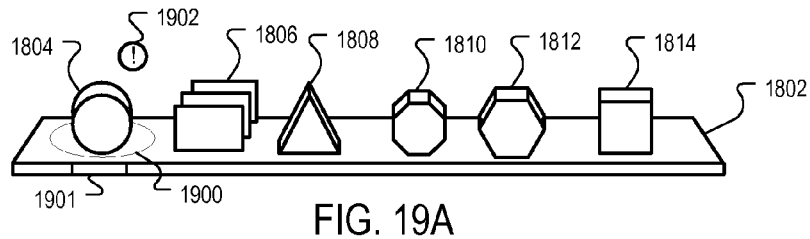
FIGS. 19A and 19B are block diagrams of an example contextual menu for a visualization object receptacle.
Figure 19B:
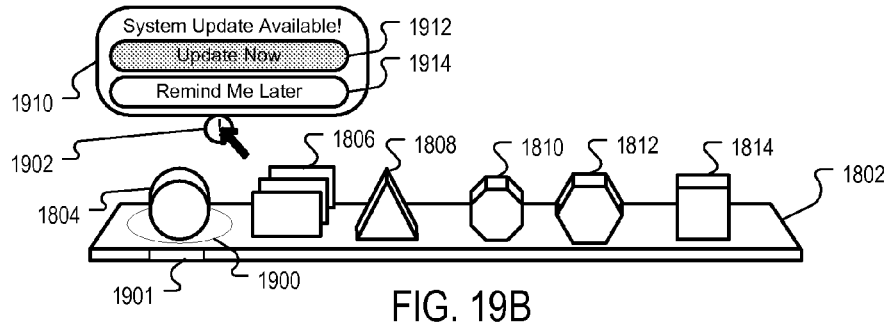

FIGS. 19A and 19B are block diagrams of an example contextual menu for a visualization object receptacle 1802. In some implementations, a selectable divet 1902 can be displayed proximate to an icon, e.g., icon 1804, to indicate an actionable state associated with a system object represented by the icon 1804. For example, if the icon 1804 is representative of a system update process or program, the selectable divet 1902 can be displayed when a system update is available.

The selectable divet 1902 can, for example, be a floating orb proximate to the icon 1804. Other shapes or visual representations can also be used. In some implementations, the selectable divet 1902 is color coded according to a color code to indicate corresponding actionable states.

FIG. 19B illustrates an example contextual menu 1910 that can be displayed proximate to the icon 1804 in response to a selection of the selectable divet 1902. The contextual menu 1910 can include one or more menu options, e.g., menu options 1912 and 1914, related to the icon 1804. In some implementations, the divet 1902 remains until a necessary action is taken. In other implementations, the divet 1902 can be removed by a corresponding selection of one of the menu options in the contextual menu 1910. In some implementations, the divet 1902 can fade from view if it is not selected after a period of time, e.g., 30 minutes.

Figure 20:
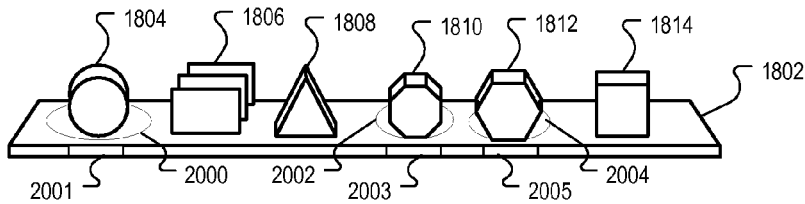
FIG. 20 is a block diagram of an example visualization object receptacle including type-ahead indications.

FIG. 20 is a block diagram of a visualization object receptacle including type-ahead indications. In some implementations, one or more highlight indicators 2000, 2002 and 2004, and/or 2001, 2003 and 2005 are generated in response to type input data, e.g., data generated by keyboard inputs. The one or more highlight indicators 2000, 2002 and 2004, and/or 2001, 2003 and 2005 can be generated for icons having textual descriptions corresponding to the keyboard inputs, and can be adjusted in response to the type input data so that only icons having textual descriptions defined by the type input data are highlighted. For example, if the textual descriptions of the icons 1804, 1810 and 1812 are "Clock," "Calculator," and "Classics," then the highlight indicators 2000, 2002 and 2004, and/or 2001, 2003 and 2005 would illuminate in response to the keyboard input "c." A subsequent keyboard input "l" would cause the highlight indicators 2002 and/or 2003 to turn off; and a third keyboard input "o" would cause the highlight indicators 2004 and/or 2005 to turn off. According, the icon 1804, corresponding to the textual description "clock" would be selected by the type input data c, l and o.

Other selection indications based on type input can be used. For example, stack elements from a stack item can disappear in response to type input. Thus, if a stack item includes stack elements entitled "Clock," "Calculator," "Classics," "Movies," and "Safari," the keyboard input "c" would cause the "Movies" and "Safari" visualization object to disappear. A subsequent keyboard input "a" would cause the "Clock" and "Classics" visualization objects to disappear.

In addition to selections based on a textual description beginning with the type input data, selections based on the type input data can also be based on whether the textual description of the visualization object contains the text input or ends with text. For example, all stack elements having .mac extensions can be visualized by selecting an "Ends with" type input option and entering the type input "m," "a" and "c."

Figure 21A:
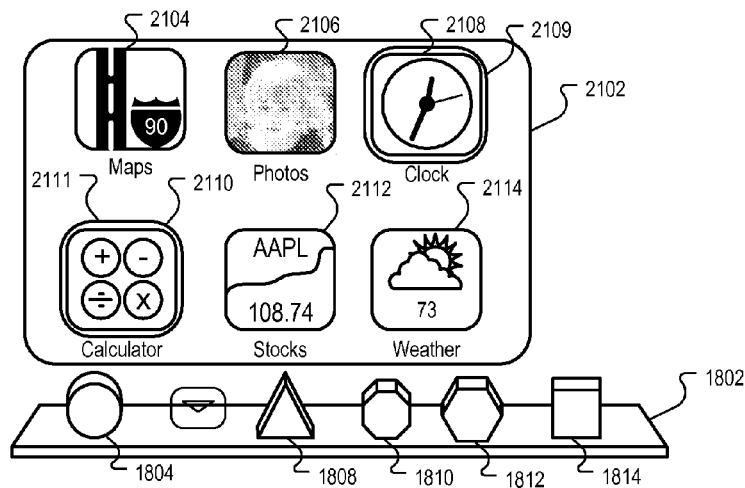
FIGS. 21A and 21B are block diagrams of example selection indicators for a visualization model.
Figure 21B:
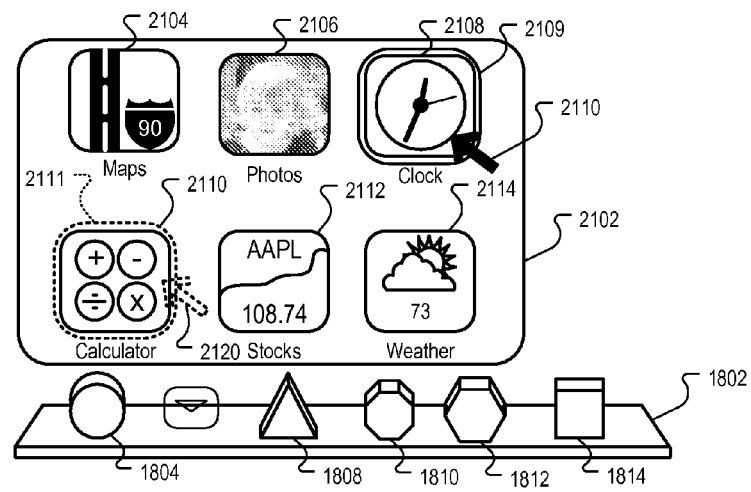

FIGS. 21A and 21B are block diagrams of example selection indicators for a visualization model. In FIG. 21A, stack elements 2104, 2106, 2108, 2110, 2112, and 2114 are displayed according to a visualization model, e.g., a matrix arrangement. One or more highlight indicators 2109 and 2111, e.g., focus rings, can be generated in response to keyboard input data. The focus rings 2109 and 2111 can be adjusted in response to the type of input data so that only visualization objects having textual descriptions defined by the type input data are highlighted, as described with respect to FIG. 20 above. For example, the focus rings 2109 and 2111 can be generated in response to the keyboard input "c." A subsequent keyboard input "l" would cause the focus ring 2111 to fade from view.

In FIG. 21B, stack elements 2104, 2106, 2108, 2110, 2112, and 2114 are displayed according to a visualization model, e.g., a matrix arrangement. In this implementation, a highlight indicator is generated based on a cursor position. For example, if a mouse cursor 2120 is first positioned over the visualization object 2110, a first focus ring 2111 can be generated completely or partially around the visualization object 2110. However, if the mouse cursor 2120 is moved to a position over the visualization object 2108, the first focus ring 2111 will fade from view and a second focus ring 2109 will be generated around the visualization object 2018.

In some implementations, the focus ring persists around a visualization object until the mouse cursor 2120 is positioned over another visualization object. In some implementations, the focus ring persists around a visualization object only when the mouse cursor 2120 is positioned over the visualization object. Other processes for generating and removing selection indicators can also be used.

Figure 22:
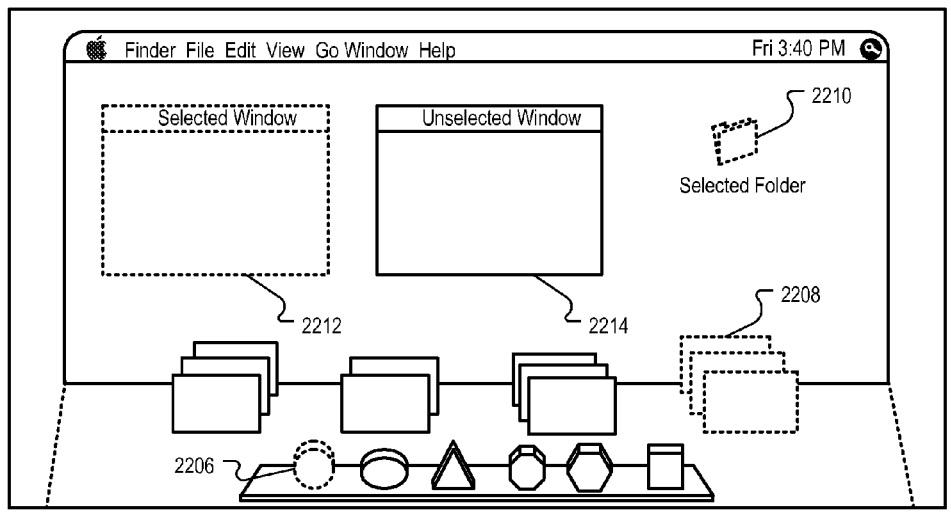
FIG. 22 is a block diagram of another example multidimensional desktop environment.

FIG. 22 is a block diagram of another example multidimensional desktop environment. In an implementation, an indicator can, for example, be used to indicate representations of system objects having an association. For example, the icon 2206, the stack item 2208, the folder 2210 and the window 2212 can be related by having corresponding system objects related to, for example, an application, e.g., the icon 2206 can be the application icon; the stack item 2208 can provide access to particular documents related to the application; the folder 2210 can define a data store storing all application documents; and the window 2212 can be an instance of the executing application. In one implementation, selection of any one of the icon 2206, stack item 2208, folder 2210 or window 2212 can generate a common selection indicator for all items. The common selection indicator can, for example, be realized by a lighting effect, such as a backlighting effect, by a temporary pulsing effect, or by some other permanent or transient effect.

Figure 23:
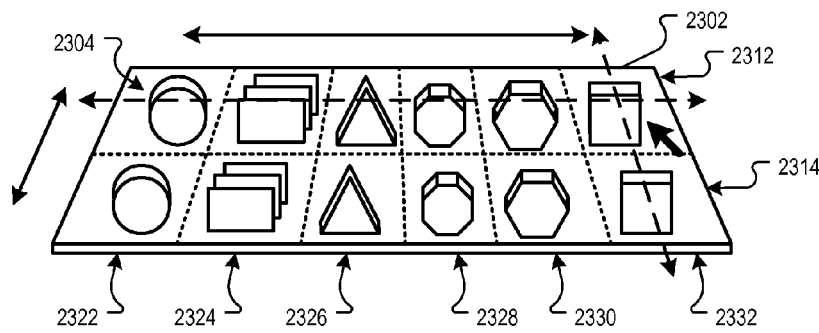
FIG. 23 is a block diagram of another example visualization object receptacle.

FIG. 23 is a block diagram of another example visualization object receptacle 2302. The example visualization object receptacle 2302 includes a plurality of visualization object rows 2312 and 2314 and a plurality of visualization object columns 2322, 2324, 2326, 2328, 2330 and 2323. In an implementation, the visualization object receptacle 2302 includes a plurality of visualization objects 2304 disposed within the visualization object receptacle 2302 according to the visualization object rows 2312 and 2314 and visualization object columns 2322, 2324, 2326, 2328, 2330 and 2323.

Although two visualization object rows and six visualization object columns are shown, the visualization object receptacle can include additional or fewer visualization object rows and visualization object columns. In an implementation, a subset of the visualization object rows and visualization object columns can, for example, be visible at any one time.

The visualization object rows and visualization object columns can, for example, be traversed by shifting the rows and/or columns in unison, as indicated by the solid arrows. For example, when a cursor is positioned on the visualization object receptacle, such as the cursor in the position defined by the intersection of the visualization object row 2312 and the visualization object column 2332, a command (e.g., a control-click command) can cause the visualization object rows and/or columns to shift in unison in response to movement of the cursor. In another implementation, each visualization object row and visualization object column can, for example, be traversed individually by shifting a particular row or column, as indicated by the dashed arrows. For example, when the cursor is positioned on the visualization object receptacle 2302, an option-click command can cause the corresponding visualization object row 2312 and/or the corresponding column 2332 to shift individually in response to movement of the cursor. Other visualization object receptacle navigation schemes can also be used.

Figure 24:
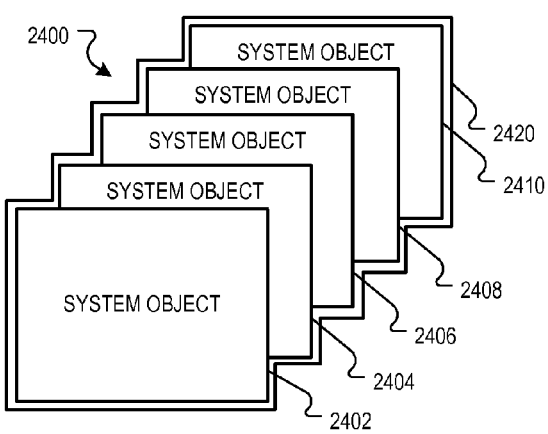
FIG. 24 is a block diagram of an example stack item.

FIG. 24 is a block diagram of an example stack item 2400. The stack item 2400 includes a plurality of stack elements 2402, 2404, 2406, 2408 and 2410, each corresponding to one or more system objects. In one implementation, a boundary 2420 defined by the stack elements 2402, 2404, 2406, 2408 and 2410 defines an inclusion region that is associated with the stack item 2400. In one implementation, placement of an icon within the inclusion region generates a stack element associated with the icon. Likewise, placement of a stack element without the inclusion region disassociates the stack element with the stack item 2400. In another implementation, the inclusion region can be separate from the stack item.

In some implementations, the display size of the stack item 2400 can change according to a state. For example, if a system object corresponding to a stack element in the stack item 2400 requires attention, the size of the stack item 2400 is adjusted to be rendered at a larger display size. Likewise, positioning a mouse cursor over the stack item 2400 can cause the stack item 2400 to be rendered at a larger display size.

In some implementations, the stack item 2400 can change orientation and or appearance according to a state. For example, positioning a mouse cursor over the stack item 2400 can cause the stack item 2400 to rotate, or can cause stack elements in the stack item 2400 to randomly shuffle.

Figure 25:
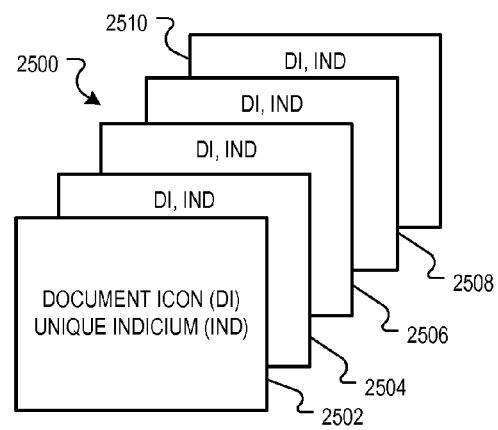
FIG. 25 is a block diagram of another example stack item.

FIG. 25 is a block diagram of another example stack item 2500. The stack item 2500 includes a plurality of stack elements 2502, 2504, 2506, 2508 and 2510, each corresponding to a document system object. In one implementation, stack elements 2502, 2504, 2506, 2508 and 2510 display a corresponding unique indicium, e.g., a thumbnail preview of an image associated with the stack element or the first page of a document associated with the stack element. Other unique indicium or unique indicia can also be used, such as correspondence to an aspect ratio of an image, displaying of a document size and/or a document date can be displayed in each stack element 2502, 2504, 2506, 2508 and 2510, etc.

Figure 26:
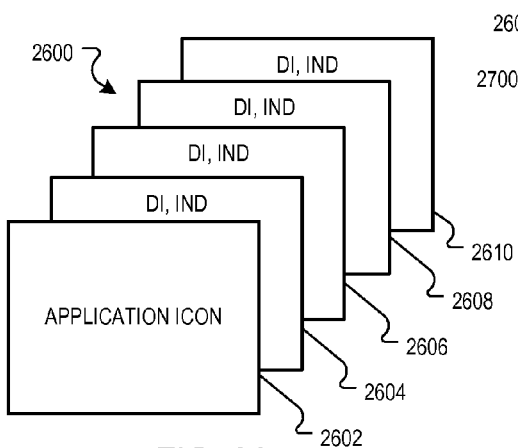
FIG. 26 is a block diagram of another example stack item.

FIG. 26 is a block diagram of another example stack item 2600. The stack item 2600 includes a plurality of stack elements 2602, 2604, 2606, 2608 and 2610. The stack element 2602 corresponds to an application icon of an application system object, and the stack element 2604, 2606, 2608 and 2610 correspond to document system objects. In one implementation, the stack item 2602 can, for example, be preeminently disposed with respect to the stack elements 2604, 2606, 2608, and 2610. For example, the stack item 2602 can be permanently placed on the top of the aggregation of stack elements 2604, 2606, 2608 and 2610. Thus, a shifting of a location of a stack element within the stack item 2600, such as by selecting the stack element 2612 and placing the stack element 2612 on top of the stack element 2602, or an addition of a new stack element, will not displace the stack element 2602 from the preeminent position.

Figure 27:
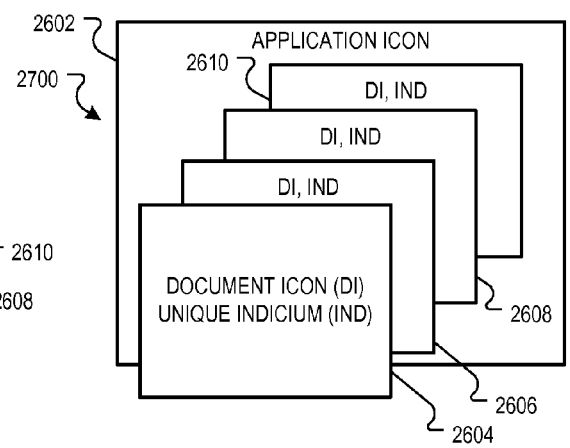
FIG. 27 is a block diagram of another example stack item.

Other methods of preeminently disposing a stack element related to an application icon can also be used. FIG. 27, for example, is a block diagram of another example stack item 2700 in which the stack element 2602 is preeminently disposed by enlarging the application element 2602 relative to the stack elements 2604, 2606, 2608 and 2610. In another implementation, the stack elements 2604, 2606, 2608 and 2610 can be rendered with a translucent effect, and the stack element 2602 can be rendered with an opaque effect so that the entirety of the stack element 2602 is discernable no matter the position of the stack element 2602 in the stack item.

Figure 28A:
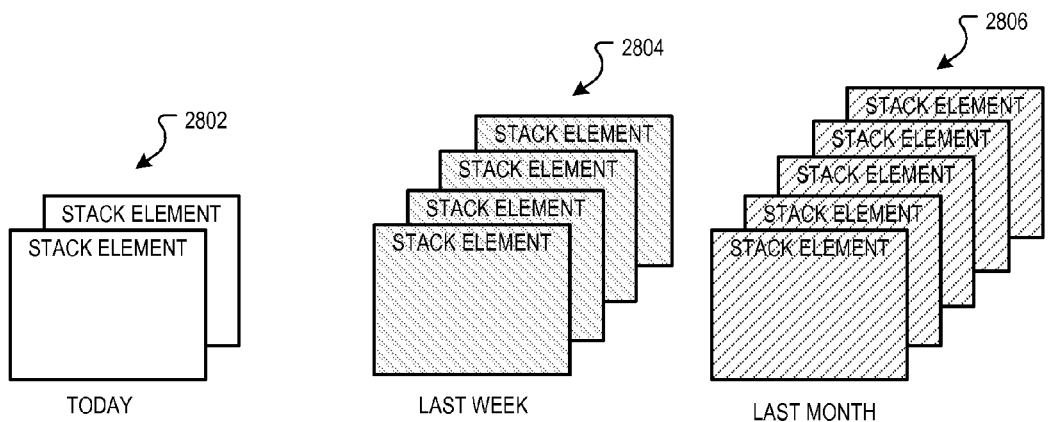
FIGS. 28A and 28B are block diagrams of example stack items that are color-coded.

FIG. 28A is a block diagram of example stack items 2802, 2804 and 2806 that are color-coded. In the example implementation of FIG. 28A, instantiation of each stack item 2802, 2804 and 2806 can be subject to a temporal context and color-coded accordingly. For example, the temporal context can define date rages, and the stack items 2802, 2804 and 2806 can be associated with each date range and color-coded accordingly, e.g., green for the date range "Today," yellow for the date range "Last Week," and red for the date range "Last Month."

In one implementation, a stack element associated with a system object is further associated with a stack item if a relevant date associated with the system object is within the date range associated with the stack item. For example, if the stack items 2802, 2804 and 2806 are utilized to provide access to word processing document system objects based on a "last modified" date, then the stack elements in the stack item 2802 corresponds to word processing documents modified today; the stack elements in the stack item 2804 corresponds to word processing documents modified within the last week; and the stack elements in the stack item 2806 corresponds to word processing documents modified within the last month.

Figure 28B:
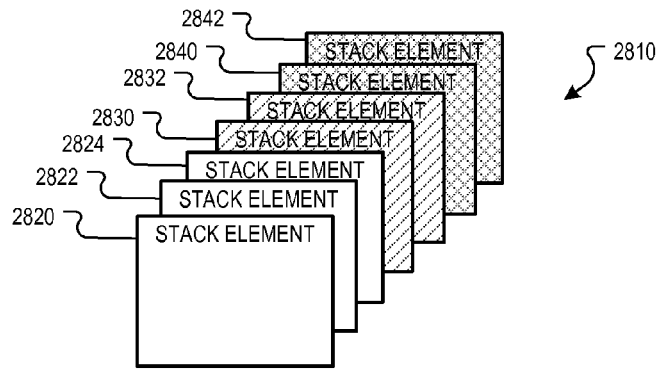

FIG. 28B is a block diagram of an example stack items 2810 that is color-coded. In the implementation of FIG. 28B, stack elements 2820, 2822, 2824, 2830, 2832, 2840 and 2842 are color coded according to a temporal context. For example, the stack elements 2820, 2822 and 2824 are color-coded to identify system objects added during a current day; the stack elements 2830 and 2832 are color-coded to identify system objects added during the last week; and stack elements 2840 and 2840 are color-coded to identify system objects added during the last month. Other color-coding schemes can also be used, e.g., application type, last modified, file size, or even user defined settings.

Figure 29:
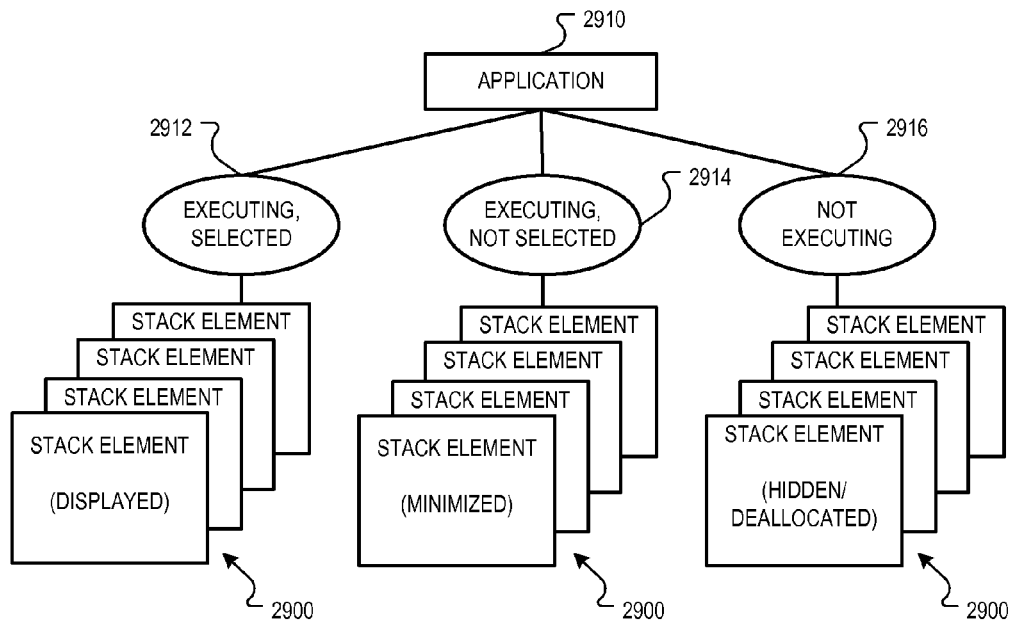
FIG. 29 is a block diagram illustrating an example contextual control scheme applied to an example stack item.

FIG. 29 is a block diagram illustrating an example contextual control scheme applied to an example stack item 2900. For example, the contextual control can be an application context 2910 that defines an executing and selected state 2912, an executing and non selected state 2914, and a not executing state 2916. An executing and selected state 2912 can occur, for example, when an application window of an executing or launching application is selected. An executing and not selected state 2914 can occur, for example, when another process other than the application is selected. A not executing state 2916 can occur, for example, when execution of an application is terminated. In one implementation, the stack item is displayed during the executing and selected state 2912; is minimized, e.g., deemphasized, during the executing and not selected state; and is suppressed, e.g., unallocated or hidden from view during the not executing state 2916.

Other types of contextual control can also be used. For example, contextual control based on a user level associated with system objects, such as a root user level or supervisor level, can control instantiation of a stack item and/or instantiation of stack elements within the stack item, and can, for example, further control commands available to the user.

Figure 30:
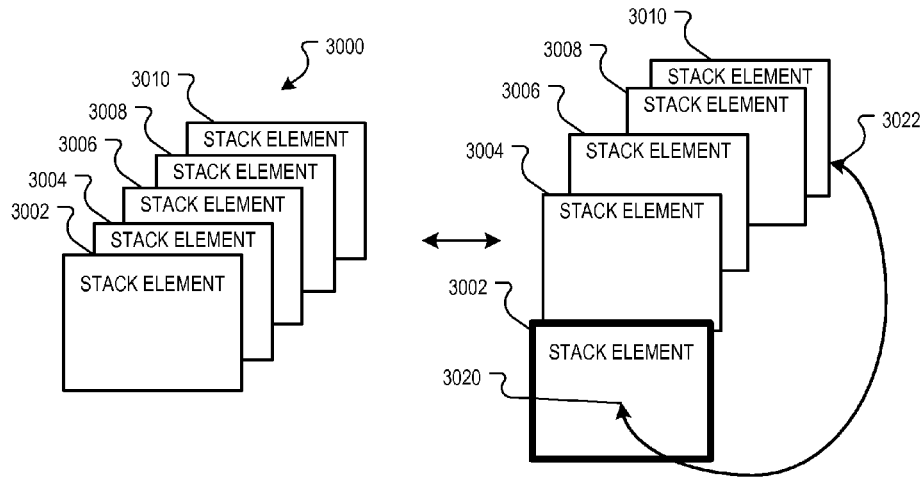
FIG. 30 is a block diagram illustrating the application of an example visualization model to an example stack item.

FIG. 30 is a block diagram illustrating the application of an example visualization model to an example stack item 3000. The visualization model can, for example, be implemented according to first and second modal states. In the first modal state, the stack item 3000 is displayed with the stack elements 3002, 3004, 3006, 3008 and 3010 in a substantially overlapping arrangement. In a second modal state, the stack elements 3002, 3004, 3006, 3008 and 3010 are displayed according to an automatically selected visualization model. The visualization model can be selected as described above.

The example visualization model illustrated in FIG. 30 can, for example, define a multidimensional path defined by a first terminus 3020 and a second terminus 3022, and generates a disposition of the stack elements 3002, 3004, 3006, 3008 and 3010 along the multidimensional path. For example, the stack elements 3002, 3004, 3006, 3008 and 3010 can transition in either direction between the first terminus 3020 and the second terminus 3022 in response to a user input.

In one implementation, an indicator can indicate a preeminent disposition of a stack element. For example, the stack item 3002 can be highlighted by a focus ring when in the preeminent position defining the first terminus 3020.

Figure 31A:
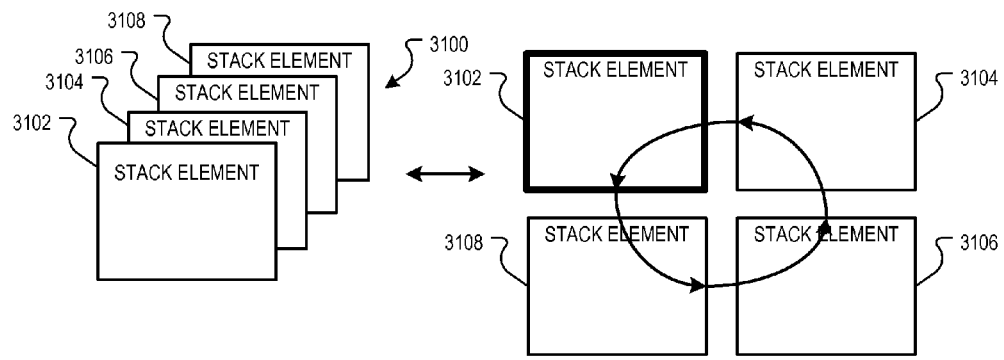
FIGS. 31A and 31B are block diagrams illustrating the application of another example visualization model to an example stack item.

FIG. 31A is a block diagram illustrating another example visualization model for an example stack item 3100. The visualization model can, for example, be implemented according to first and second modal states as described with respect to FIG. 30. In the second modal state, the stack elements 3102, 3104, 3106 and 3108 are displayed according to an automatically selected visualization model that generates an arrangement of the stack elements 3102, 3104, 3106 and 3108 in substantial juxtaposition. The stack elements 3002, 3004, 3006 and 3008 can, for example, transition along a circular path defined by the circular trace common to the stack elements 3102, 3104, 3106 and 3108.

In one implementation, an indicator can indicate a preeminent disposition of a stack element. For example, the stack item 3002 can be highlighted by a focus ring when in the preeminent position defined by the upper left quadrant position.

Figure 31B:
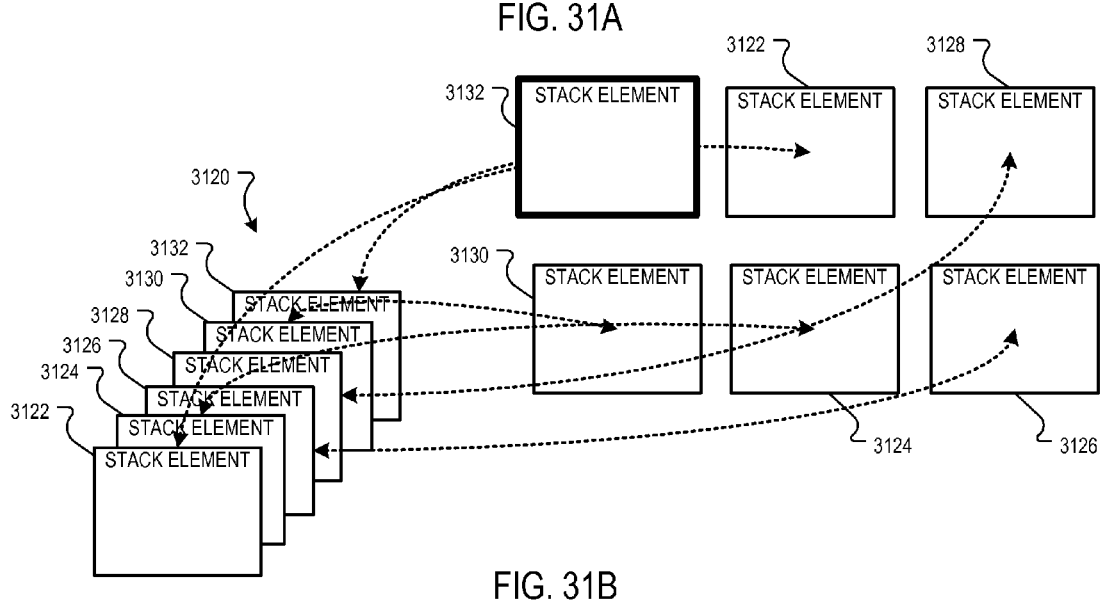

FIG. 31B is a block diagram illustrating the application of another example visualization model to an example stack item 3120. The visualization model is similar to the visualization model of FIG. 31A, except that the stack elements 3122, 3124, 3126, 3128, 3130 and 3132 can traverse corresponding paths to be displayed in a display matrix. While the paths shown in FIG. 31B are curved, other paths can also be use, e.g., straight paths, corkscrew paths, sinusoidal paths, or combinations of such paths.

Figure 32:
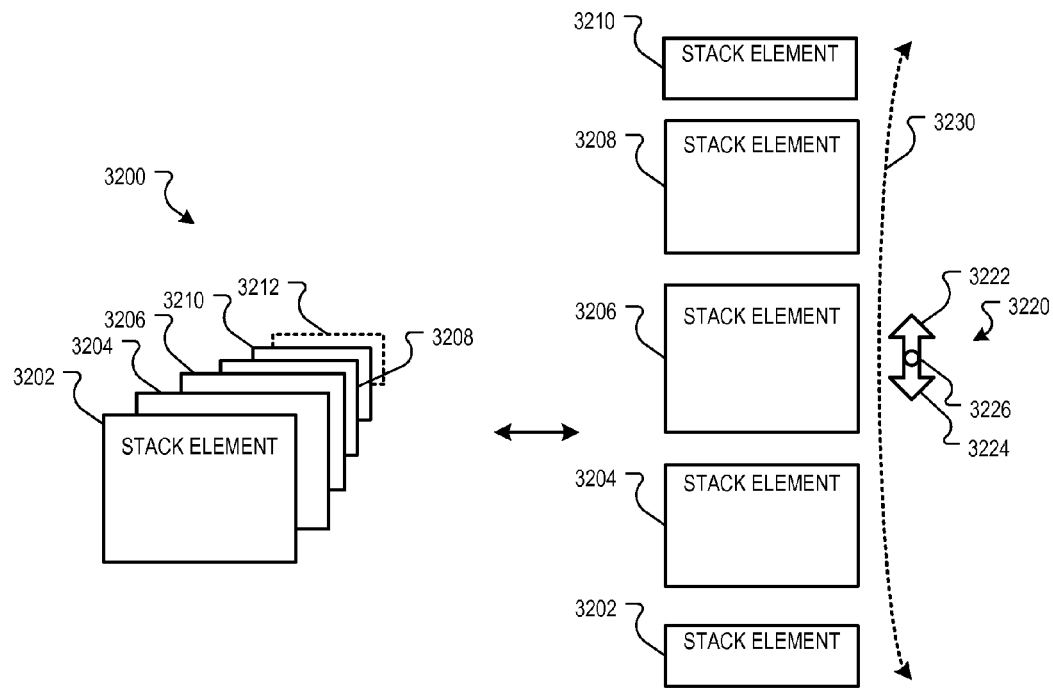
FIG. 32 is a block diagram illustrating the application of another example visualization model to an example stack item.

FIG. 32 is a block diagram illustrating the application of another example visualization model to an example stack item 3200. The stack item 3200 can, for example, include dozens, hundreds or even thousands of stack items. For example, the stack elements 3202, 3204, 3206, 3208, and 3210 may be displayed as opaque stack elements, and the stack element 3212 can be displayed as a translucent stack element, or can be a final stack element near a vanishing point.

The visualization model can, for example, be implemented according to first and second modal states as described with respect to FIG. 30. In the second modal state, a subset of all the stack elements, e.g., stack elements 3202, 3204, 3206, 3208, and 3210 are displayed according to an automatically selected visualization model that generates an arrangement of the stack elements in a list view format. A navigation control 3220 can, for example, be displayed proximate to the arrangement of stack elements, and a selection of either an "up" directional portion 3222 or a "down" directional portion 3224 can cause the stack elements to traverse through the list view format in an up or down direction, respectively. For example, selecting the "down" directional portion 3224 will cause the stack element 3202 to be removed from the list view display, cause the stack elements 3204, 3206, 3208 and 3210 to move down in the list view display, and cause the stack element 3212 to appear at the top of the list view display.

Selection of a navigation divet 3226 can generate a contextual menu that includes one or more sort commands. Example sort commands include sorting by date added, sorting by file size, sorting by file type, etc.

In the implementation of FIG. 32, the list view traverses an actuate path as indicated by the curved arrow 3230, e.g., a model of a curved surface that is normal to the viewing plane at the central stack element, e.g., stack element 3206. Accordingly, stack elements that are not normal to the viewing surface, e.g., stack elements 3202, 3204, 3208 and 3210, include a curvature distortion defined by the curved surface. Other list view formats can also be used, e.g., a straight path in which the stack elements are not distorted.

In some implementations, a user interface engine, e.g., the UI engine 202 of FIG. 2, can pre-cache display data for a subset of the stack elements displayed in the list view format. The pre-caching can be limited to stack elements that are within a certain number of stack elements to be displayed in the list view. For example, the stack element 3200 may include thousands of photograph image files; the UI engine 202, however, may only pre-cache thumbnail images of the next five stack elements to be displayed by selection of the "up" directional portion 3222 and "down" directional portion 3224, respectively.

In another implementation, a stack item, upon selection, may rotate to a side and present the stack elements as a series of graphical representations of book spines, e.g., such as in a book shelf. Depending on the number of stack elements, the book shelf may be one level, multiple levels, or may be extend into a vanishing point and be traversed in response to a user input. Visualization object can be "pulled" from the bookshelf in response to a user input, e.g., a mouse command or a mouse hover, and a subsequent command, e.g., a mouse click, can open a file associated with the visualization object. Other visualization models can also be used.

Figure 33A:
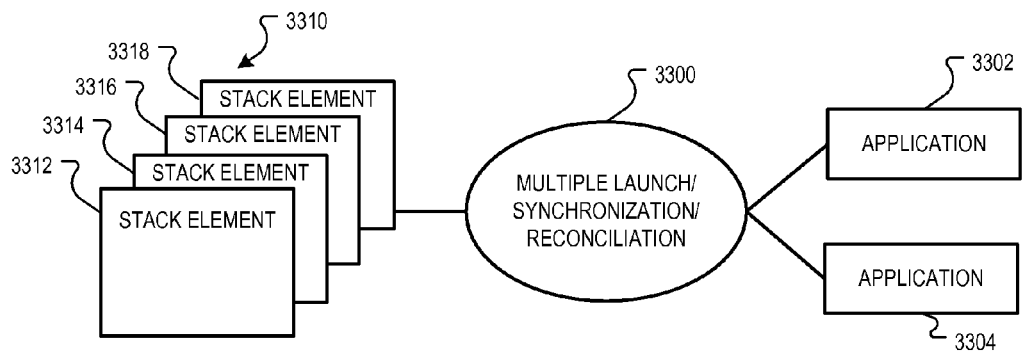
FIG. 33A is a block diagram of an example group association of an example stack item.

FIG. 33A is a block diagram of an example group association 3300 of an example stack item 3310. The group association 3300, can, for example, be based one or more identified association characteristics of the stack elements 3312, 3314, 3316 and 3318. For example, the group association 3300 can comprise a project association, e.g., files associated with a presentation developed with a first project application 3302 and which utilizes data from files associated with a second project application 3304.

In one implementation, an interaction model can be selected based on the project association. In an implementation, a multiple launch interaction model can be selected when any one of the system objects related to the stack elements 3312, 3314, 3316 and 3318 is opened. In one implementation, the multiple launch interaction model can, for example, confirm a launching of both applications 3302 and 3304. In another implementation, the multiple launch interaction model can, for example, provide a context menu in which either or both of the applications 3302 and 3304 can be selected for launching. Other multiple launching interaction models can also be used.

In another implementation, a synchronization interaction model can be selected when one of the system objects related to the stack elements 3312, 3314, 3316 and 3318 is saved to a data store, such as a hard disk. The synchronization interaction model can, for example, provide one or more contextual menus or other interaction aspects to prompt a user to synchronize all stack elements when any one of the stack elements has been updated. Other synchronization interaction models can also be used.

In another implementation, a reconciliation interaction model can be selected when one of the system objects related to the stack elements 3312, 3314, 3316 and 3318 is changed, e.g., a file association with the stack element 3312 is replaced by a new file. The reconciliation interaction model can, for example, provide one or more contextual menus or other interaction aspects to prompt a user to reconcile all stack elements when any one of the stack elements are replaced. Other reconciliation interaction models can also be used.

Interaction and/or visualization models can also be applied to other representations of system objects. For example, in one implementation, the system objects can include window instances in the multidimensional desktop environment, and the association characteristics can include a quantity of non-minimized window instances. Accordingly, an interaction model can be automatically selected for facilitating operations on the open windows, depending on the number of open windows. For example, if the number of open windows is greater than five, selection of a browse command can cause the open windows to be automatically displayed in an overlapping arrangement for browsing; and if the number of open windows is less than five, selection of the browse command can cause the open windows to be automatically displayed in a matrix arrangement for browsing.

Figure 33B:
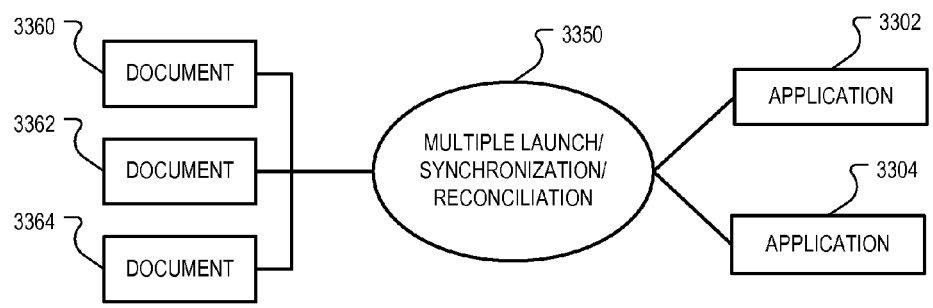
FIG. 33B is a block diagram of an example group association of system objects.

FIG. 33B is a block diagram of an example group association of system objects. The group association 3350, can, for example, be based one or more identified association characteristics of the system objects, such as documents 3360, 3362 and 3364. The group association 3350 can, for example, be utilized to select one or more visualization and/or interaction models as described above. However, the documents 3360, 3362 and 3364 need not be associated in a stack item, e.g., the documents 3360, 3362 and 3364 can each be associated with different stack items, or not associated with any stack items.

Figure 34:
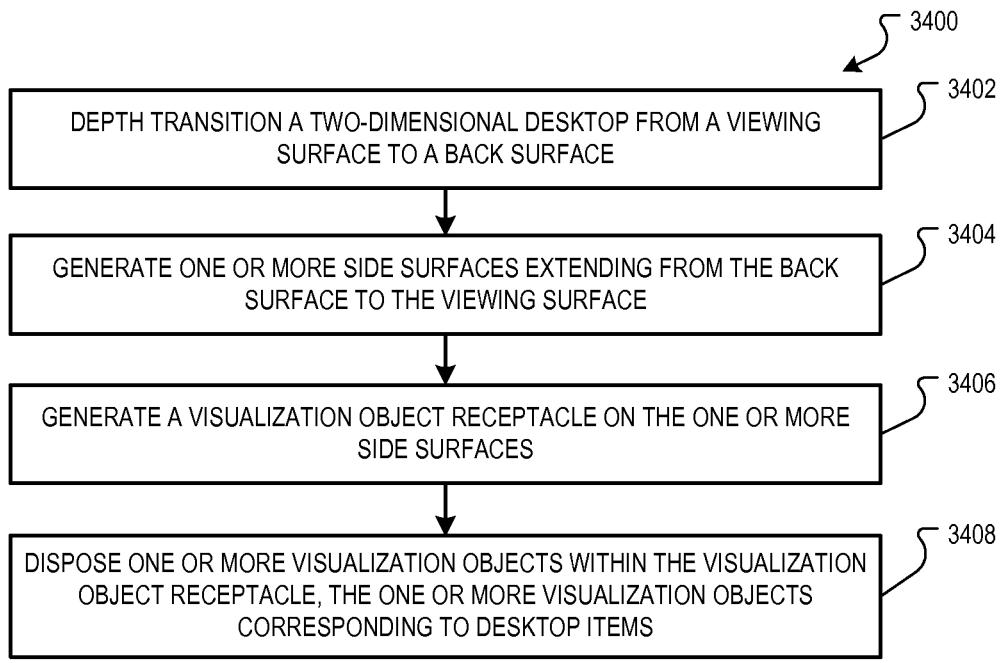
FIG. 34 is a flow diagram of an example process for transitioning a desktop.

FIG. 34 is a flow diagram of an example process 3400 for transitioning a desktop. The process 3400 can, for example, be implemented in a processing device, such as the system 100 of FIG. 1, implementing user interface software and/or hardware, such as the example implementations described with respect to FIGS. 2, 5 and 6.

Stage 3402 depth transitions a two-dimensional desktop from a viewing surface to a back surface. For example, the system 100, implementing any one of the UI engines described in FIGS. 2, 5 and 6, can depth transition a two-dimensional desktop, such as the desktop 1702 of FIG. 17, from a viewing surface to a back surface, such as from the viewing surface 1703 to the back surface 1732 as shown in FIG. 17.

Stage 3404 generates one or more side surfaces extending from the back surface to the viewing surface. For example, the system 100, implementing any one of the UI engines described in FIGS. 2, 5 and 6, can generate one or more side surfaces extending from the back surface to the viewing surface, such as the side surfaces 1706, 1708 and 1710 of FIG. 17.

Stage 3406 generates a visualization object receptacle, e.g., an icon receptacle, on the one or more side surfaces. For example, the system 100, implementing any one of the UI engines described in FIGS. 2, 5 and 6, can generate an icon receptacle on the one or more side surfaces, such as the visualization object receptacle 1730 on the surface 1706 of FIG. 17.

Stage 3408 disposes one or more visualization object, e.g., icons, corresponding to desktop items within the visualization object receptacle. For example, the system 100, implementing any one of the UI engines described in FIGS. 2, 5 and 6, can dispose one or more icons corresponding to desktop items within the visualization object receptacle, such as the icons 1732 in the visualization object receptacle 1730, which correspond to the icons 1722 of FIG. 17.

Figure 35:
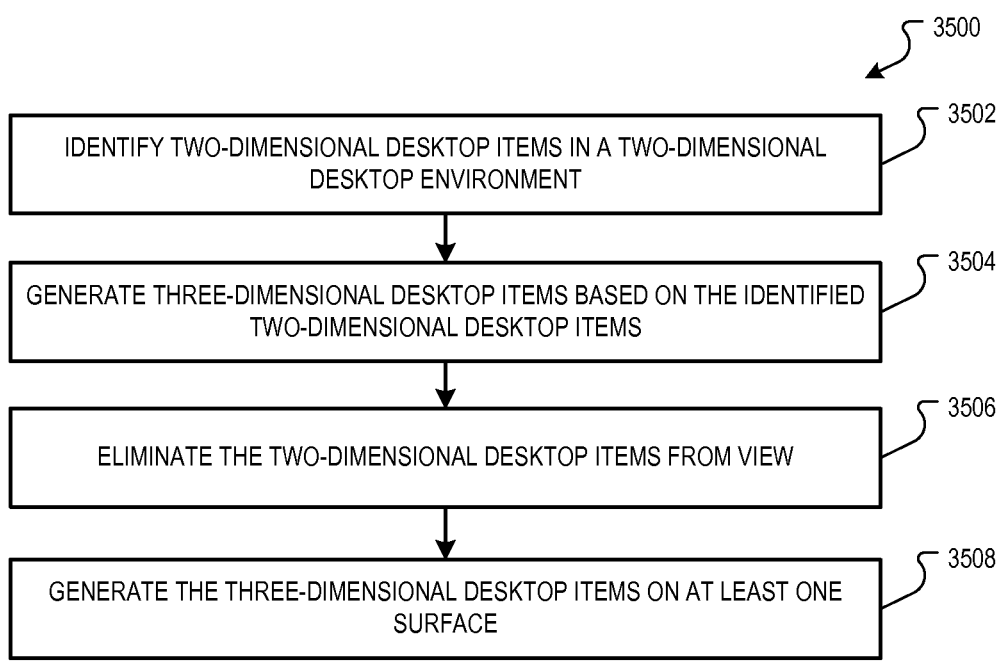
FIG. 35 is a flow diagram of another example process for transitioning between desktop types.

FIG. 35 is a flow diagram of another example process 3500 for transitioning between desktop types. The process 3500 can, for example, be implemented in a processing device, such as the system 100 of FIG. 1, implementing user interface software and/or hardware, such as the example implementations described with respect to FIGS. 2, 5 and 6.

Stage 3502 identifies two-dimensional desktop items in a two-dimensional desktop environment. For example, the system 100, implementing any one of the UI engines described in FIGS. 2, 5 and 6, can identify two-dimensional desktop items in a two-dimensional desktop environment, such as the folders 1704, 1706, 1708 and 1710 of FIG. 17.

Stage 3504 generates three-dimensional desktop items based on the identified two-dimensional desktop items. For example, the system 100, implementing any one of the UI engines described in FIGS. 2, 5 and 6, can generate three-dimensional desktop items based on the identified two-dimensional desktop items, such as the stack items 1742, 1744, 1746 and 1748 of FIG. 17, which correspond to the folders 1704, 1706, 1708 and 1710.

Stage 3506 eliminates the two-dimensional desktop items from view. For example, the system 100, implementing any one of the UI engines described in FIGS. 2, 5 and 6, can eliminate two-dimensional desktop items from view, such as the elimination of the folders 1704, 1706, 1708 and 1710 from the back surface 1732 of FIG. 17.

Stage 3508 generates the three-dimensional desktop items on at least one surface (e.g., a side surface). For example, the system 100, implementing any one of the UI engines described in FIGS. 2, 5 and 6, can generate the three-dimensional desktop items on at least one side surface, such as the stack items 1742, 1744, 1746 and 1748 on the bottom side surface 1706 of FIG. 17.

Figure 36:
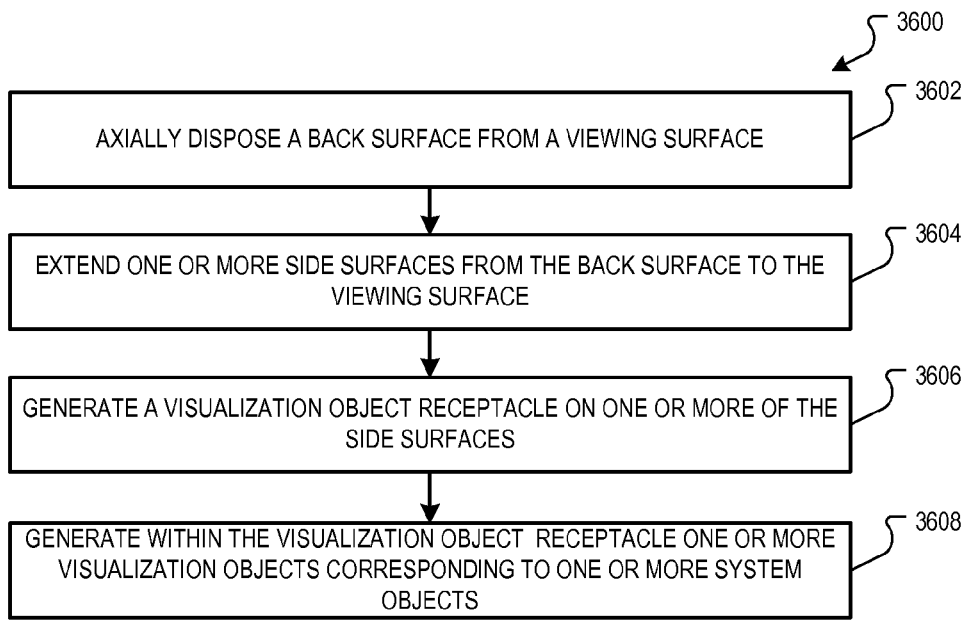
FIG. 36 is a flow diagram of an example process for generating a multidimensional desktop environment.

FIG. 36 is a flow diagram of an example process 3600 for generating a multidimensional desktop environment. The process 3600 can, for example, be implemented in a processing device, such as the system 100 of FIG. 1, implementing user interface software and/or hardware, such as the example implementations described with respect to FIGS. 2, 5 and 6.

Stage 3602 axially disposes a back surface from a viewing surface. For example, the system 100, implementing any one of the UI engines described in FIGS. 2, 5 and 6, can axially dispose a back surface from a viewing surface, such as the back surface 1102 being axially disposed from the viewing surface 1104, as shown in FIG. 11.

Stage 3604 extends one or more side surfaces from the back surface to the viewing surface. For example, the system 100, implementing any one of the UI engines described in FIGS. 2, 5 and 6, can extend one or more side surfaces from the back surface to the viewing surface, such as the side surfaces 1106, 1108, 1110 and 1112, as shown in FIG. 11.

Stage 3606 generates a visualization object receptacle on one or more of the side surfaces. For example, the system 100, implementing any one of the UI engines described in FIGS. 2, 5 and 6, can generate an icon receptacle on one or more of the side surfaces, such as the visualization object receptacle 1114 on the side surface 1106, as shown in FIG. 11.

Stage 3608 generates within the visualization object receptacle one or more visualization objects, e.g., icons, corresponding to one or more system objects. For example, the system 100, implementing any one of the UI engines described in FIGS. 2, 5 and 6, can generate within the visualization object receptacle one or more icons corresponding to one or more system objects, such as the icons 1120, 1122, 1124, 1126, 1128 and 1130 as shown in FIG. 11.

Figure 37:
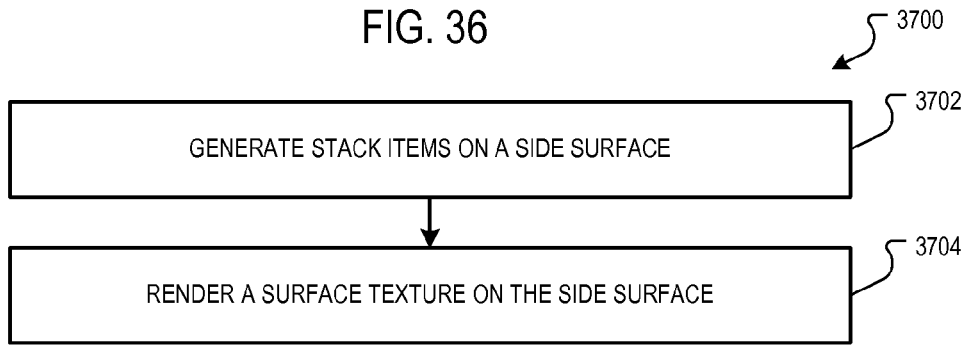
FIG. 37 is a flow diagram of an example process for rendering a side surface in a multidimensional desktop environment.

FIG. 37 is a flow diagram of an example process 3700 for rendering a side surface in a multidimensional desktop environment. The process 3700 can, for example, be implemented in a processing device, such as the system 100 of FIG. 1, implementing user interface software and/or hardware, such as the example implementations described with respect to FIGS. 2, 5 and 6.

Stage 3702 generates stack items on a surface (e.g., a side surface). For example, the system 100, implementing any one of the UI engines described in FIGS. 2, 5 and 6, can generate stacks items on a side surface, such as the stack items 1140, 1142, 1144 and 1146 generated on the side surface 1106, as shown in FIG. 11.

Stage 3704 renders a surface texture on the surface. For example, the system 100, implementing any one of the UI engines described in FIGS. 2, 5 and 6, can render a surface texture on the side surface, such as the grid texture 1150 on the side surface 1106, as shown in FIG. 11.

Figure 38:
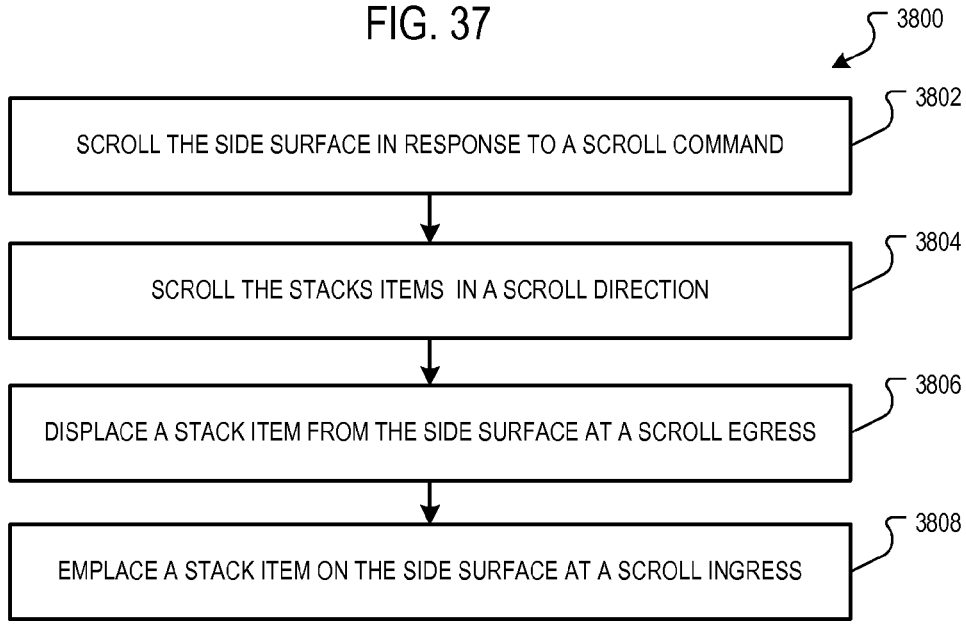
FIG. 38 is a flow diagram of an example process for scrolling a side surface in a multidimensional desktop environment.

FIG. 38 is a flow diagram of an example process 3800 for scrolling a side surface in a multidimensional desktop environment. The process 3800 can, for example, be implemented in a processing device, such as the system 100 of FIG. 1, implementing user interface software and/or hardware, such as the example implementations described with respect to FIGS. 2, 5 and 6.

Stage 3802 scrolls the side surface in response to a scroll command. For example, the system 100, implementing any one of the UI engines described in FIGS. 2, 5 and 6, can scroll the side surface in response to a scroll command, such as the side surface 1106 in the directions indicated by one or more of the arrows 1152 and 1154, as shown in FIG. 11.

Stage 3804 scrolls the stack items in a scroll direction. For example, the system 100, implementing any one of the UI engines described in FIGS. 2, 5 and 6, can scroll the stack items in a scroll direction, such as the stack items 1140, 1142, 1144 and 1146 in the directions indicated by one or more of the arrows 1152 and 1154, as shown in FIG. 11.

Stage 3806 displaces a stack item(s) from the side surface at a scroll egress. For example, the system 100, implementing any one of the UI engines described in FIGS. 2, 5 and 6, can displace a stack item(s) from the side surface at a scroll egress, such as the scroll egress 1158 (or 1159), as shown in FIG. 11.

Stage 3808 emplaces a stack item(s) on the side surface at a scroll ingress. For example, the system 100, implementing any one of the UI engines described in FIGS. 2, 5 and 6, can emplace a stack items on the side surface at a scroll ingress, such as the scroll ingress 1156 (or 1157) as shown in FIG. 11.

Figure 39:
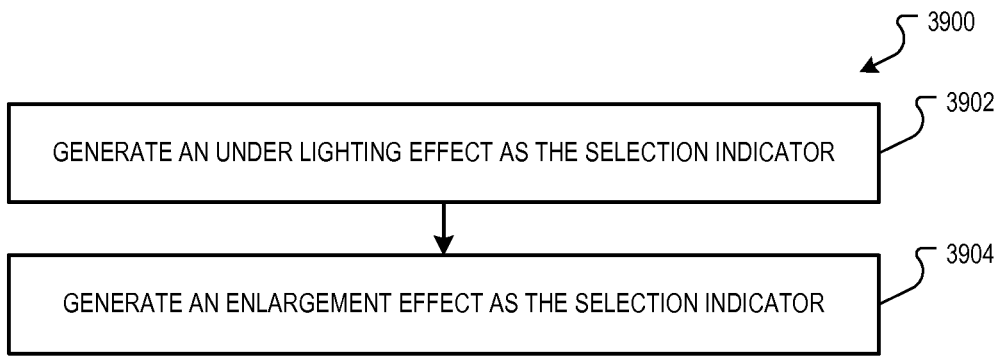
FIG. 39 is a flow diagram of an example process for generating a selection indicator.

FIG. 39 is a flow diagram of an example process 3900 for generating a selection indicator. The process 3900 can, for example, be implemented in a processing device, such as the system 100 of FIG. 1, implementing user interface software and/or hardware, such as the example implementations described with respect to FIGS. 2, 5 and 6.

Stage 3902 generates an under lighting effect as the selection indicator. For example, the system 100, implementing any one of the UI engines described in FIGS. 2, 5 and 6, can generate an under lighting effect as the selection indicator, such as the selection indicator 1822 of FIG. 18B.

Stage 3904 generates an enlargement effect as the selection indicator. For example, the system 100, implementing any one of the UI engines described in FIGS. 2, 5 and 6, can generate an enlargement effect as the selection indicator, such as the enlargement of the stack indicator 1806 as shown in FIG. 18B.

Figure 40:
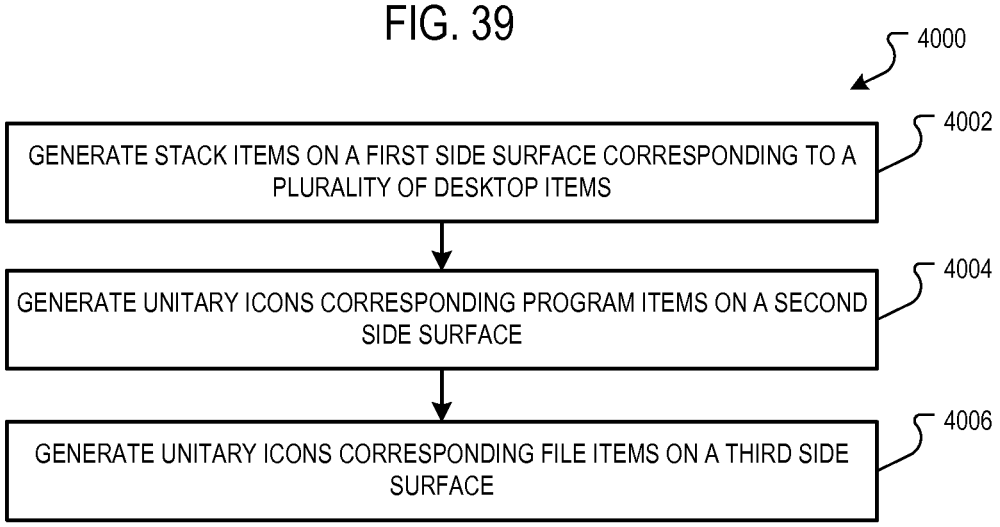
FIG. 40 is a flow diagram of an example process for rendering desktop items.

FIG. 40 is a flow diagram of an example process 4000 for rendering desktop items. The process 4000 can, for example, be implemented in a processing device, such as the system 100 of FIG. 1, implementing user interface software and/or hardware, such as the example implementations described with respect to FIGS. 2, 5 and 6.

Stage 4002 generates stack items on a first side surface corresponding to a plurality of desktop items. For example, the system 100, implementing any one of the UI engines described in FIGS. 2, 5 and 6, can generate stack items on a first side surface corresponding to a plurality of desktop items, such as the stack items 1202, 1204, 1206, 1208 and 1212, and the visualization object receptacle 1114 and icons 1122, 1124, 1126, 1128, 1130 and 1132 as shown in FIG. 12.

Stage 4004 generates icons corresponding to program items on a second side surface. For example, the system 100, implementing any one of the UI engines described in FIGS. 2, 5 and 6, can generate icons corresponding to program items on a second side surface, such as the application icon 1222 on the surface 1112, as shown in FIG. 12.

Stage 4006 generates icons corresponding to file items on a third side surface. For example, the system 100, implementing any one of the UI engines described in FIGS. 2, 5 and 6, can generate icons corresponding to file items on a third side surface, such as the file desktop item 1220 on the surface 1108 of FIG. 12.

Figure 41:
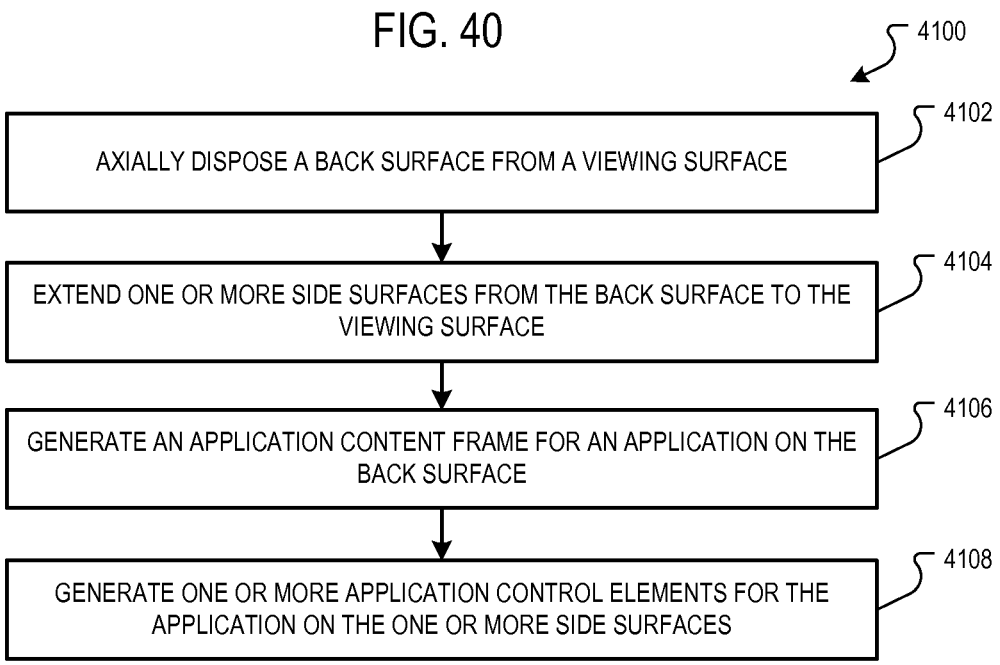
FIG. 41 is a flow diagram of an example process for generating an example application environment in a multidimensional desktop environment.

FIG. 41 is a flow diagram of an example process 4100 for generating an example application environment in a multidimensional desktop environment. The process 4100 can, for example, be implemented in a processing device, such as the system 100 of FIG. 1, implementing user interface software and/or hardware, such as the example implementations described with respect to FIGS. 2, 5 and 6.

Stage 4102 axially disposes a back surface from a viewing surface. For example, the system 100, implementing any one of the UI engines described in FIGS. 2, 5 and 6, can axially dispose a back surface from a viewing surface, such as the back surface 1102 that is axially disposed from the viewing surface in FIG. 14.

Stage 4104 extends one or more side surfaces from the back surface to the viewing surface. For example, the system 100, implementing any one of the UI engines described in FIGS. 2, 5 and 6, can extend one or more side surfaces from the back surface to the viewing surface, such as the side surfaces 1106, 1108, and 1112, as shown in FIG. 14.

Stage 4106 generates an application content frame for an application on the back surface. For example, the system 100, implementing any one of the UI engines described in FIGS. 2, 5 and 6, can generate an application content frame for an application on the back surface, such as the application content frame 1410 on the back surface 1102, as shown in FIG. 14.

Stage 4108 generates one or more application control elements for the application on the one or more side surfaces. For example, the system 100, implementing any one of the UI engines described in FIGS. 2, 5 and 6, can generate one or more application control elements for the application on the one or more side surfaces, such as the function icons 1422, 1424, 1426 and 1428, as shown in FIG. 14. The application control elements, e.g., the function icons 1422, 1424, 1426 and 1428, can be used to control functions of the application, such as editing commands for an editing environment displayed in an application content frame on the back surface.

Figure 42:
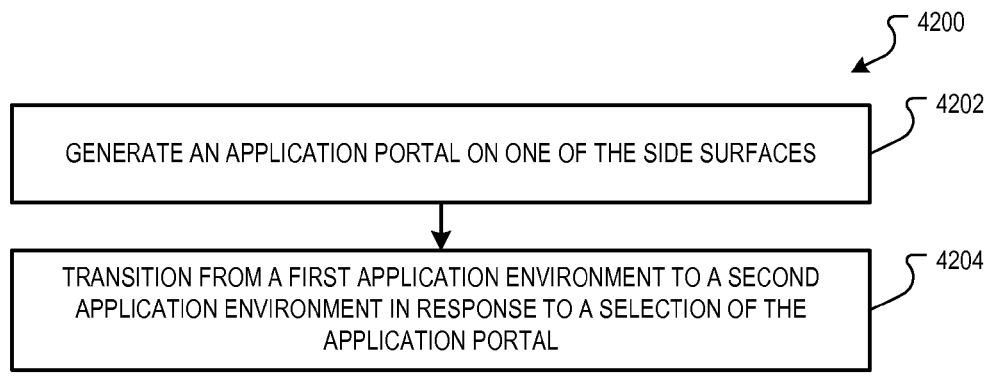
FIG. 42 is a flow diagram of an example process for transitioning between application environments.

FIG. 42 is a flow diagram of an example process 4200 for transitioning between application environments. The process 4200 can, for example, be implemented in a processing device, such as the system 100 of FIG. 1, implementing user interface software and/or hardware, such as the example implementations described with respect to FIGS. 2, 5 and 6.

Stage 4202 generates an application portal on one of the side surfaces. For example, the system 100, implementing any one of the UI engines described in FIGS. 2, 5 and 6, can generate an application portal on one of the side surfaces, such as the stack item 1510 that includes stack elements 1512 and 1514 that correspond to portals, as shown in FIG. 15.

Stage 4204 transitions from a first application environment to a second application environment in response to a selection of the application portal. For example, the system 100, implementing any one of the UI engines described in FIGS. 2, 5 and 6, can transition from a first application environment to a second application environment in response to a selection of the application portal. As described with respect to FIG. 15, selection of the stack element 1514 can transition to another application environment.

Figure 43:
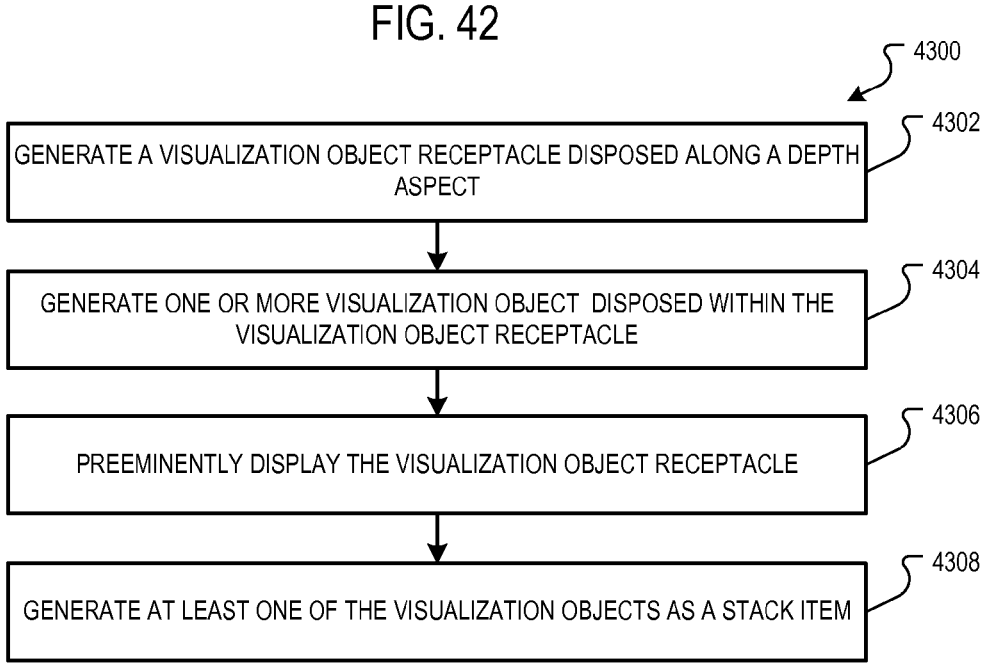
FIG. 43 is a flow diagram of an example process for generating a visualization object receptacle.

FIG. 43 is a flow diagram of an example process 4300 for generating a visualization object receptacle. The process 4300 can, for example, be implemented in a processing device, such as the system 100 of FIG. 1, implementing user interface software and/or hardware, such as the example implementations described with respect to FIGS. 2, 5 and 6.

Stage 4302 generates a visualization object receptacle disposed along a depth aspect. For example, the system 100, implementing any one of the UI engines described in FIGS. 2, 5 and 6, can generate a visualization object receptacle disposed along a depth aspect, such as the visualization object receptacle 1114, as shown in FIG. 12.

Stage 4304 generates one or more visualization objects disposed within the visualization object receptacle. For example, the system 100, implementing any one of the UI engines described in FIGS. 2, 5 and 6, can generate one or more visualization objects disposed within the visualization object receptacle, such as the visualization objects 1122, 1124, 1126, 1128, 1130 and 1132, as shown in FIG. 12.

Stage 4306 preeminently displays the visualization object receptacle. For example, the system 100, implementing any one of the UI engines described in FIGS. 2, 5 and 6, can preeminently display the visualization object receptacle, such as by displaying the visualization object receptacle near the viewing surface of FIG. 12, or by displaying the visualization object receptacle as described with respect to the visualization object receptacle 714 of FIG. 8.

Stage 4308 generates at least one of the visualization objects as a stack item. For example, the system 100, implementing any one of the UI engines described in FIGS. 2, 5 and 6, can generate at least one of the visualization objects as a stack item, such as the stack items 1128 and 1130 as shown in FIG. 12.

Figure 44:
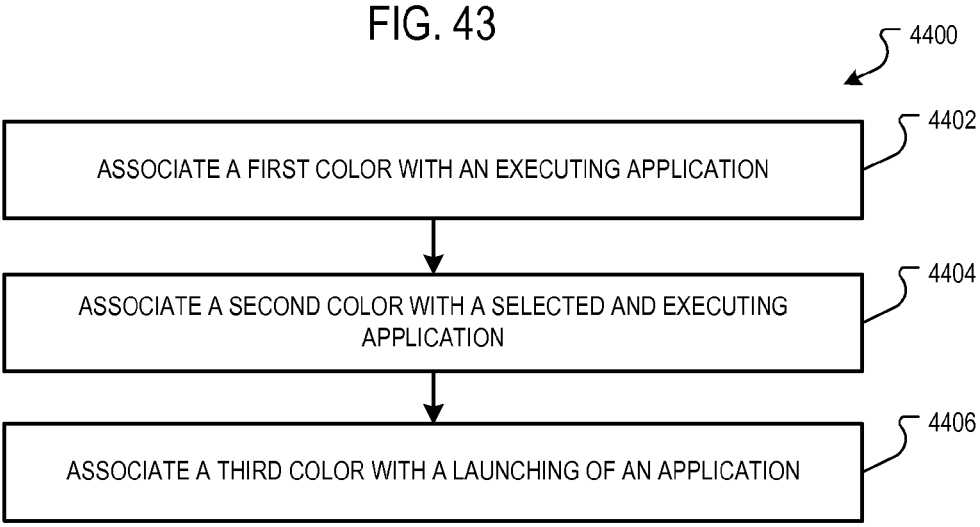
FIG. 44 is a flow diagram of an example process for color coding visualization objects.

FIG. 44 is a flow diagram of an example process 4400 for color coding visualization objects. The process 4400 can, for example, be implemented in a processing device, such as the system 100 of FIG. 1, implementing user interface software and/or hardware, such as the example implementations described with respect to FIGS. 2, 5 and 6.

Stage 4402 associates a first color with an executing application. For example, the system 100, implementing any one of the UI engines described in FIGS. 2, 5 and 6, can associate a first color with an executing application, such as the status indicator 1830, as shown in FIG. 18D.

Stage 4404 associates a second color with a selected and executing application. For example, the system 100, implementing any one of the UI engines described in FIGS. 2, 5 and 6, can associate a second color with a selected and executing application, such as the status indicator 1832, as shown in FIG. 18D.

Stage 4406 associates a third color with a launching of an application. For example, the system 100, implementing any one of the UI engines described in FIGS. 2, 5 and 6, can associate a third color with a launching of an application, such as the status indicator 1834, as shown in FIG. 18D.

Figure 45:
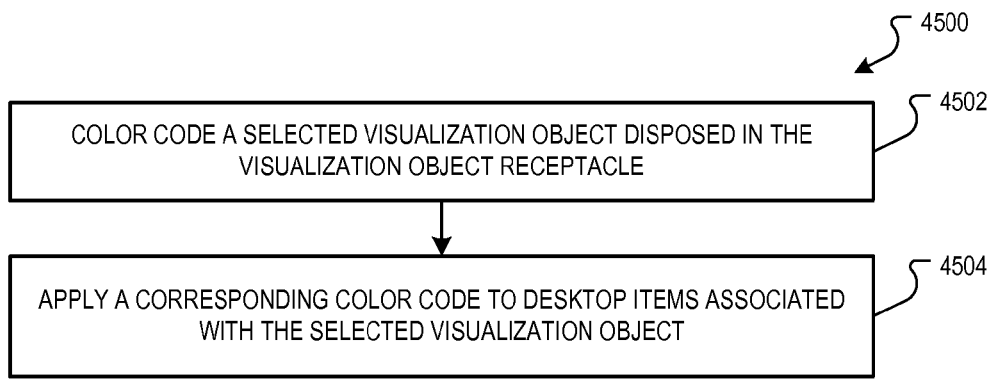
FIG. 45 is a flow diagram of an example process for color coding visualization objects of related system objects.

FIG. 45 is a flow diagram of an example process 4500 for color coding visualization objects of related system objects. The process 4500 can, for example, be implemented in a processing device, such as the system 100 of FIG. 1, implementing user interface software and/or hardware, such as the example implementations described with respect to FIGS. 2, 5 and 6.

Stage 4502 color codes a selected visualization object disposed in the visualization object receptacle. For example, the system 100, implementing any one of the UI engines described in FIGS. 2, 5 and 6, can color code a selected visualization object disposed in the visualization object receptacle, such as color coding the visualization object 2206, as shown in FIG. 22.

Stage 4504 applies a corresponding color code to the desktop items associated with the selected visualization object. For example, the system 100, implementing any one of the UI engines described in FIGS. 2, 5 and 6, can apply a corresponding color code to the desktop items associated with the selected visualization object, such as color coding the stack item 2208, the folder 2210 and the window 2212, as shown in FIG. 22.

Figure 46:
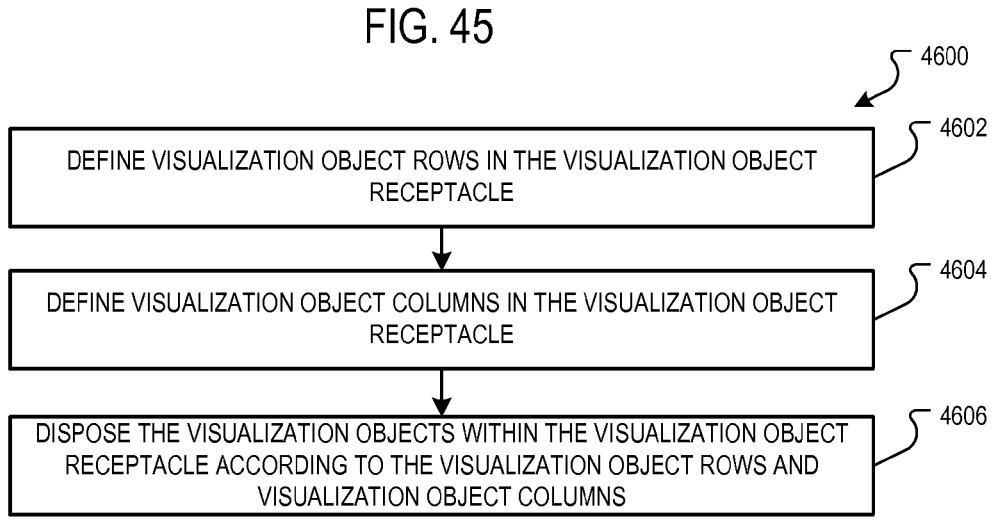
FIG. 46 is a flow diagram of another example process for generating a visualization object receptacle.

FIG. 46 is a flow diagram of another example process 4600 for generating a visualization object receptacle. The process 4600 can, for example, be implemented in a processing device, such as the system 100 of FIG. 1, implementing user interface software and/or hardware, such as the example implementations described with respect to FIGS. 2, 5 and 6.

Stage 4602 defines visualization object rows in the visualization object receptacle. For example, the system 100, implementing any one of the UI engines described in FIGS. 2, 5 and 6, can define visualization object rows in the visualization object receptacle, such as the visualization object rows 2312 and 2314, as shown in FIG. 23.

Stage 4604 defines visualization object columns in the visualization object receptacle. For example, the system 100, implementing any one of the UI engines described in FIGS. 2, 5 and 6, can define visualization object columns in the visualization object receptacle, such as the visualization object columns 2322, 2324, 2326, 2328, 2330, and 2332, as shown in FIG. 23.

Stage 4606 disposes the visualization objects within the visualization object receptacle according to the visualization object rows and visualization object columns. For example, the system 100, implementing any one of the UI engines described in FIGS. 2, 5 and 6, can dispose the visualization objects within the visualization object receptacle according to the visualization object rows and visualization object columns, as indicated by the solid and dashed arrows shown in FIG. 23.

Figure 47:
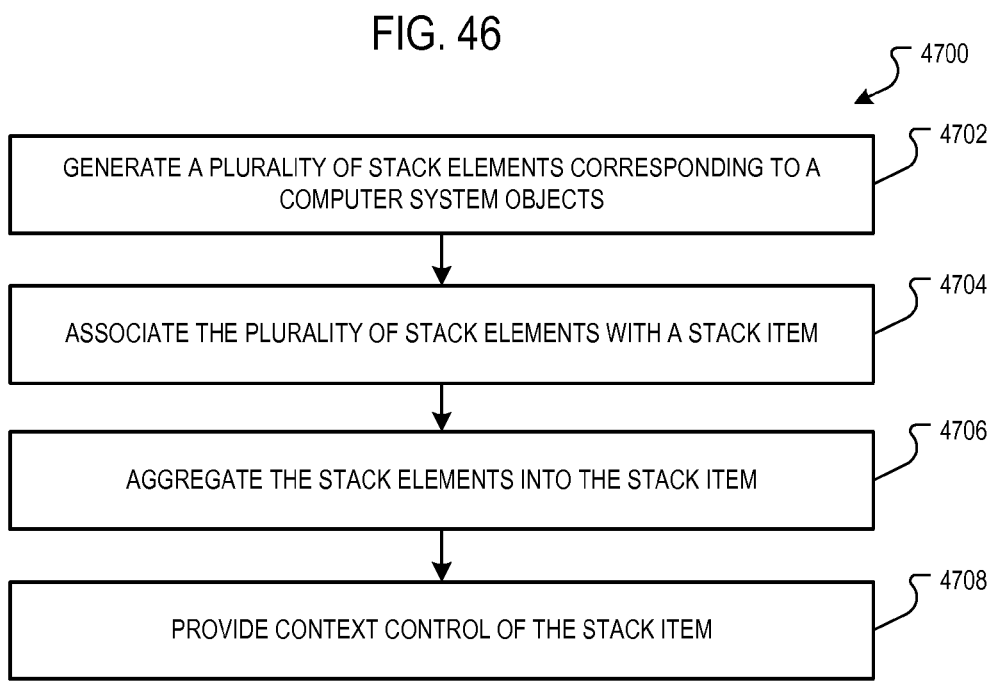
FIG. 47 is a flow diagram of an example process for generating a stack item.

FIG. 47 is a flow diagram of an example process 4700 for generating a stack item. The process 4700 can, for example, be implemented in a processing device, such as the system 100 of FIG. 1, implementing user interface software and/or hardware, such as the example implementations described with respect to FIGS. 2, 5 and 6.

Stage 4702 generates or identifies a plurality of stack elements corresponding to computer system objects. For example, the system 100, implementing any one of the UI engines described in FIGS. 2, 5 and 6, can generate a plurality of stack elements corresponding to computer system objects, such as the stack elements shown in FIG. 29.

Stage 4704 associates the plurality of stack elements with a stack item. For example, the system 100, implementing any one of the UI engines described in FIGS. 2, 5 and 6, can associate the plurality of stack elements with a stack item, such as the stack item 2900, as shown in FIG. 29.

Stage 4706 aggregates the stack elements into the stack item. For example, the system 100, implementing any one of the UI engines described in FIGS. 2, 5 and 6, can aggregate the stack elements into the stack item, such as by overlapping the stack elements to form the stack item in FIG. 29.

Stage 4708 provides context control of the stack item. For example, the system 100, implementing any one of the UI engines described in FIGS. 2, 5 and 6, can provides context control of the stack item, such as the application context 2910, as shown in FIG. 29.

Figure 48:
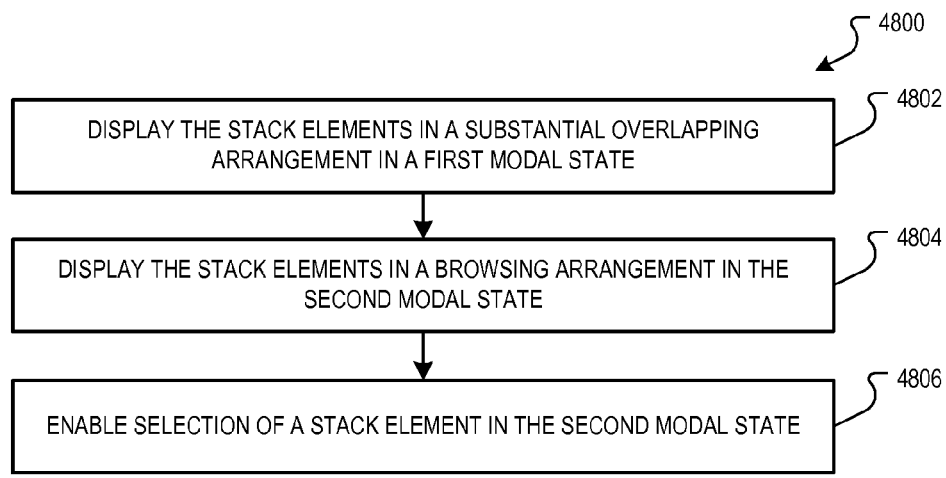
FIG. 48 is a flow diagram of an example process for displaying stack elements according to modal states.

FIG. 48 is a flow diagram of an example process 4800 for displaying stack elements according to modal states. The process 4800 can, for example, be implemented in a processing device, such as the system 100 of FIG. 1, implementing user interface software and/or hardware, such as the example implementations described with respect to FIGS. 2, 5 and 6.

Stage 4802 displays the stack elements in a substantial overlapping arrangement in a first modal state. For example, the system 100, implementing any one of the UI engines described in FIGS. 2, 5 and 6, can display the stack elements in a substantial overlapping arrangement in a first modal state, such as the overlapping arrangement of the stack items in the stack element 3000 in the first modal state, as shown in FIG. 30.

Stage 4804 displays the stack elements in a browsing arrangement in the second modal state. For example, the system 100, implementing any one of the UI engines described in FIGS. 2, 5 and 6, can display the stack elements in a browsing arrangement in the second modal state, such as the fanning arrangement defined by the first terminus 3020 and the second terminus 3022, as shown in FIG. 30.

Stage 4806 enables the selection of a stack element in the second modal state. For example, the system 100, implementing any one of the UI engines described in FIGS. 2, 5 and 6, can enable the selection of a stack element in the second modal state, such as a selection of the preeminently disposed stack element 3002, as shown in FIG. 30.

Figure 49:
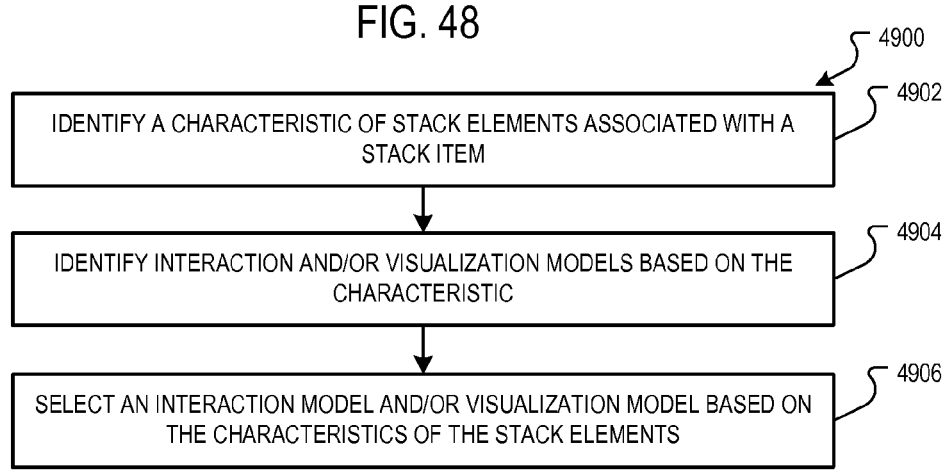
FIG. 49 is a flow diagram of an example process for selecting interaction models and/or visualization models.

FIG. 49 is a flow diagram of an example process 4900 for selecting interaction models and/or visualization models. The process 4900 can, for example, be implemented in a processing device, such as the system 100 of FIG. 1, implementing user interface software and/or hardware, such as the example implementations described with respect to FIGS. 2, 5 and 6.

Stage 4902 identifies a characteristic of stack elements associated with a stack item. For example, the system 100, implementing any one of the UI engines described in FIGS. 2, 5 and 6, can identify a quantity of stack elements associated with the stack item, such as the quantity of stack elements 3002, 3004, 3006, 3008 and 3010, as shown in FIG. 30, or a type associated with the stack item.

Stage 4904 identifies interaction models and/or visualization models. For example, the system 100, implementing any one of the UI engines described in FIGS. 2, 5 and 6, can identify a plurality of visualization models, e.g., browsing arrangements, such as the browsing arrangements described with respect to FIGS. 30 and 31, or interaction models, such as the interaction models described with respect to FIGS. 33A and 33B.

Stage 4906 selects an interaction model and/or visualization model based on the characteristic of the stack elements (e.g., the quantity of stack elements, or the type of the stack elements). For example, the system 100, implementing any one of the UI engines described in FIGS. 2, 5 and 6, can select one of a plurality of browsing arrangements, such as selection the fanning arrangement, as shown in FIG. 30, or select one of a plurality of interaction modes, as described with respect to FIGS. 33A and 33B.

Figure 50:
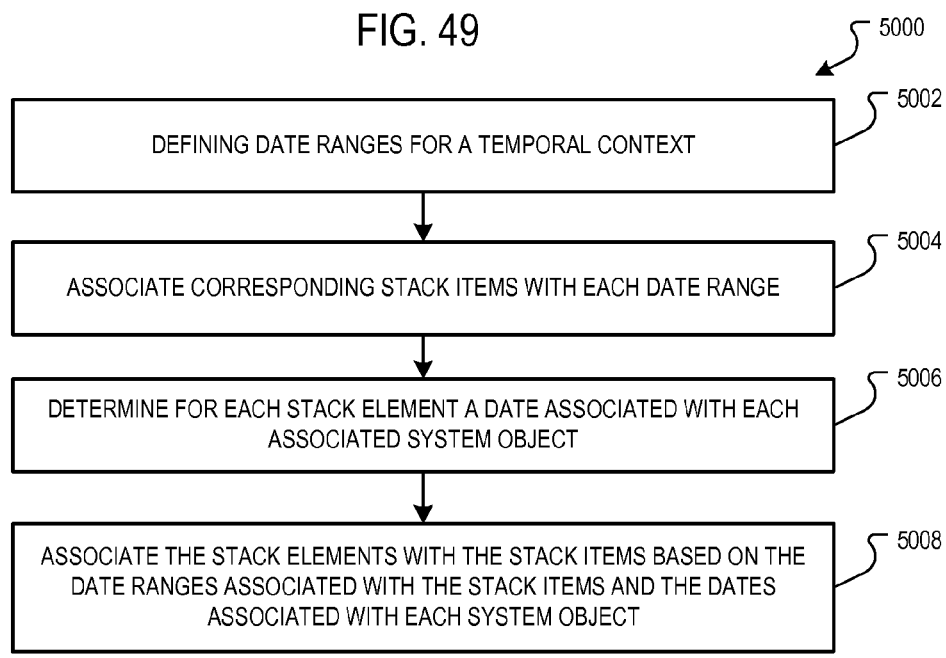
FIG. 50 is a flow diagram of another example process for generating a stack item.

FIG. 50 is a flow diagram of another example process 5000 for generating a stack item. The process 5000 can, for example, be implemented in a processing device, such as the system 100 of FIG. 1, implementing user interface software and/or hardware, such as the example implementations described with respect to FIGS. 2, 5 and 6.

Stage 5002 defines the date ranges for a temporal context. For example, the system 100, implementing any one of the UI engines described in FIGS. 2, 5 and 6, can define the date ranges for a temporal context, such as the date ranges described with respect to FIGS. 28A and 28B.

Stage 5004 associates the corresponding stack items with each date range. For example, the system 100, implementing any one of the UI engines described in FIGS. 2, 5 and 6, can associate the corresponding stack items with each date range, such as the stack items 2802, 2804 and 2806 in FIGS. 28A and 28B.

Stage 5006 determines for each stack element a date associated with each associated system object. For example, the system 100, implementing any one of the UI engines described in FIGS. 2, 5 and 6, can determine for each stack element a date associated with each associated system object, such as a file modification date, as described with respect to FIGS. 28A and 28B.

Stage 5008 associates the stack elements with the stack items based on the date ranges associated with the stack items and the dates associated with each system object. For example, the system 100, implementing any one of the UI engines described in FIGS. 2, 5 and 6, can associate the stack elements with the stack items based on the date ranges associated with the stack items and the dates associated with each system object, such as the stack elements associated with the stack items 2802, 2804 and 2806, as shown in FIG. 28.

Figure 51:
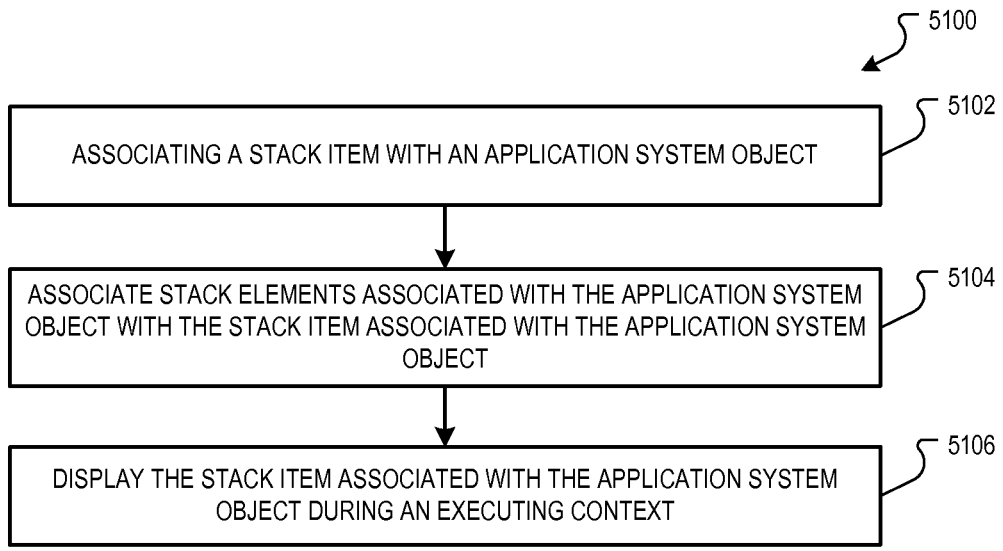
FIG. 51 is a flow diagram of an example process for displaying a stack item according to an execution context.

FIG. 51 is a flow diagram of an example process 5100 for displaying a stack item according to an execution context. The process 5100 can, for example, be implemented in a processing device, such as the system 100 of FIG. 1, implementing user interface software and/or hardware, such as the example implementations described with respect to FIGS. 2, 5 and 6.

Stage 5102 associates a stack item with an application system object. For example, the system 100, implementing any one of the UI engines described in FIGS. 2, 5 and 6, can associate a stack item with an application system object, such as the association of the stack item 2900 with an application, as shown in FIG. 29.

Stage 5104 associates stack elements associated with the application system object with the stack item associated with the application system object. For example, the system 100, implementing any one of the UI engines described in FIGS. 2, 5 and 6, can associate stack elements associated with the application system object with the stack item associated with the application system object, such as the stack elements of the stack item 2900, as shown in FIG. 29.

Stage 5106 displays the stack item associated with the application system object during an executing context. For example, the system 100, implementing any one of the UI engines described in FIGS. 2, 5 and 6, can display the stack item associated with the application system object during an executing context, such as the displaying of the stack item 2900 during an executing and selected state 2912, as shown in FIG. 29.

Figure 52:
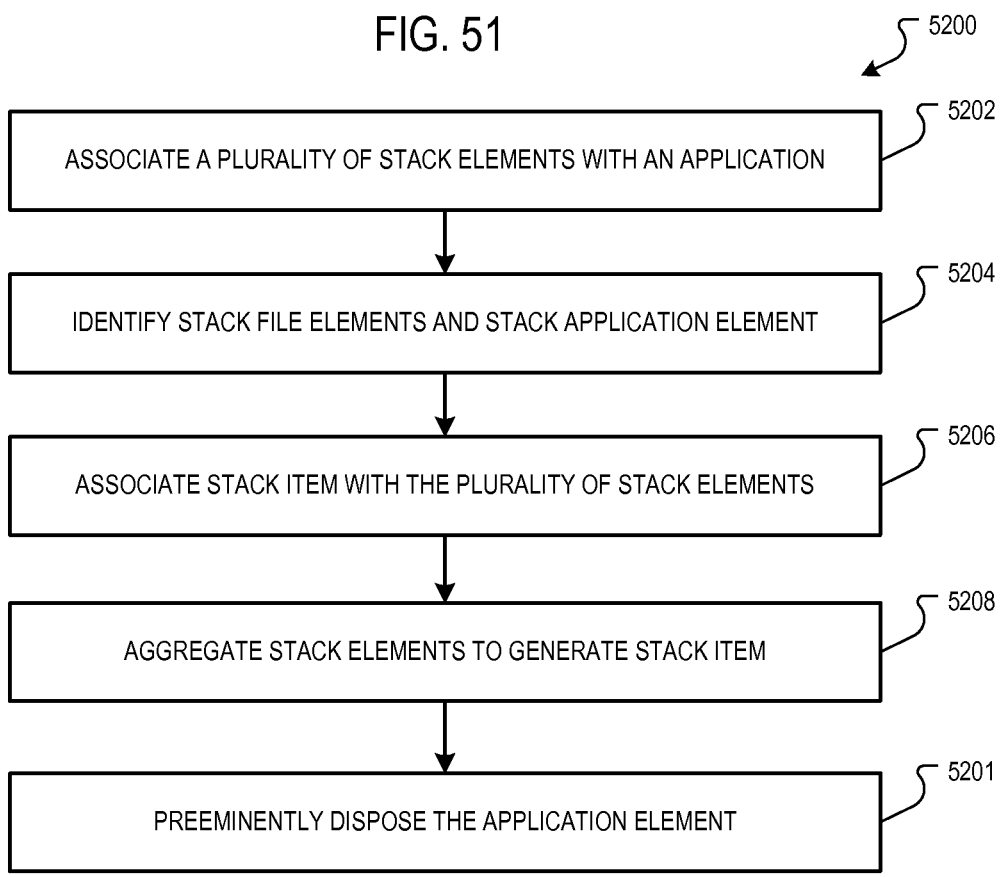
FIG. 52 is a flow diagram of an example process for generating and displaying a stack item.

FIG. 52 is a flow diagram of an example process 5200 for generating and displaying a stack item. The process 5200 can, for example, be implemented in a processing device, such as the system 100 of FIG. 1, implementing user interface software and/or hardware, such as the example implementations described with respect to FIGS. 2, 5 and 6.

Stage 5202 associates a plurality of stack elements with an application. For example, the system 100, implementing any one of the UI engines described in FIGS. 2, 5 and 6, can associate a plurality of stack elements with an application, such as the stack element 2600 with an application, as shown in FIGS. 26 and 27.

Stage 5204 identifies stack file elements and stack application elements. For example, the system 100, implementing any one of the UI engines described in FIGS. 2, 5 and 6, can identify stack file elements and stack application elements, such as the file elements 2604, 2606, 2608 and 2610 and the application element 2602, as shown in FIGS. 26 and 27.

Stage 5206 associates a stack item with the plurality of stack items. For example, the system 100, implementing any one of the UI engines described in FIGS. 2, 5 and 6, can associate a stack item with the plurality of stack elements, such as the stack time 2600 with the stack elements 2602, 2604, 2606, 2608 and 2610, as shown in FIGS. 26 and 27.

Stage 5208 aggregates stack elements to generate stack items. For example, the system 100, implementing any one of the UI engines described in FIGS. 2, 5 and 6, can aggregate stack elements to generate stack items, such as the aggregation shown in FIG. 26 or 27.

Stage 5210 preeminently disposes the application element. For example, the system 100, implementing any one of the UI engines described in FIGS. 2, 5 and 6, can preeminently dispose the application element, such as the preeminently disposed stack element 2602, as shown in FIG. 26 or 27.

Figure 53:
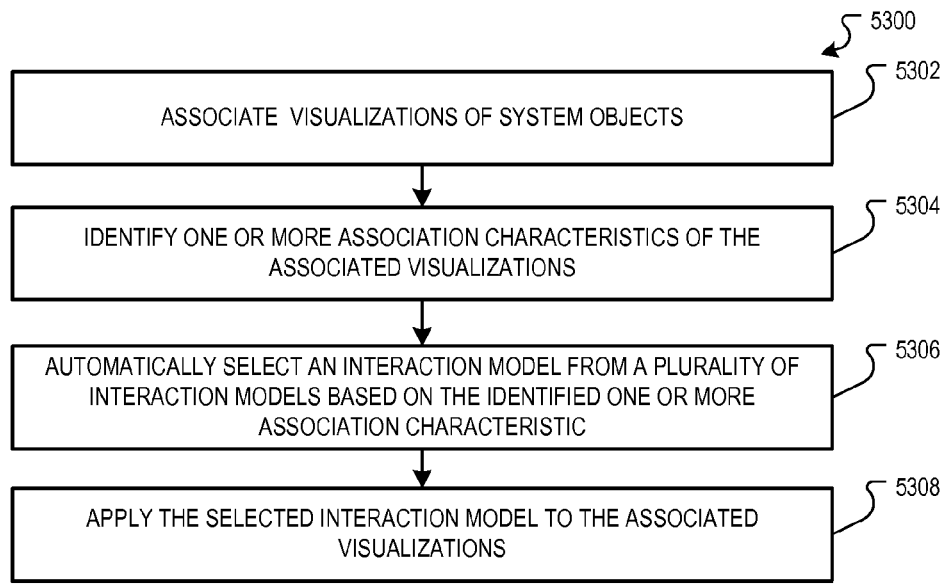
FIG. 53 is a flow diagram of an example process for automatically selecting and applying an interaction model to a stack item.

FIG. 53 is a flow diagram of an example process 5300 for automatically selecting and applying an interaction model to a stack item. The process 5300 can, for example, be implemented in a processing device, such as the system 100 of FIG. 1, implementing user interface software and/or hardware, such as the example implementations described with respect to FIGS. 2, 5 and 6.

Stage 5302 associates visualizations of system objects. For example, the system 100, implementing any one of the UI engines described in FIGS. 2, 5 and 6, can associate the visualizations of system objects, such as the visualizations corresponding to the stack elements 3002, 3004, 3006, 3008 and 3010, as shown in FIG. 30.

Stage 5304 identifies one or more association characteristics of the associated visualizations. For example, the system 100, implementing any one of the UI engines described in FIGS. 2, 5 and 6, can identify or more association characteristics of the associated visualizations, such s the number of stack elements shown in FIG. 30.

Stage 5306 automatically selects an interaction model from a plurality of interaction models based on the identified one or more associated characteristics. For example, the system 100, implementing any one of the UI engines described in FIGS. 2, 5 and 6, can automatically select an interaction model from a plurality of interaction models based on the identified one or more associated characteristics, such as selecting one of the interaction models shown in FIGS. 30 and 31.

Stage 5308 applies the selected interaction model to the associated visualizations. For example, the system 100, implementing any one of the UI engines described in FIGS. 2, 5 and 6, can apply the selected interaction model to the associated visualizations, such as the fanning arrangement as shown in FIG. 30.

Figure 54:
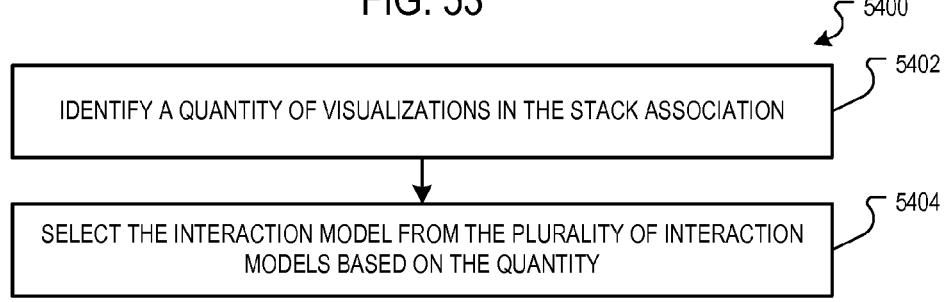
FIG. 54 is a flow diagram of another example process for automatically selecting and applying an interaction model to a stack item.

FIG. 54 is a flow diagram of another example process 5400 for automatically selecting and applying an interaction model to a stack item. The process 5400 can, for example, be implemented in a processing device, such as the system 100 of FIG. 1, implementing user interface software and/or hardware, such as the example implementations described with respect to FIGS. 2, 5 and 6.

Stage 5402 identifies a quantity of visualizations in the stack association. For example, the system 100, implementing any one of the UI engines described in FIGS. 2, 5 and 6, can identify a quantity of visualizations in the stack association, such as the quantity of stack elements 3102, 3104, 3106 and 3108, as shown in FIG. 31A.

Stage 5404 selects the interaction model from the plurality of interaction models based on the quantity. For example, the system 100, implementing any one of the UI engines described in FIGS. 2, 5 and 6, can select the interaction model from the plurality of interaction models based on the quantity, such as the interaction model shown in FIG. 31A.

Figure 55:
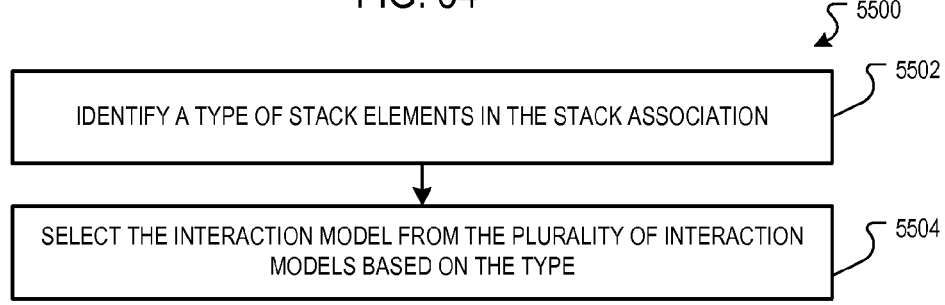
FIG. 55 is a flow diagram of another example process for automatically selecting and applying an interaction model to a stack item.

FIG. 55 is a flow diagram of another example process 5500 for automatically selecting and applying an interaction model to a stack item. The process 4000 can, for example, be implemented in a processing device, such as the system 100 of FIG. 1, implementing user interface software and/or hardware, such as the example implementations described with respect to FIGS. 2, 5 and 6.

Stage 5502 identifies a type of stack element in the stack association. For example, the system 100, implementing any one of the UI engines described in FIGS. 2, 5 and 6, can identify a type of stack element in the stack association, such as, for example, a document type.

Stage 5504 selects the interaction model from the plurality of interaction models based on the type. For example, the system 100, implementing any one of the UI engines described in FIGS. 2, 5 and 6, can select the interaction model from the plurality of interaction models based on the type, such as, for example, an interaction model designed for the document type.

Figure 56:
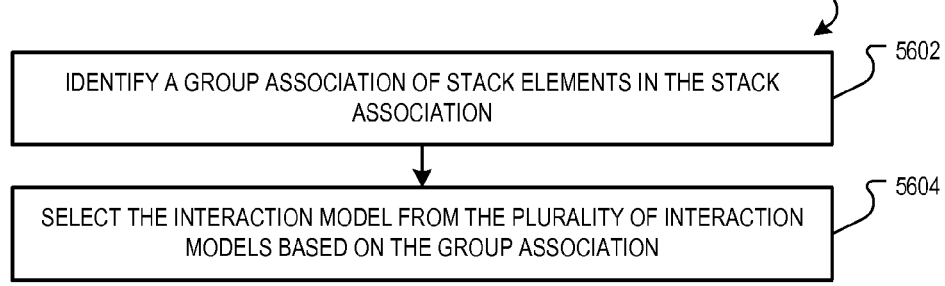
FIG. 56 is a flow diagram of another example process for automatically selecting and applying an interaction model to a stack item.

FIG. 56 is a flow diagram of another example process 5600 for automatically selecting and applying an interaction model to a stack item. The process 5600 can, for example, be implemented in a processing device, such as the system 100 of FIG. 1, implementing user interface software and/or hardware, such as the example implementations described with respect to FIGS. 2, 5 and 6.

Stage 5602 identifies a group association of stack elements in the stack association. For example, the system 100, implementing any one of the UI engines described in FIGS. 2, 5 and 6, can identify a group association of stack elements in the stack association, such as the project association of FIG. 33A.

Stage 5604 selects the interaction model from the plurality of interaction models based on the group association. For example, the system 100, implementing any one of the UI engines described in FIGS. 2, 5 and 6, can select the interaction model from the plurality of interaction models based on the group association, such as a multiple launch interaction model, a synchronization interaction model, or a reconciliation interaction model.

Figure 57:
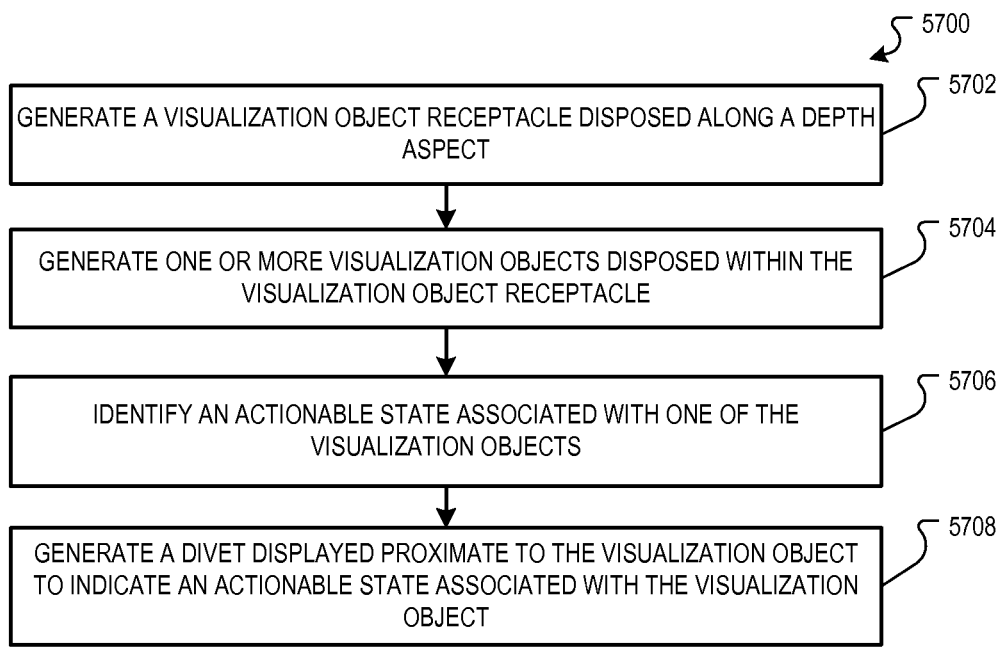
FIG. 57 is a flow diagram of an example process for generating a divet.

FIG. 57 is a flow diagram of an example process 5700 for generating a divet. The process 5700 can, for example, be implemented in a processing device, such as the system 100 of FIG. 1, implementing user interface software and/or hardware, such as the example implementations described with respect to FIGS. 2, 5 and 6.

Stage 5702 generates a visualization object receptacle disposed along a depth aspect. For example, the system 100, implementing any one of the UI engines described in FIGS. 2, 5 and 6, can generate the visualization object receptacle 1802 of FIG. 19A.

Stage 5704 generates one or more visualization objects disposed within the visualization object receptacle. For example, the system 100, implementing any one of the UI engines described in FIGS. 2, 5 and 6, can generate the one or more visualization objects 1804, 1806, 1808, 1810, 1812 and 1814 of FIG. 19A.

Stage 5706 identifies an actionable state associated with one of the visualization objects. For example, the system 100, implementing any one of the UI engines described in FIGS. 2, 5 and 6, can identify an actionable state, e.g., a system update availability, associated with the visualization object 1804 of FIG. 19A.

Stage 5708 generates a divet displayed proximate to the visualization object to indicate an actionable state associated with the visualization object. For example, the system 100, implementing any one of the UI engines described in FIGS. 2, 5 and 6, can generate the divet 1902 of FIG. 19A.

Figure 58:
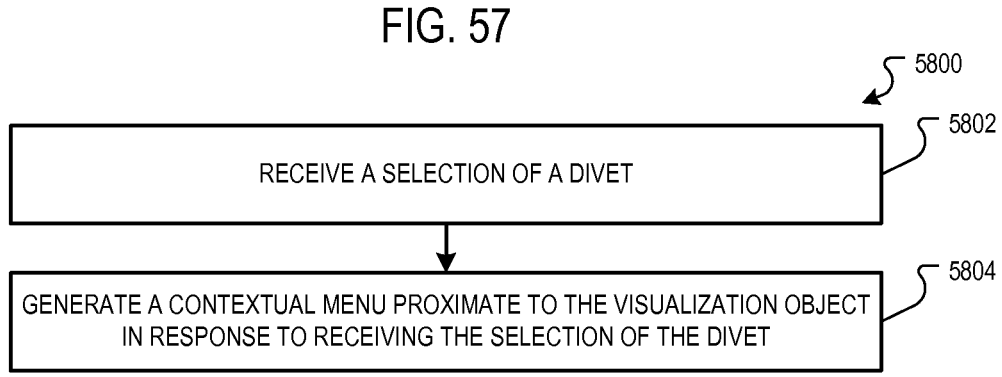
FIG. 58 is a flow diagram of an example process for generating a divet contextual menu.

FIG. 58 is a flow diagram of an example process 5800 for generating a divet contextual menu. The process 5800 can, for example, be implemented in a processing device, such as the system 100 of FIG. 1, implementing user interface software and/or hardware, such as the example implementations described with respect to FIGS. 2, 5 and 6.

Stage 5802 receives a selection of the divet. For example, the system 100, implementing any one of the UI engines described in FIGS. 2, 5 and 6, can receive a selection, e.g., a mouse click, of the divet 1902 of FIG. 19A.

Stage 5804 generates a contextual menu proximate to the visualization object in response to receiving the selection divet. For example, the system 100, implementing any one of the UI engines described in FIGS. 2, 5 and 6, can generate the contextual menu 1910 of FIG. 19B.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A non-transitory computer readable medium storing instructions that are executable by a processing device, and upon such execution cause the processing device to perform operations comprising:
    displaying, in a graphical user interface (GUI) on a display device, a stack item comprising stack elements;
    comparing a quantity of the stack elements in the stack item with a threshold value;
    selecting a stack element arrangement from among a fan arrangement and a matrix arrangement based on the comparison between the quantity of the stack elements in the stack item and the threshold value, wherein, when displayed in the fan arrangement, the stack elements are distributed along a curved path; and
    in response to an action on the stack item, displaying the stack elements in the selected stack element arrangement,
    wherein the operation of displaying the stack elements in the selected stack element arrangement comprises displaying, in the selected stack element arrangement, in addition to the stack elements, a command object, which when selected, causes display of the stack elements in a file system window.

2. The non-transitory computer readable medium of claim 1 in which the stack elements are displayed in the selected stack element arrangement in response to a mouse over on the stack item.

3. The non-transitory computer readable medium of claim 1, wherein the stack elements comprise one or more window instances.

4. The non-transitory computer readable medium of claim 1, wherein at least one of the stack elements represents a desktop menu.

5. The non-transitory computer readable medium of claim 1, wherein the stack elements comprise icons.

6. The non-transitory computer readable medium of claim 1, wherein the graphical user interface comprises:
    a three-dimensional desktop defining a depth aspect comprises a viewing surface; and
    a visualization object receptacle preeminently disposed relative to the viewing surface.

7. The non-transitory computer readable medium of claim 6, wherein the stack item is displayed on the visualization object receptacle.

8. The non-transitory computer readable medium of claim 1, wherein the fan arrangement is selected when the quantity of the stack elements exceeds the threshold value, otherwise the matrix arrangement is selected when the quantity of stack elements is at most the threshold value.

9. The non-transitory computer readable medium of claim 1, wherein
    a frame of the GUI is aligned squarely relative to the display device, and
    when the stack elements are distributed along the curved path of the fan arrangement, two or more of the stack elements are rotated relative to each other and relative to the frame of the GUI.

10. The non-transitory computer readable medium of claim 9, wherein labels of the two or more rotated stack elements also are rotated relative to each other and relative to the frame of the GUI.

11. The non-transitory computer readable medium of claim 9, wherein the rotated stack elements are aligned with a normal to the curved path at respective locations of the stack elements along the curved path.

12. The non-transitory computer readable medium of claim 9, wherein, when the stack elements are displayed in the matrix arrangement, representations of the stack elements are aligned squarely relative to the frame of the GUI.

13. The non-transitory computer readable medium of claim 12, wherein labels of the squarely aligned stack elements also are squarely aligned relative to each other and relative to the frame of the GUI.

14. The non-transitory computer readable medium of claim 12, wherein the squarely aligned stack elements are surrounded by a visualization frame.

15. The non-transitory computer readable medium of claim 1, wherein the operation of displaying the stack elements in the selected stack element arrangement comprises:
removing the stack item from the GUI;
displaying a user interface object for collapsing the stack element arrangement at a location of the GUI where the stack item was displayed prior to its removal; and
displaying the stack elements in the selected stack element arrangement adjacent to the user interface object for collapsing the stack element arrangement.

16. The non-transitory computer readable medium of claim 15, wherein the operations further comprise:
while displaying the user interface object for collapsing the stack element arrangement adjacent to the stack element arrangement, detecting selection of the user interface object for collapsing the stack element; and
in response to detecting selection of the user interface object for collapsing the stack element arrangement, ceasing to display the stack element arrangement and redisplaying the stack item.

17. A system, comprising:
one or more hardware processors; and
memory encoding instructions that, when executed by the one or more hardware processors, cause the system to perform operations comprising:
displaying, in a graphical user interface (GUI) on a display device, a stack item comprising stack elements;
comparing a quantity of the stack elements in the stack item with a threshold value;
selecting a stack element arrangement from among a fan arrangement and a matrix arrangement based on the comparison between the quantity of the stack elements in the stack item and the threshold value, wherein, when displayed in the fan arrangement, the stack elements are distributed along a curved path; and
in response to an action on the stack item, displaying the stack elements in the selected stack element arrangement,
wherein the operation of displaying the stack elements in the selected stack element arrangement comprises displaying, in the selected stack element arrangement, in addition to the stack elements, a command object, which when selected, causes display of the stack elements in a file system window.

18. The system of claim 17, wherein the fan arrangement is selected when the quantity of the stack elements exceeds the threshold value, otherwise the matrix arrangement is selected when the quantity of stack elements is at most the threshold value.

19. The system of claim 17, wherein the stack elements are displayed in the selected stack element arrangement in response to a mouse over on the stack item.

20. The system of claim 17, wherein the stack elements comprise one or more window instances.

21. The system of claim 17, wherein at least one of the stack elements represents a desktop menu.

22. The system of claim 17, wherein the stack elements comprise icons.

23. The system of claim 17, wherein the graphical user interface comprises:
a three-dimensional desktop defining a depth aspect comprises a viewing surface; and
a visualization object receptacle preeminently disposed relative to the viewing surface.

24. The system of claim 23, wherein the stack item is displayed on the visualization object receptacle.

25. The system of claim 17, wherein
a frame of the GUI is aligned squarely relative to the display device, and
when the stack elements are distributed along the curved path of the fan arrangement, two or more of the stack elements are rotated relative to each other and relative to the frame of the GUI.

26. The system of claim 25, wherein labels of the two or more rotated stack elements also are rotated relative to each other and relative to the frame of the GUI.

27. The system of claim 25, wherein the rotated stack elements are aligned with a normal to the curved path at respective locations of the stack elements along the curved path.

28. The system of claim 25, wherein, when the stack elements are displayed in the matrix arrangement, representations of the stack elements are aligned squarely relative to the frame of the GUI.

29. The system of claim 28, wherein labels of the squarely aligned stack elements also are squarely aligned relative to each other and relative to the frame of the GUI.

30. The system of claim 28, wherein the squarely aligned stack elements are surrounded by a visualization frame.

31. The system of claim 17, wherein the operation of displaying the stack elements in the selected stack element arrangement comprises:
removing the stack item from the GUI;
displaying a user interface object for collapsing the stack element arrangement at a location of the GUI where the stack item was displayed prior to its removal; and
displaying the stack elements in the selected stack element arrangement adjacent to the user interface object for collapsing the stack element arrangement.

32. The system of claim 31, wherein the operations further comprise:
while displaying the user interface object for collapsing the stack element arrangement adjacent to the stack element arrangement, detecting selection of the user interface object for collapsing the stack element; and
in response to detecting selection of the user interface object for collapsing the stack element arrangement, ceasing to display the stack element arrangement and redisplaying the stack item.

33. A method comprising:
displaying, by a computer system in a graphical user interface (GUI) on a display device, a stack item comprising stack elements;
comparing, by the computer system, a quantity of the stack elements in the stack item with a threshold value;
selecting, by the computer system, a stack element arrangement from among a fan arrangement and a matrix arrangement based on the comparison between the quantity of the stack elements in the stack item and the threshold value, wherein, when displayed in the fan arrangement, the stack elements are distributed along a curved path; and
in response to an action on the stack item, displaying, by the computer system, the stack elements in the selected stack element arrangement,
wherein the displaying of the stack elements in the selected stack element arrangement comprises displaying, in the selected stack element arrangement, in addition to the stack elements, a command object, which when selected, causes display of the stack elements in a file system window.

34. The method of claim 33, wherein the fan arrangement is selected when the quantity of the stack elements exceeds the threshold value, otherwise the matrix arrangement is selected when the quantity of stack elements is at most the threshold value.

35. The method of claim 33, wherein the stack elements are displayed in the selected stack element arrangement in response to a mouse over on the stack item.

36. The method of claim 33, wherein the stack elements comprise one or more window instances.

37. The method of claim 33, wherein at least one of the stack elements represents a desktop menu.

38. The method of claim 33, wherein the stack elements comprise icons.

39. The method of claim 33, wherein the graphical user interface comprises:
  a three-dimensional desktop defining a depth aspect comprises a viewing surface; and
  a visualization object receptacle preeminently disposed relative to the viewing surface.

40. The method of claim 39, wherein the stack item is displayed on the visualization object receptacle.

41. The method of claim 33, wherein
  a frame of the GUI is aligned squarely relative to the display device, and
  when the stack elements are distributed along the curved path of the fan arrangement, two or more of the stack elements are rotated relative to each other and relative to the frame of the GUI.

42. The method of claim 41, wherein labels of the two or more rotated stack elements also are rotated relative to each other and relative to the frame of the GUI.

43. The method of claim 41, wherein the rotated stack elements are aligned with a normal to the curved path at respective locations of the stack elements along the curved path.

44. The method of claim 41, wherein, when the stack elements are displayed in the matrix arrangement, representations of the stack elements are aligned squarely relative to the frame of the GUI.

45. The method of claim 44, wherein labels of the squarely aligned stack elements also are squarely aligned relative to each other and relative to the frame of the GUI.

46. The method of claim 44, wherein the squarely aligned stack elements are surrounded by a visualization frame.

47. The method of claim 33, wherein the operation of displaying the stack elements in the selected stack element arrangement comprises:
  removing the stack item from the GUI;
  displaying a user interface object for collapsing the stack element arrangement at a location of the GUI where the stack item was displayed prior to its removal; and
  displaying the stack elements in the selected stack element arrangement adjacent to the user interface object for collapsing the stack element arrangement.

48. The method of claim 47, wherein the operations further comprise:
  while displaying the user interface object for collapsing the stack element arrangement adjacent to the stack element arrangement, detecting selection of the user interface object for collapsing the stack element; and
  in response to detecting selection of the user interface object for collapsing the stack element arrangement, ceasing to display the stack element arrangement and redisplaying the stack item.

49. A method comprising:
  displaying, by a computer system in a graphical user interface (GUI) on a display device, a stack item comprising stack elements, wherein a frame of the GUI is aligned squarely relative to the display device; and
  in response to an action on the stack item, displaying, by the computer system in the GUI, the stack elements in a stack element arrangement in which the stack elements are distributed along a curved path, such that two or more of the stack elements are rotated relative to each other and relative to the frame of the GUI,
  wherein the displaying of the stack elements in the stack element arrangement comprises displaying, in the stack element arrangement, in addition to the stack elements, a command object, which when selected, causes display of the stack elements in a file system window.

50. The method of claim 49, wherein the action on the stack item in response to which the stack elements are displayed in the stack arrangement comprises a mouse over on the stack item.

51. The method of claim 49, wherein the stack elements comprise:
  two or more window instances, or
  two or more representations of peripherals, or
  two or more icons.

52. The method of claim 49, wherein labels of the two or more rotated stack elements also are rotated relative to each other and relative to the frame of the GUI.

53. The method of claim 49, wherein the rotated stack elements are aligned with a normal to the curved path at respective locations of the stack elements along the curved path.

54. The method of claim 49, wherein displaying the stack elements in the stack element arrangement comprises:
  removing, by the computer system, the stack item from the GUI;
  displaying, by the computer system, a user interface object for collapsing the stack element arrangement at a location of the GUI where the stack item was displayed prior to its removal; and
  displaying, by the computer system, the stack elements in the stack element arrangement adjacent to the user interface object for collapsing the stack element arrangement.

55. The method of claim 54, further comprising:
  while displaying the user interface object for collapsing the stack element arrangement adjacent to the stack element arrangement, detecting, by the computer system, selection of the user interface object for collapsing the stack element; and
  in response to detecting selection of the user interface object for collapsing the stack element arrangement, ceasing to display the stack element arrangement and redisplaying the stack item.

56. A system comprising:
  one or more hardware processors; and
  memory encoding instructions that, when executed by the one or more hardware processors, cause the system to perform operations comprising:
    displaying, in a graphical user interface (GUI) on a display device, a stack item comprising stack elements, wherein a frame of the GUI is aligned squarely relative to the display device; and
    in response to an action on the stack item, displaying, in the GUI, the stack elements in a stack element arrangement in which the stack elements are distributed along a curved path, such that two or more of the stack elements are rotated relative to each other and relative to the frame of the GUI, wherein the operation of displaying the stack elements in the stack element arrangement comprises displaying, in the stack element arrangement, in addition to the stack elements, a command object, which when selected, causes display of the stack elements in a file system window.

57. The system of claim 56, wherein the action on the stack item in response to which the stack elements are displayed in the stack arrangement comprises a mouse over on the stack item.

58. The system of claim 56, wherein the stack elements comprise:

two or more window instances, or two or more representations of peripherals, or two or more icons.

59. The system of claim 56, wherein labels of the two or more rotated stack elements also are rotated relative to each other and relative to the frame of the GUI.

60. The system of claim 56, wherein the rotated stack elements are aligned with a normal to the curved path at respective locations of the stack elements along the curved path.

61. The system of claim 56, wherein the operation of displaying the stack elements in the stack element arrangement comprises:

removing the stack item from the GUI;

displaying a user interface object for collapsing the stack element arrangement at a location of the GUI where the stack item was displayed prior to its removal; and displaying the stack elements in the stack element arrangement adjacent to the user interface object for collapsing the stack element arrangement.

62. The system of claim 61, wherein the operations further comprise:

while displaying the user interface object for collapsing the stack element arrangement adjacent to the stack element arrangement, detecting selection of the user interface object for collapsing the stack element; and in response to detecting selection of the user interface object for collapsing the stack element arrangement, ceasing to display the stack element arrangement and redisplaying the stack item.

* * * * *